United States Patent
Alalusi

(10) Patent No.: US 11,861,901 B2
(45) Date of Patent: *Jan. 2, 2024

(54) TECHNOLOGIES FOR ACTING BASED ON OBJECT DETECTION

(71) Applicant: Transrobotics, Inc., Hayward, CA (US)

(72) Inventor: Sayf Alalusi, Hayward, CA (US)

(73) Assignee: TransRobotics, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,828

(22) Filed: Dec. 17, 2021

(65) Prior Publication Data

US 2022/0108547 A1 Apr. 7, 2022

Related U.S. Application Data

(63) Continuation of application No. 16/574,721, filed on Sep. 18, 2019, now Pat. No. 11,210,517.

(60) Provisional application No. 62/732,923, filed on Sep. 18, 2018.

(51) Int. Cl.
| | |
|---|---|
| *G06V 20/20* | (2022.01) |
| *G06T 7/70* | (2017.01) |
| *G02B 27/01* | (2006.01) |
| *G06T 19/00* | (2011.01) |

(52) U.S. Cl.
CPC .......... *G06V 20/20* (2022.01); *G02B 27/017* (2013.01); *G06T 7/70* (2017.01); *G06T 19/006* (2013.01); *G02B 2027/0138* (2013.01); *G02B 2027/0178* (2013.01)

(58) Field of Classification Search
CPC ......... G06V 20/20; G06T 7/70; G06T 19/006; G02B 27/017; G02B 2027/0138; G02B 2027/0178
USPC ........................................................ 345/633
See application file for complete search history.

(56) References Cited

U.S. PATENT DOCUMENTS

| | | |
|---|---|---|
| 2012/0212366 A1 | 8/2012 | Alalusi |
| 2014/0104315 A1 | 4/2014 | Kapler et al. |
| 2015/0002507 A1 | 1/2015 | Ambrus et al. |
| 2016/0005233 A1* | 1/2016 | Fraccaroli ............ G02B 27/017 345/633 |
| 2016/0054566 A1 | 2/2016 | Osterhout et al. |
| 2016/0284136 A1 | 9/2016 | Johnston et al. |
| 2016/0342840 A1 | 11/2016 | Mullins et al. |
| 2017/0336210 A1 | 11/2017 | Rahman et al. |
| 2018/0095459 A1 | 4/2018 | Bachrach et al. |
| 2018/0096533 A1 | 4/2018 | Osman |
| 2019/0004325 A1 | 1/2019 | Connor |
| 2019/0129500 A1 | 5/2019 | Shen |
| 2019/0325230 A1 | 10/2019 | Nadler |
| 2019/0378289 A1 | 12/2019 | Stokking et al. |
| 2020/0074743 A1 | 3/2020 | Zheng et al. |

* cited by examiner

OTHER PUBLICATIONS

Davies, "GoogleATAP'sIvanPoupyrevTalksProjectsSoilandJacquard", XP055650099, Jun. 25, 2015, retrieved from the Internet: https://www.tomshardware.com/news/google-atap-project-soli-jacquard,29371.html.

*Primary Examiner* — Jin Ge

(74) *Attorney, Agent, or Firm* — Dentons US LLP

(57) ABSTRACT

This disclosure is enables various technologies involving various actions based on an object detecting a defined area and the defined area detecting the object.

20 Claims, 30 Drawing Sheets

600A

TECHNOLOGIES FOR ACTING BASED ON OBJECT DETECTION

CROSS-REFERENCE TO RELATED PATENT APPLICATIONS

This patent application is a continuation of U.S. patent application Ser. No. 16/574,721 filed 18 Sep. 2019; which claims a benefit of priority to U.S. Patent Application 62/732,923 filed 18 Sep. 2018; each of which is herein incorporated by reference for all purposes.

TECHNICAL FIELD

This disclosure relates to object detection.

BACKGROUND

There is a desire for a technology to enable a device, such as a smartphone, a wearable, a head-mounted display, a vehicle, or others, to localize itself within a defined area, whether indoors or outdoors, such as within a building, a vehicle, a fenced area, or others, and then act based on such localization. Also, there is a desire for a technology to enable the defined area to localize the device positioned therein and then act based on such localization. However, such technologies do not exist. Accordingly, this disclosure enables such technologies.

SUMMARY

In an embodiment, a device comprises: a housing hosting a processor, a memory, a display, a network interface, and a first distance sensor, wherein the processor is in communication with the memory, the display, the network interface, and the first distance sensor, wherein the memory stores a set of instructions configured to be executable by the processor, wherein the set of instructions is configured to instruct the processor to: request the first distance sensor to obtain a first distance reading off a physical object hosting a second distance sensor programmed to obtain a second distance reading relative to the housing, wherein the housing is separate and distinct from the physical object; request the network interface to send the first distance reading to a server that accesses the second distance reading such that the server fuses the first distance reading and the second distance reading and identifies a first position of the housing relative to the physical object and a second position of the physical object relative to the housing, wherein the server is separate and distinct from the housing and the physical object; request the network interface to receive the first position of the housing relative to the physical object and the second position of the physical object relative to the housing from the server; generate a content based on the first position of the housing relative to the physical object and the second position of the physical object relative to the housing; and take an action based on the content.

DETAILED DESCRIPTION OF PREFERRED EMBODIMENTS

Figure 1:
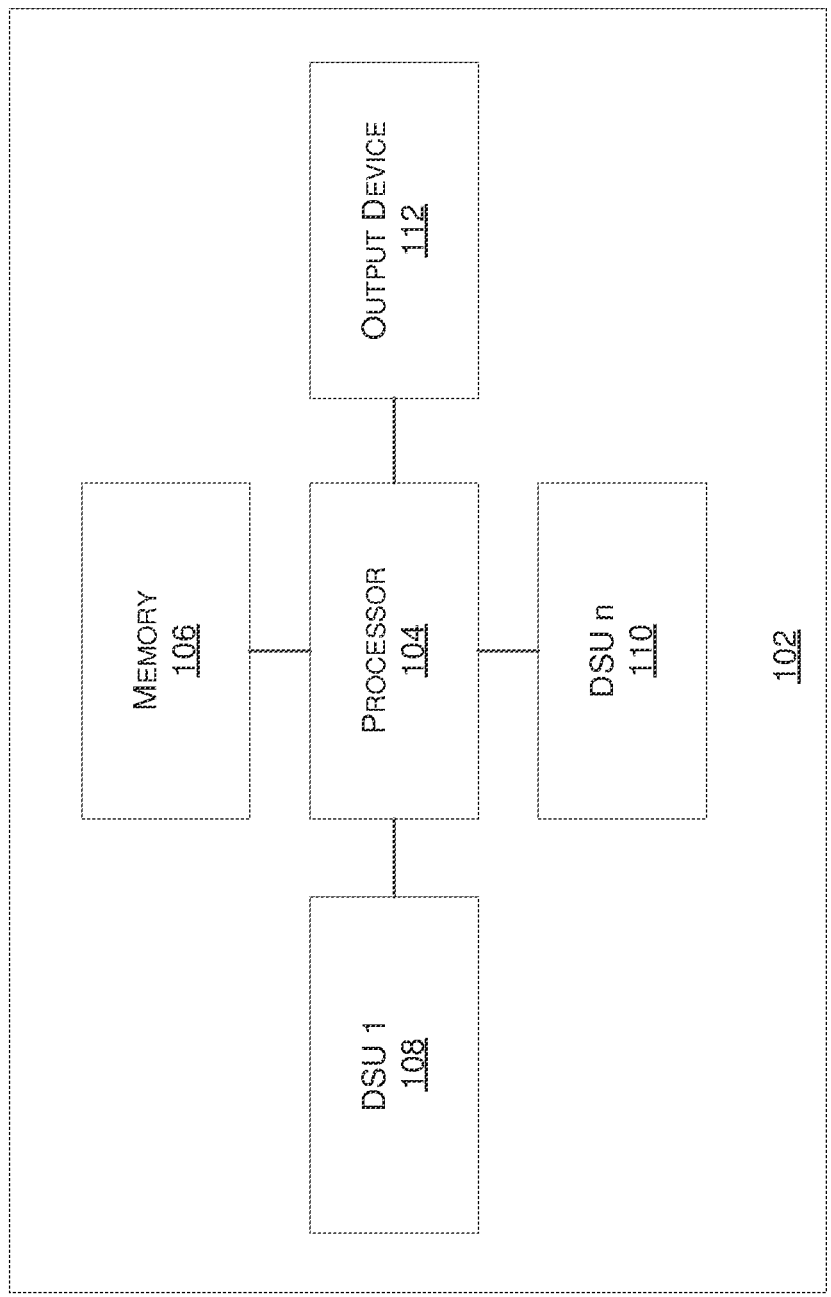
FIG. 1 shows a schematic diagram of an embodiment of a device with a distance sensing unit according to this disclosure.

Generally, this disclosure enables various technologies for acting based on distance sensing and is now described more fully with reference to FIGS. 1-40, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner. The term "combination", "combinatory," or "combinations thereof" as used herein refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. A skilled artisan will understand that typically there is no limit on a number of items or terms in any combination, unless otherwise apparent from the context.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

FIG. 1 shows a schematic diagram of an embodiment of a device with a distance sensing unit according to this disclosure. In particular, a system 100 includes a housing 102, a processor, 104, a memory 106, a distance sensing unit (DSU) 108, a DSU 110, and an output device 112.

The housing 102 houses the processor 104, the memory 106, the DSU 108, the DSU 110, and the output device 112. For example, the housing 102 can house externally, internally, or others, such as when the housing 102 is at least physically coupled to at least one of such components, such as via fastening, mating, interlocking, adhering, magnetizing, suctioning, stitching, stapling, nailing, or other forms of physical coupling. The housing 102 can be rigid, flexible, elastic, solid, perforated, or others. For example, the housing 102 can include a plastic, a metal, a rubber, a wood, a precious metal, a precious stone, a fabric, a rare-earth element, or others. For example, the housing 102 can include, be physically or electrically coupled to, be a component of, or embodied as a desktop, a laptop, a tablet, a smartphone, a joystick, a videogame console, a camera, a microphone, a speaker, a keyboard, a mouse, a touchpad, a trackpad, a sensor, a display, a printer, an additive or subtractive manufacturing machine, a wearable, a vehicle, a furniture item, a plumbing tool, a construction tool, a mat, a firearm/rifle, a laser pointer, a scope, a binocular, an electrical tool, a drill, an impact driver, a flashlight, an engine, an actuator, a solenoid, a toy, a pump, or others. For example, the wearable includes a head-mounted display (e.g., virtual reality headset, augmented reality headset), a watch, a wrist-worn activity tracker, a hat, a helmet, a earbud, a hearing aid, a headphone, an eyewear frame, an eye lens, a band, a garment, a shoe, a jewelry item, a medical device, an activity tracker, a swimsuit, a bathing suit, a snorkel, a scuba breathing apparatus, a swimming leg fin, a handcuff, an implant, or any other device that can be worn on or in a body (including hair) of an animal, such a human, a dog, a cat, a bird, a fish, or any other, whether domesticated or undomesticated, whether male or female, whether elderly, adult, teen, toddler, infant, or others. For example, the garment can include a jacket, a shirt, a tie, a belt, a band, a pair of shorts, a pair of pants, a sock, an undershirt, an underwear item, a bra, a jersey, a skirt, a dress, a blouse, a sweater, a scarf, a glove, a bandana, an elbow pad, a kneepad, a pajama, a robe, or others. For example, the jewelry item can include an earring, a necklace, a ring, a bracelet, a pin, a brooche, or others, whether worn on a body or clothing. For example, the shoe can include a dress shoe, a sneaker, a boot, a heeled shoe, a roller skate, a rollerblade, or others.

In some embodiments, the memory 106, the DSU 108, the DSU 110, and the output device 112 are supported via at least one a platform or a frame. For example, at least one of the platform or the frame can support externally, internally, or others, such as when at least one of the platform or the frame is at least physically coupled to at least one of such components, such as via fastening, mating, interlocking, adhering, magnetizing, suctioning, stitching, stapling, nailing, or other forms of physical coupling. At least one of the platform or the frame can be rigid, flexible, elastic, solid, perforated, or others. For example, at least one of the platform or the frame can include a plastic, a metal, a rubber, a wood, a precious metal, a precious stone, a fabric, a rare-earth element, or others.

The processor 104 can include a single core or a multicore processor. The processor 104 can include a system-on-chip (SOC) or an application-specific-integrated-circuit (ASIC). The processor 104 is powered via an accumulator, such as a battery or others, whether the accumulator is housed or is not housed via the housing 102. The processor 104 is in communication with the memory 106, the DSU 108, the DSU 110, and the output device 112.

The memory 106 can include a read-only-memory (ROM), a random-access-memory (RAM), a hard disk drive, a flash memory, or others. The memory 106 is powered via an accumulator, such as a battery or others, whether the accumulator is housed or is not housed via the housing 102.

The output device 112 can include a light source, a sound source, a radio wave source, a vibration source, a display, a speaker, a printer, a transmitter, a transceiver, or others. The output device 112 is powered via an accumulator, such as a battery or others, whether the accumulator is housed or is not housed via the housing 102.

The DSU 108 can include at least one of a radar unit, a lidar unit, a sonar unit, or others, whether wired or wireless. For example, the radar unit can include a digital radar unit (DRU), as disclosed in U.S. Pat. No. 9,019,150, which is incorporated by reference herein for all purposes including any DSU or DRU systems, structures, environments, configurations, techniques, algorithms, or others. For example, the DRU unit can be embodied as disclosed in U.S. Pat. No. 9,019,150 column 7, line 33 through column 17, line 3; column 30, line 38 through column 32, line 30; and column 41, line 60 through column 44, line 46, along with and in light of FIGS. 2, 3A, 3B, 14, 27A, and 27B of that patent. For example, the DSU can be line-of-sight based or non-line-of-sight based. For example, the DSU can be based on a radio signal, an optical signal, a sound signal, or others modalities of sensing. Note that the system 100 can include more than one DSU 108 up to DSU n 110. For example, the system 100 can include at least two, three, four, five, six, seven, eight, nine, ten, scores, tens, fifties, hundreds, thousands, millions, or more DSU 108 embodied as DSU n 110. Therefore, in such configurations, at least two of the DSUs are not in sync with each other and do not interfere with each other, but are able to receive echoes or signals from each other, as explained in U.S. Pat. No. 9,019,150 referenced above and incorporated by reference herein for all purposes including any DSU or DRU systems, structures, environments, configurations, techniques, algorithms, or others. For example, the DSUs 108-110n can be identical to or different from each other in structure, function, operation, modality, positioning, materials, or others.

Figure 2:
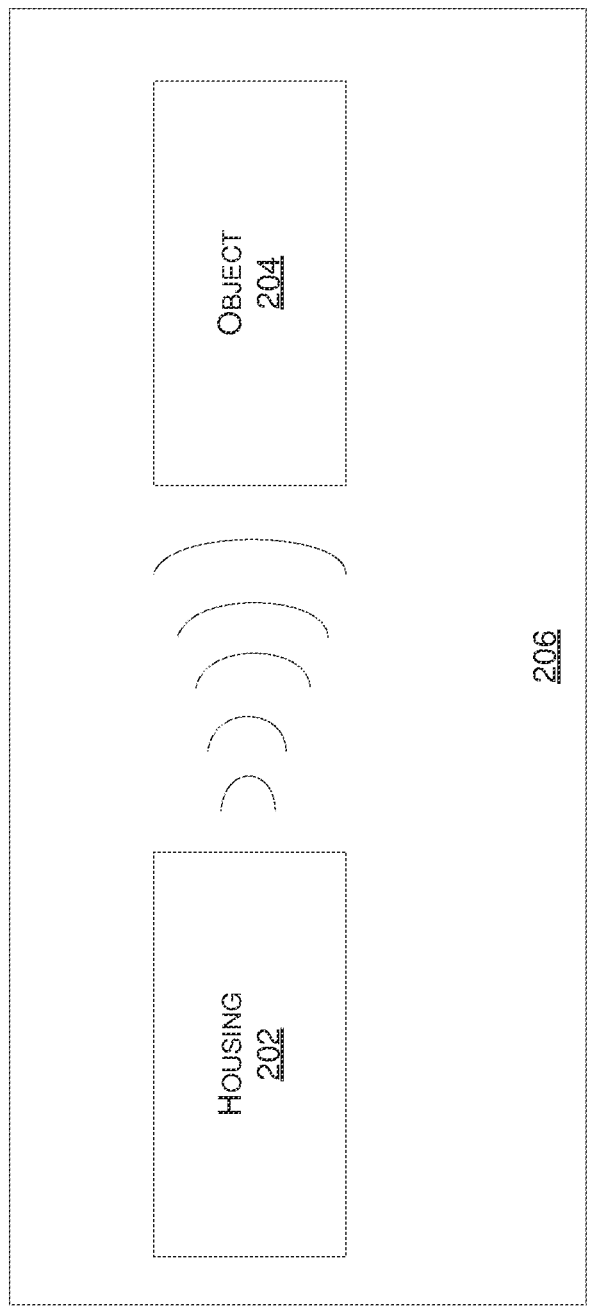
FIG. 2 shows a schematic diagram of an embodiment of a defined area containing a device and an object according to this disclosure.

FIG. 2 shows a schematic diagram of an embodiment of a defined area containing a device and an object according to this disclosure. In particular, a system 200 includes a housing 202, an object 204, and a defined area 206. The defined area 206 contains the housing 202 and the object 204. For example, the defined area 206 can include a physically fenced area, a digitally fenced area, a geo-fenced area, a building (residential/commercial), a garage, a basement, a vehicle (land/marine/aerial/satellite), an indoor area, an outdoor area, a mall, a school, a cubicle grid, a utility room, a walk-in refrigerator, a restaurant, a coffee shop, a subway or bus or train station, an airport, a barracks, a camp site, a house of worship, a gas station, an oil field, a refinery, a warehouse, a farm, a laboratory, a library, a long term storage facility, an industrial facility, a post office, a shipping hub or station, a supermarket, a retail store, a home improvement center, a parking lot, a toy store, a manufacturing plant, a processing plan, a pool, a hospital, a medical facility, an energy plan, a nuclear reactor, or others. The housing 202 can be the housing 102 or another object. The housing 202 can be mobile or stationary within the defined area 202 with respect to the object 204 or the defined area 206. The housing 202 can be secured within the defined area 206, such as via fastening, mating, interlocking, adhering, magnetizing, suctioning, stitching, stapling, nailing, or other forms of physical coupling to the defined area 206 or an object positioned within or extending into the defined area 206. The object 204 can be secured within the defined area 206, such as via fastening, mating, interlocking, adhering, magnetizing, suctioning, stitching, stapling, nailing, or other forms of physical coupling to the defined area 206 or another object positioned within or extending into the defined area 206. The object 204 can be the housing 102 or another object. For example, the defined area 206 can be the object 204. The object 204 can be mobile or stationary within the defined area 202 with respect to the housing 202 or the defined area 206. The defined area 206 can be movable with respect to the housing 202 or the object 204. The object 204 may form or be a part of a boundary of the defined area 206. For example, the defined area 206 may be a fenced area and the object 204 may be a fence that forms the boundary.

Figure 3:
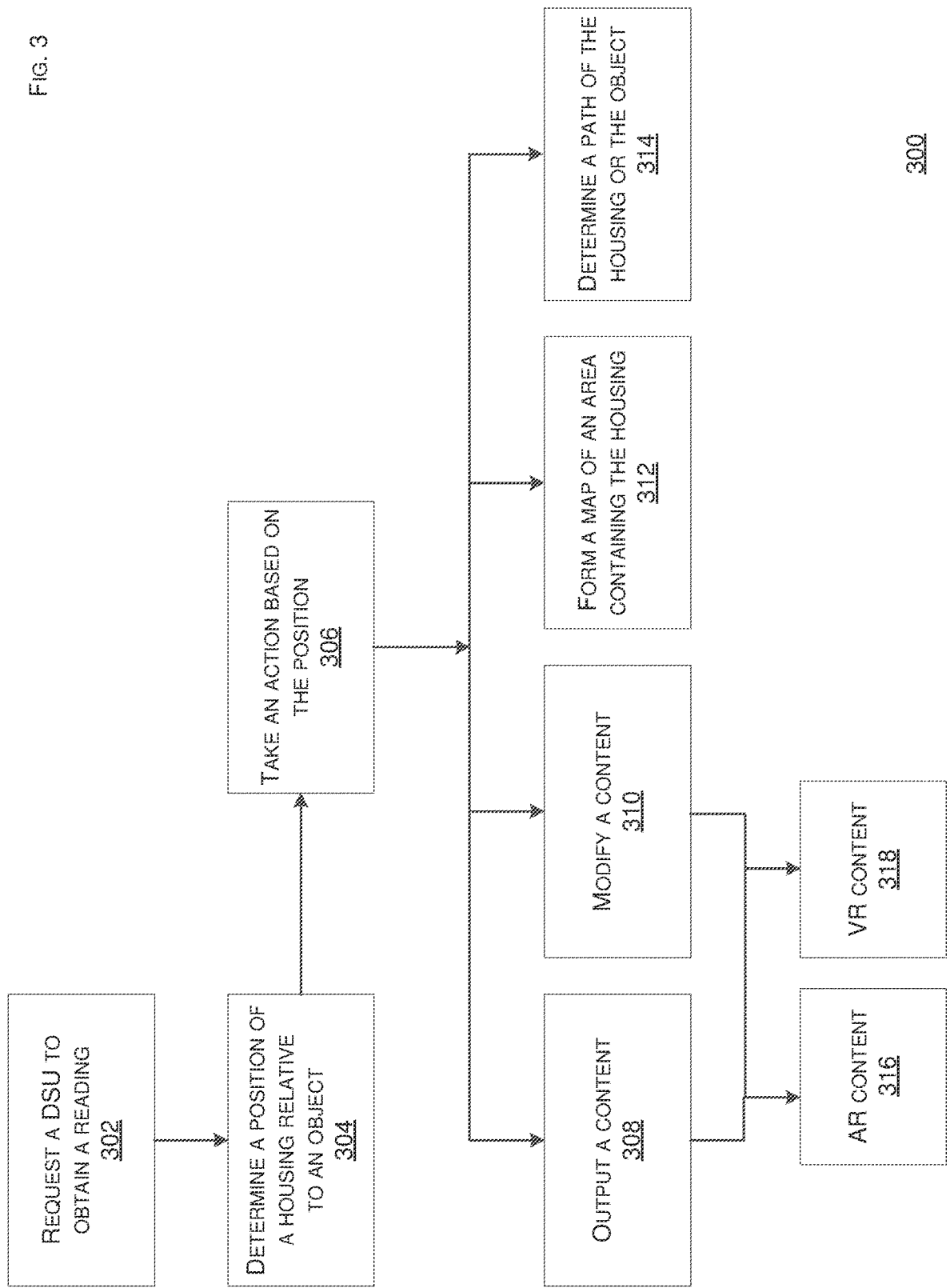
FIG. 3 shows a flowchart of an embodiment of a method for acting based on a position of a device within a defined area according to this disclosure.

FIG. 3 shows a flowchart of an embodiment of a method for acting based on a position of a device within a defined area according to this disclosure. In particular, a method 300 includes the housing 202 positioned within the defined area 206 and the object 204 positioned within the defined area 206. The housing 202 is embodied as the housing 102. For example, the housing 202 is a head-mounted display or an eyewear unit, the object 204 is a furniture item, and the defined area 206 is a room.

In block 302, the processor 104 requests the DSU 108 to obtain a reading based on the object 204. The reading can be based on an echo received via the DSU 108 off the object 204 when the DSU 108 emitted a signal, which can be toward the object 204. The reading can be based on a signal emitted via the object 204. Once the DSU 108 obtains the reading, then that reading is available to the processor 104.

In block 304, the processor 104 determines a position of the housing 202 relative to the object 204 within the defined area 206 based on the reading. For example, the position is determined based on a time of flight when the reading is based on the echo received via the DSU 108. Note that the position can be estimated or refined, such when other positional information is available, such as via being predetermined.

In block 306, the processor 104 takes an action based on the position. The action can include reading a data structure, writing a datum to a data structure, modifying a datum within a data structure, deleting a datum in a data structure, causing an input device to take an action, causing an output device to take an action, causing a signal to be generated, causing a signal to be sent, causing a signal to be received, or others. For example, the input device can include a camera, a microphone, a user input interface, a touch-enabled display, a receiver, a transceiver, a sensor, a hardware server, or others. For example, the output device can include a display, a speaker, a vibrator, an actuator, a valve, a pump, a transmitter, a transceiver, a hardware server, or others. For example, the signal can be sent outside the defined area 206 or inside the defined area 206. For example, the signal can be sent to or received from the object 204, the defined area 206, or another device, whether local to or remote to the housing 202, the object 204, or the defined area 206. For example, the datum can include information about the position or others. For example, the action based on the position can include changing velocity based on a determined or measured ambient property, such as at least one of position over time (velocity), velocity over time (acceleration), object path, trajectory, or others.

In block 308, the processor 104 can cause a content to be output, such as via the output device 112. The content can be based on the position or include information about the position. For example, the content can include an audio containing a warning message, a direction message, a navigational content, an instructional content, or others.

In block 308, the processor 104 can cause a content to be modified, such as the content stored on the memory 106 or the content output via the output device 112. The content can be based on the position or include information about the position. For example, the content can include an graphic containing a warning message, a direction message, a navigational content, an instructional content, or others. For example, the information about the position can include at least one of position over time (velocity), velocity over time (acceleration), object path, trajectory, or others.

In block 312, the processor 104 can cause a map of the defined area 206 to be formed based on the position, which can be in real-time. The map can symbolically depict a perimeter or periphery of the defined area 206 and can symbolically depict the housing 202 or the object 204 within the perimeter or periphery. The map can be stored on the memory 106 or remote from the housing 202, such as via the object 204 or external to the defined area 206, such as via a server or others. The map, when formed, can be presented via the output device 112. For example, the map can be displayed via the output device 112.

In block 314, the processor 104 can cause a path of the housing 202 or the object 204 within the defined area 206 to be determined based on the position, which can be in real-time. For example, the path can be symbolically depicted over a map. The path can correspond to a path already traveled by the housing 202 or the object 204 within the defined area 206. The path can correspond to a path that the housing 202 should travel relative to the object 204 within the defined area 206 or external to the defined area 206. For example, the path can enable a user of the housing 202 to navigate to a specified or predetermined point within the defined area 206 or external to the defined area 206.

In block 316, the content that is output via the output device 112 is an augmented reality content based on the position. For example, the augmented reality content can include at least one of images or sound based on the position. For example, the augmented reality content can be a navigational content, a warning content, a directional content, an instructional content, a videogame content, an immersive experience content, an educational content, a shopping content, or others. The augmented reality content can be modifiable based on the position in real-time.

In block 316, the content that is output via the output device 112 is a virtual reality content based on the position. For example, the virtual reality content can include at least one of images or sound based on the position. For example, the virtual reality content can be a navigational content, a warning content, a directional content, an instructional content, a videogame content, an immersive experience content, an educational content, a shopping content, or others. The virtual reality content can be modifiable based on the position in real-time. For example, when the housing 202 is a head-mounted display or an eyewear unit, the virtual reality content can help a wearer of the head-mounted display or the eyewear unit to track a position thereof (e.g., inside-out tracking, outside-in tracking, with markers, without markers) or to avoid obstacles, such as via minimize walking into an obstacle, such as the object 204, the defined area 206, or others.

Figure 4:
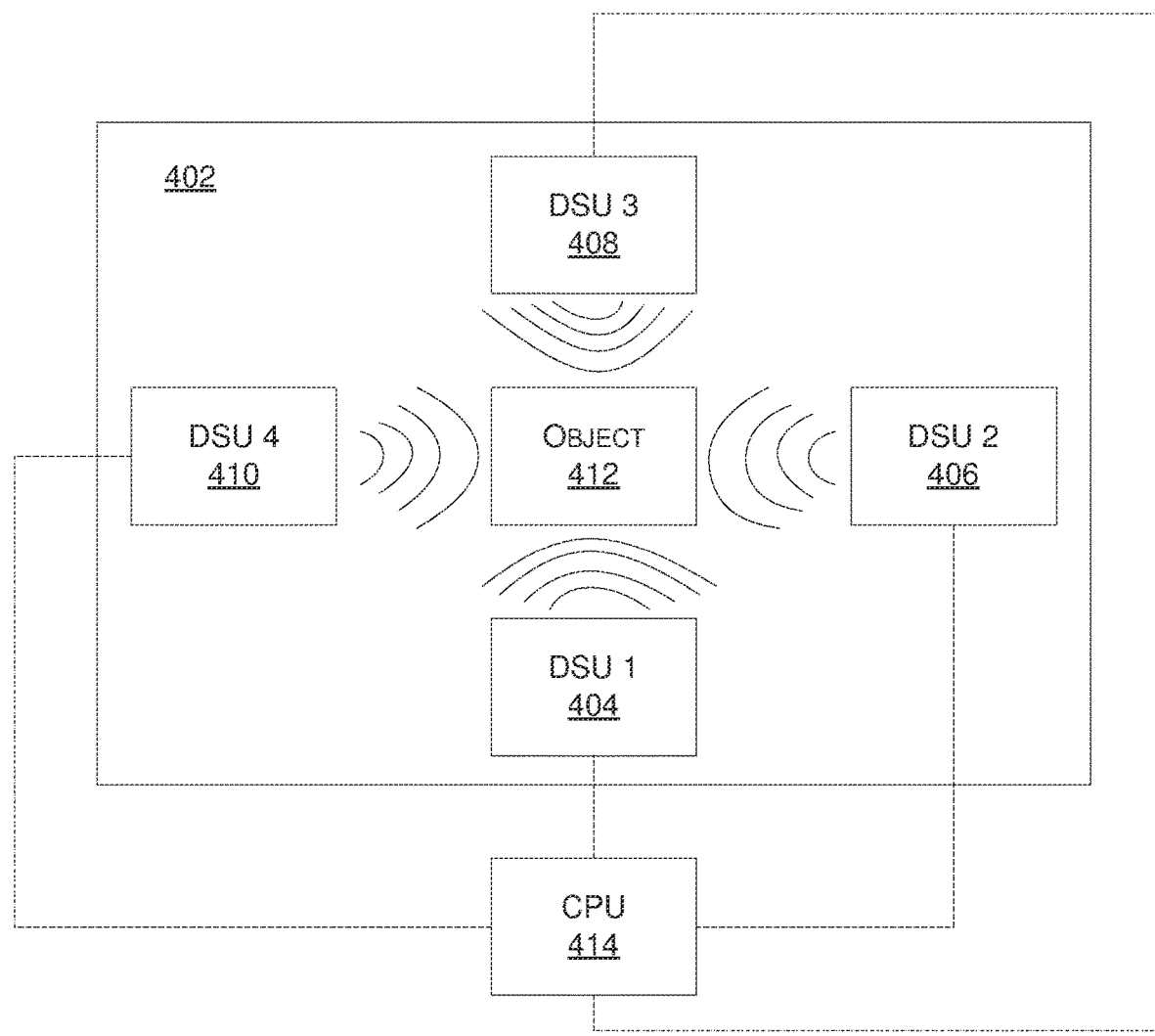
FIG. 4 shows a schematic diagram of an embodiment of a defined area containing an object according to this disclosure.

FIG. 4 shows a schematic diagram of an embodiment of a defined area containing an object according to this disclosure. In particular, a system 400 includes a defined area 402, a plurality of DSUs 404-410, an object 412, and a processor 414. The defined area 402 can be as the defined area 206, as explained above, or others. The defined area 402 contains the DSUs 404-410 and the object 412. The processor 414 is external to the defined area 402, but can be internal to the defined area 402. The DSUs 404-410 can be as the DSU 108 or 110, as explained above, or others. The DSUs 404-410 can be identical to or different from each other in structure, function, operation, modality, positioning, materials, or others. The DSUs 404-410 are not in sync with each other and do not interfere with each other, but are able to receive echoes or signals from each other, as explained in U.S. Pat. No. 9,019,150 referenced above and incorporated by reference herein for all purposes including any DSU systems, structures, environments, configurations, techniques, algorithms, or others. For example, the DSU unit can be embodied as disclosed in U.S. Pat. No. 9,019,150 column 7, line 33 through column 17, line 3; column 30, line 38 through column 32, line 30; and column 41, line 60 through column 44, line 46, along with and in light of FIGS. 2, 3A, 3B, 14, 27A, and 27B of that patent. At least one of the DSUs 404-410 can be secured within the defined area 402, such as via fastening, mating, interlocking, adhering, magnetizing, suctioning, stitching, stapling, nailing, or other forms of physical coupling to the defined area 402 or another object positioned within or extending into the defined area 402. The object 412 can be as the housing 202, the object 204, or others, as explained above. The object 412 can be secured within the defined area 402, such as via fastening, mating, interlocking, adhering, magnetizing, suctioning, stitching, stapling, nailing, or other forms of physical coupling to the defined area 402 or another object positioned within or extending into the defined area 402. The processor 414 can be a central processing unit (CPU) or can be embodied as the processor 104 as explained above. The processor 414 is in communication with the DSUs 404-410, whether wired or wireless. The defined area 402 can be movable with respect to the object 414 or the DSUs 404-410 or the processor 414.

Figure 5:
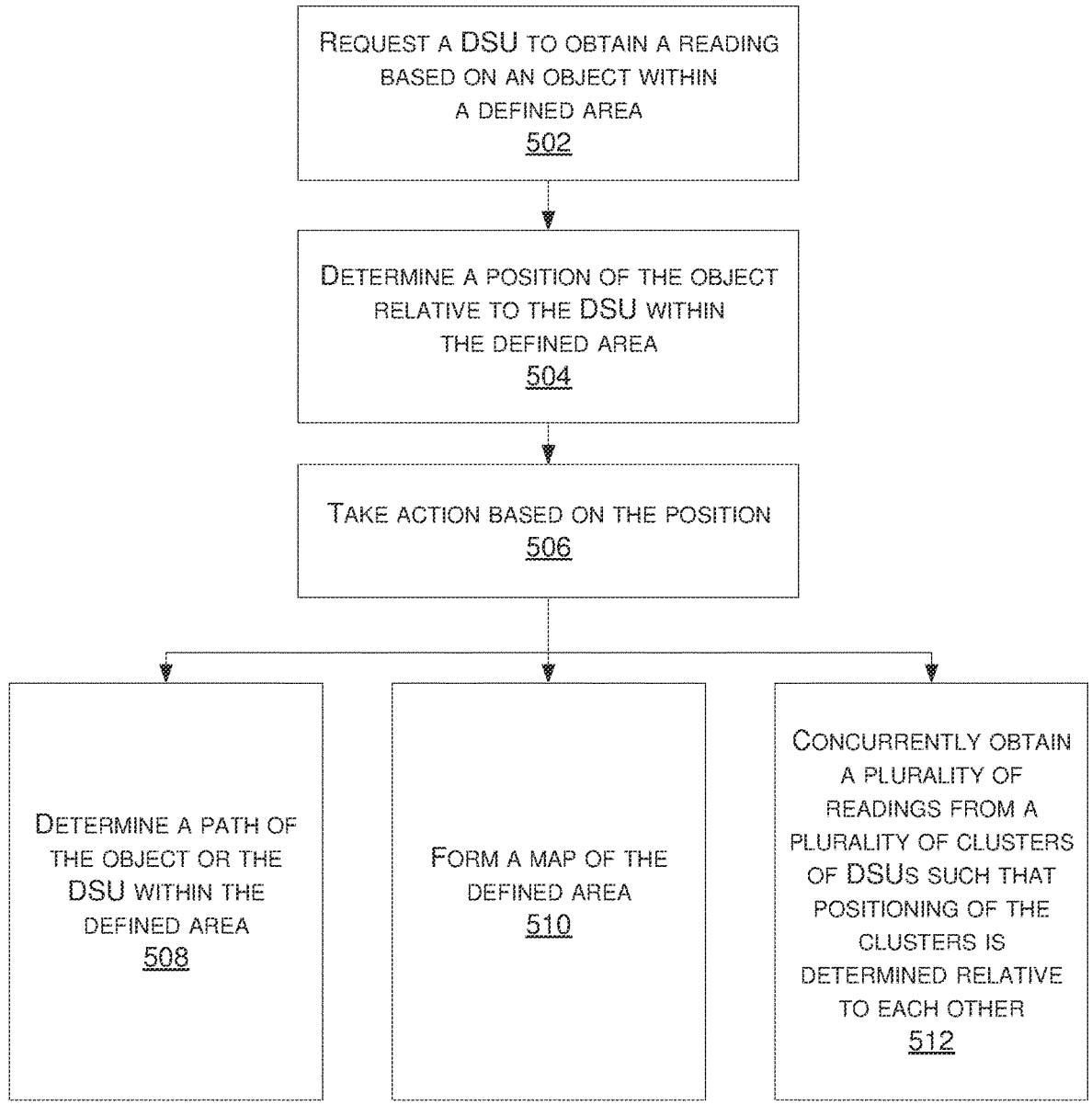
FIG. 5 shows a flowchart of an embodiment of a method of acting based on a position of an object within a defined area according to this disclosure.

FIG. 5 shows a flowchart of an embodiment of a method of acting based on a position of an object within a defined area according to this disclosure. In particular, a method 500 is performed via the system 400.

In block 502, the processor 414 requests at least one of the DSUs 404-410 to obtain a reading based on the object 412 within the defined area 402. The reading can be based on an echo received via the at least one of the DSUs 404-410 off the object 412 when the at least one of the DSUs 404-410 emitted a signal, which can be toward the object 412. The reading can be based on a signal emitted via the object 412. Once the at least one of the DSUs 404-410 obtains the reading, then that reading is available to the processor 414.

In block 504, the processor 414 determines a position of the object 412 relative to the at least one of the DSUs 404-410 within the defined area 402 based on the reading. For example, the position is determined based on a time of flight when the reading is based on the echo received via the at least one of the DSUs 404-410. Note that the position can be estimated or refined, such when other positional information is available, such as via being predetermined.

In block 506, the processor 414 takes an action based on the position. The action can include reading a data structure, writing a datum to a data structure, modifying a datum within a data structure, deleting a datum in a data structure, causing an input device to take an action, causing an output device to take an action, causing a signal to be generated, causing a signal to be sent, causing a signal to be received, or others. For example, the input device can include a camera, a microphone, a user input interface, a touch-enabled display, a receiver, a transceiver, a sensor, a hardware server, or others. For example, the output device can include a display, a speaker, a vibrator, an actuator, a valve, a pump, a transmitter, a transceiver, a hardware server, or others. For example, the signal can be sent outside the defined area 402 or inside the defined area 402. For example, the signal can be sent to or received from the object 412, the defined area 402, or another device, whether local to or remote to the object 402 or the defined area 402. For example, the datum can include information about the position or others.

In block 508, the processor 414 can cause a path of the object 412 within the defined area 402 to be determined based on the position, which can be in real-time. For example, the path can be symbolically depicted over a map. The path can correspond to a path already traveled by the object 412 within the defined area 402. The path can correspond to a path that the object 412 should travel relative to the defined area 402 within the defined area 402 or external of the defined area 402. For example, the path can enable a user of the object 412 to navigate to a specified or predetermined point within the defined area 402 or external to the defined area 402.

In block 510, the processor 414 can cause a map of the defined area 402 to be formed based on the position, which can be in real-time. The map can symbolically depict a perimeter or periphery of the defined area 402 and can symbolically depict the object 412 within the perimeter or periphery. The map can be stored local to or remote from the processor 414 or remote from or local to the object 412 or external to the defined area 402, such as via a server or others. The map, when formed, can be presented via an output device in communication with the processor 414, such as via the output device 112. For example, the map can be displayed via the output device 112.

In block 512, each of the DSUs 404-410 is a cluster of DSUs. As such, the processor 414 can cause the DSUs 404-410 to concurrently obtain a plurality of readings such that a plurality of positions of each of the DSUs 404-410 is determined relative to each other. For example, if the object 412 moves between a pair of DSUs within a cluster of DSUs or between a pair of clusters of DSUs, then the pair of DSUs or the pair of clusters of DSUs can each report its own readings and the processor 414 can determine a pair of positions of the pair of DSUs or the pair of clusters of DSUs relative to the object 412. The processor can compare the readings of the DSUs 404-410 to determine the position of the DSUs 404-410. The processor is programmed such that the DSUs 404-410 are observing the same object, although variations are possible, such as when the DSUs 404-410 are observing different objects, whether inclusive or exclusive of the object. If the processor 414 already knows where the object 412 is within the defined area 402, then the processor 414 can determine the pair of positions of the pair of DSUs or the pair of clusters of DSUs relative to the defined area 402. Likewise, if the object 412 moves along a pair of DSUs within a cluster of DSUs or between a pair of clusters of DSUs such that the pair of DSUs within the cluster of DSUs or the pair of clusters of DSUs are on a same side relative to the object 412, then similar determination can be performed. Note that a cluster of DSUs effectively reduces a need for setup positional calibration, i.e., at least two DSU within a cluster work in a triangulation manner. Also, at least two DSU clusters can share data between each other or send data to the processor 414, such as a server or others, such the processor 414 can learn position and orientation of the at least two clusters, which effectively reduces a need for setup positional calibration. Further, note that a set of data sourced from a DSU cluster can be fused or combined with a set of data sourced from an inertial measurement unit (IMU), which can included in the object 412 or the DSU cluster, in order to enhance or further refine the set of data sourced from the DSU cluster. Moreover, note that a DSU cluster or a plurality of DSU clusters can be configured as or used as or form a mesh network for DSUs. Additionally, a server can receive a set of DSU data from the object 412 relative to the DSUs 404-410 or the defined area 402 to refine or update positioning of the DSUs 404-410 relative to the object 412 or the defined area 402 or the object 412 relative to the DSUs 404-410 or the defined area 402 or the defined area 402 relative to the DSUs 404-410 or the object 412. Moreover, the object 412 can collect its own set of DSU data relative to the DSUs 404-410 or the defined area 402 to refine or update its own set of DSU data. Furthermore, the server can receive the set of DSU data from the object 412 relative to the DSUs 404-410 or the defined area 402 or the object 412 can collect its own set of DSU data relative to the DSUs 404-410 or the defined area 402 can be used to identify a placement of uncooperative targets or enable tracking of the object 412 when the object 412 is out-of-range with on-board sensors. The server can be programmed to track one object, such as the object 412, such as when that object is coming closer to the DSUs 404-410 or moving away from the DSUs 404-410, whether or not the object is on opposite sides or along the DSUs 404-410. This functionality can be extended to the server tracking multiple objects, whether those objects are moving in different directions from each other, and this form of programming the server will speed up a process of tracking the objects. In some embodiments, the object does not need to be in motion, if there is more than one object.

If the object 412 moves and only one DSU of the DSUs 404-410 measures the distance to the object 412, and another DSU of the DSUs 404-410 does not measure the distance to the object 412, then the processor 414 can be programmed to exclude a coverage area of the second DSU (the one that did not detect the object 412) of the DSUs 404-410 from the area 402. If the object 412 moves along a path or trajectory and one DSU of the DSUs 404-410 can detect the object 412 at one time and then another DSU of the DSUs 404-410 at another time, such as 2, 3, 4, 5, 6, 7, 8, 9, 10 seconds or more, then the path or trajectory can be extended or interpolated, and the positions of the DSUs (the first DSU that detects the object 412 and the second DSU that detects the object 412 at another time) of the DSUs 404-410 can be extracted. For example, if a land vehicle, such as a car, a motorcycle, a tractor, a robot, or others, is moving along a straight road or some other defined surface or path, then the land vehicle is the object 412. Two or more DSUs of the DSUs 404-410 can be placed on a side of the road or embedded into the road or placed above the road, including hovering over the road, to observe the land vehicle or others traveling on the road. The two DSUs of the DSUs 404-410 need not to observe the land vehicle concurrently or at an exact same moment, if the land vehicle moves or travels down the road or some other defined surface or path, such as a street or others, in a straight line at approximately constant speed. Successive passes of land vehicle can help to refine one or more estimates of the position(s) of the at least two DSUs of the DSUs 404-410. Note that the road or some other defined surface or path can be rectilinear or non-rectilinear, such as arcuate, sinusoidal, pulsating, zigzag, or others, whether symmetrical or asymmetrical, whether open-shaped or closed-shape.

If one or more DSU of the DSUs 404-410 is monitoring an area and the object 412 reports to the processor 414 that the object 412 is present or moving in any direction along any plane, but the DSU of the DSUs 404-41 does not detect the object 412, then the processor 414 can determine that the area is monitored by the DSU of the DSUs 404-410 is clear of obstacles. For example, if a drone needs to land in an area, and the DSUs 404-410 do not detect an object in a landing zone, then the done is free to land. Note that the DSUs 404-410 can be hosted via the drone or not hosted via the drone, such as via being land-based or marine-based or aerial based, such as on another vehicle or support structure of that respective type. For example, the another vehicle can include a car, a robot, a boat, a helicopter, a quadcopter, a tower, a post, a frame, a platform, or others.

Figure 6A:
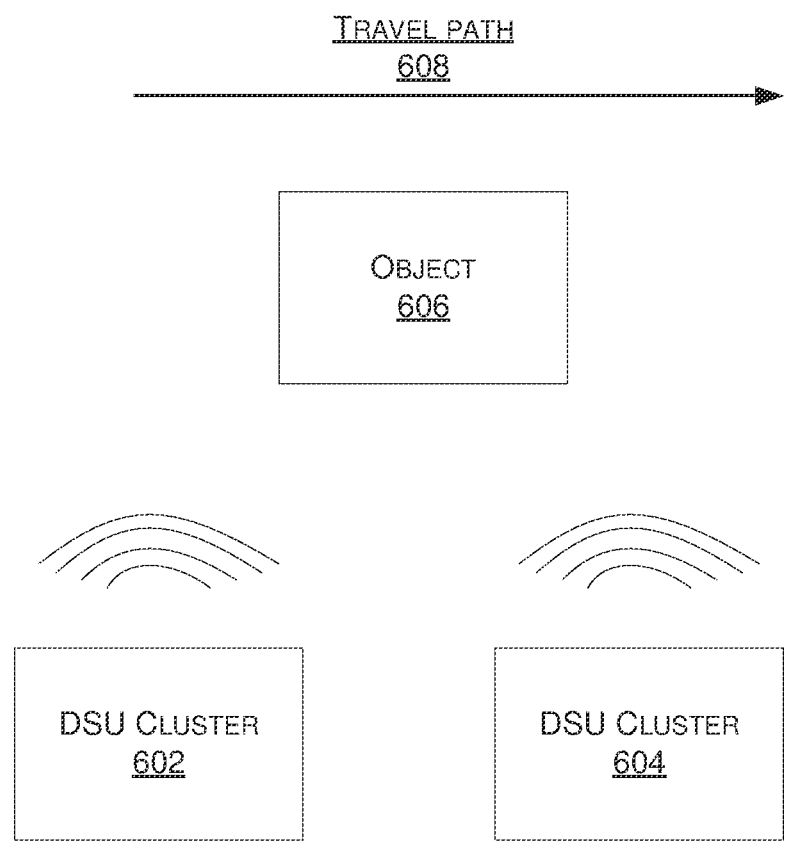
FIG. 6A shows a schematic diagram of an embodiment of a plurality of distance sensing unit clusters tracking an object traveling along the distance sensing unit clusters according to this disclosure.
Figure 6B:
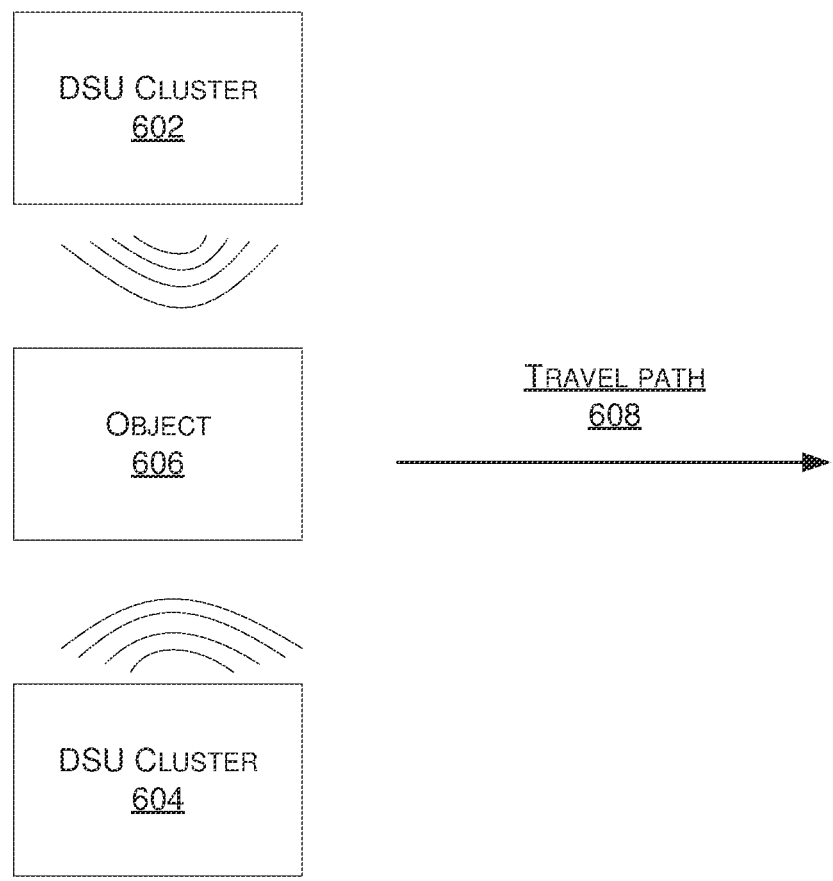
FIG. 6B shows a schematic diagram of an embodiment of a plurality of distance sensing unit clusters tracking an object traveling between the distance sensing unit clusters according to this disclosure.

FIG. 6A shows a schematic diagram of an embodiment of a plurality of distance sensing unit clusters tracking an object traveling along the distance sensing unit clusters according to this disclosure. FIG. 6B shows a schematic diagram of an embodiment of a plurality of distance sensing unit clusters tracking an object traveling between the distance sensing unit clusters according to this disclosure. In particular, each of a system 600A and 600B includes a first DSU cluster 602, as explained above, a second DSU cluster 604, as explained above, and an object 606. The first DSU cluster 602 and the second DSU cluster 604 are in communication with a processor, such as the processor 414, a server, or others. The object 606 can be the housing 202, the object 204, the object 412, or others. As shown in FIG. 6A, in the system 600A, the first DSU cluster 602 and the second DSU cluster 604 are positioned on a same side relative to the object 606, as explained above, regardless whether the object 606 is moving relative to the first DSU cluster 602 and the second DSU cluster 604 or vice versa. As shown in FIG. 6B, in the system 600B, the object 606 is positioned between the first DSU cluster 602 and the second DSU cluster 604, as explained above, regardless whether the object 606 is moving relative to the first DSU cluster 602 and the second DSU cluster 604 or vice versa. Therefore, as per FIGS. 6A and 6B, if the object 606 is moving along a travel path 608 relative to the first DSU cluster 602 and the second DSU cluster 604 or vice versa, then the first DSU cluster 602 and the second DSU cluster 604 can concurrently obtain a plurality of readings based on the object 606 moving along the travel path 608 and send the readings to the processor. As such, the processor can learn a position of each of the first DSU cluster 602 and the second DSU cluster 604 relative to the object 606, in real-time, while the object 606 is moving along the travel path 608, due to data sharing via the processor. Note that at least one of the system 600A or the system 600B can occur internal to or external to a defined area or without a defined area, as explained above. Also, note that when the object 606 includes a DSU, as explained above, the object 606 can position itself relative to at least one of the first DSU cluster 602 or the second DSU cluster 604, such as in the system 600A and the system 600B. This technique also works where the first DSU cluster 602 and the second DSU cluster 604 are not overlapping each other in coverage, as described above.

In some embodiments, the processor 414 can cause a content to be output, as explained above. The content can be based on the position or include information about the position. For example, the content can include an audio containing a warning message, a direction message, a navigational content, an instructional content, or others. The processor 414 can cause a content to be modified, as explained above. The content can be based on the position or include information about the position. For example, the content can include an graphic containing a warning message, a direction message, a navigational content, an instructional content, or others. The content can include an augmented reality content based on the position. For example, the augmented reality content can include at least one of images or sound based on the position. For example, the augmented reality content can be a navigational content, a warning content, a directional content, an instructional content, a videogame content, an immersive experience content, an educational content, a shopping content, or others. The augmented reality content can be modifiable based on the position in real-time. The content can include a virtual reality content based on the position. For example, the virtual reality content can include at least one of images or sound based on the position. For example, the augmented reality content can be a navigational content, a warning content, a directional content, an instructional content, a videogame content, an immersive experience content, an educational content, a shopping content, or others. The virtual reality content can be modifiable based on the position in real-time. For example, when the object 412 is a head-mounted display or an eyewear unit, the virtual reality content can help a wearer of head-mounted display or the eyewear unit to track a position thereof (e.g., inside-out tracking, outside-in tracking, with markers, without markers) or to avoid obstacles, such as via minimize walking into an obstacle, such as the defined area 402 or others.

Figure 7:
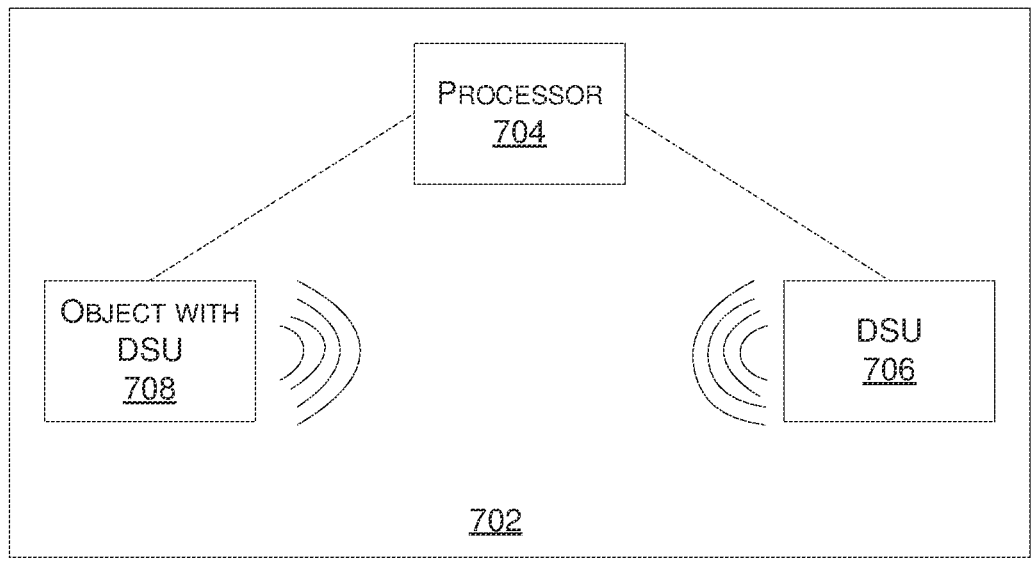
FIG. 7 shows a schematic diagram of an embodiment of a defined area containing a distance sensing unit in communication with a processor and an object with a distance sensing unit in communication with the processor according to this disclosure.

FIG. 7 shows a schematic diagram of an embodiment of a defined area containing a distance sensing unit in communication with a processor and an object with a distance sensing unit in communication with the processor according to this disclosure. In particular, a system 700 includes a defined area 702, a processor 704, a DSU 706, and an object 708. The defined area 702 contains the processor 704, the DSU 706, and the object 708, as explained above. The defined area 702 can be as the defined area 402, as explained above, or others. The processor 704 can be positioned external to the defined area 702. The processor 704 can be as the processor 414, as explained above. The DSU 706 can be as any of the DSUs 404-410, as explained above, or others. The object 708 can be as the object 412, as explained above or others. The object 708 hosts a DSU, as explained above. The processor 704 is in communication with the DSU 706 and the object 708. At least one of the processor 704, the DSU 706, or the object 708 can be secured within the defined area 702, such as via fastening, mating, interlocking, adhering, magnetizing, suctioning, stitching, stapling, nailing, or other forms of physical coupling to the defined area 702 or an object positioned within or extending into the defined area 702. The defined area 702 can be moving with respect to at least one of the processor 704, the DSU 706, or the object 708.

Figure 8:
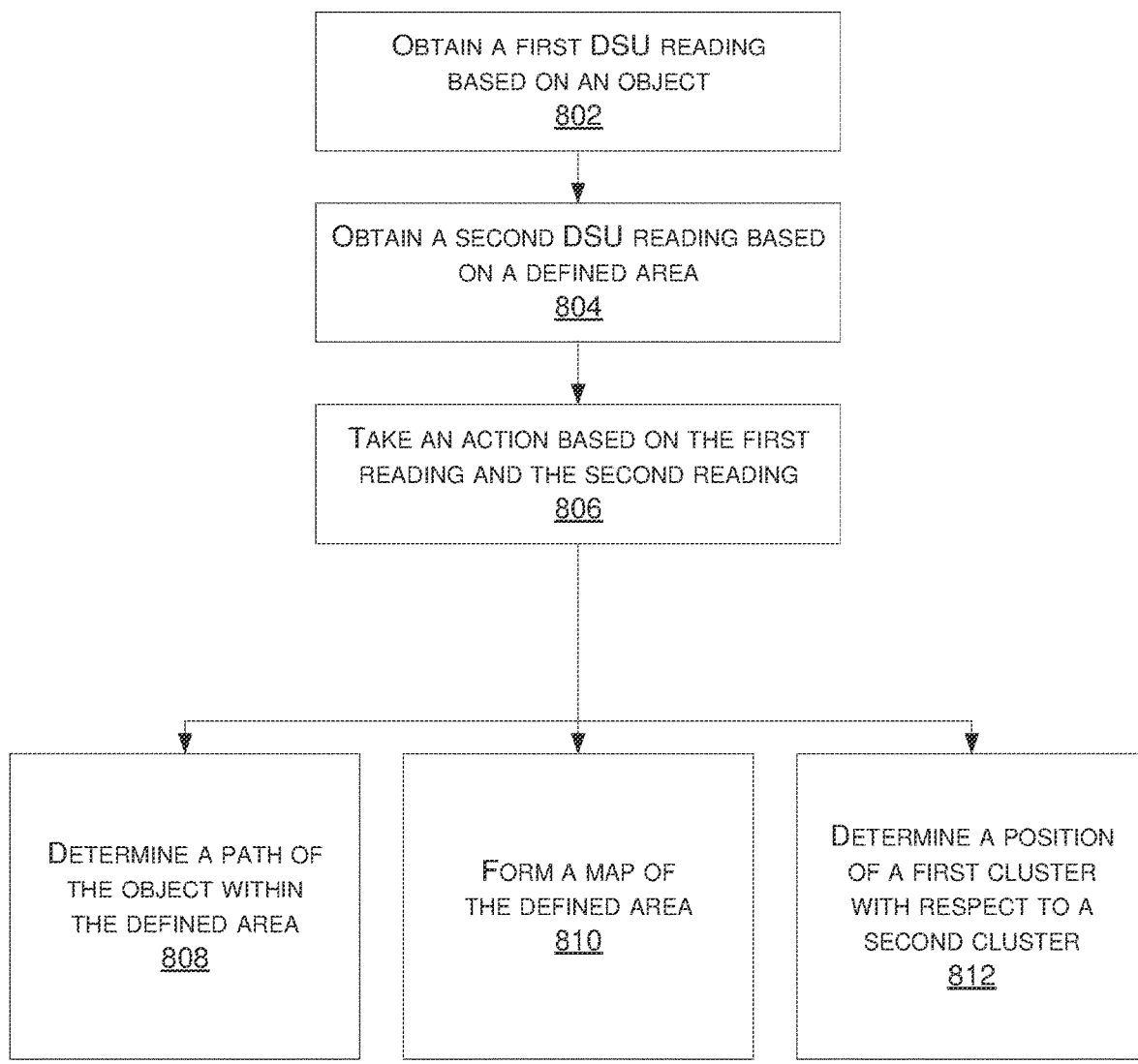
FIG. 8 shows a flowchart of an embodiment of method of acting based on a plurality of readings from a plurality of distance sensing units according to this disclosure.

FIG. 8 shows a flowchart of an embodiment of method of acting based on a plurality of readings from a plurality of distance sensing units according to this disclosure. In particular, a method 800 can be performed via the system 700.

In block 802, the processor 704 obtains a first DSU reading from the DSU 706 based on the object 708 moving within the defined area 702. The first DSU reading can be based on an echo received via the DSU 706 off the object 708 when the DSU 706 emitted a signal, which can be toward the object 708. The first DSU reading can be based on a signal emitted via the object 708. Once the DSU 706 obtains the first DSU reading, then that reading is available to the processor 704.

In block 804, the processor 704 obtains a second DSU reading from the object 708 based on the object 708 moving within the defined area 702. The second DSU reading can be based on an echo received via the DSU of the object 708 off the defined area 702 when the object 708 emitted a signal, which can be toward the defined area 702. The second DSU reading can be based on a signal emitted via the DSU 706. Once the DSU of the object 708 obtains the second DSU reading, then that reading is available to the processor 704.

In block 806, the processor 704 take an action based on the first DSU reading and the second DSU reading. The action can include determining a position of the object 708 relative to the defined area 702 or the DSU 706 or a position of the defined area 702 or the DSU 706 relative to the object 708. For example, the position can be determined based on a time of flight when at least one of the first DSU reading or the second DSU reading is based on the echo received via at least one of the DSU 706 or the DSU of the object 708. Note that the position can be estimated or refined, such when other positional information is available, such as via being predetermined. The processor 704 can take an action based on the position. The action can include reading a data structure, writing a datum to a data structure, modifying a datum within a data structure, deleting a datum in a data structure, causing an input device to take an action, causing an output device to take an action, causing a signal to be generated, causing a signal to be sent, causing a signal to be received, or others. For example, the input device can include a camera, a microphone, a user input interface, a touch-enabled display, a receiver, a transceiver, a sensor, a hardware server, or others. For example, the output device can include a display, a speaker, a vibrator, an actuator, a valve, a pump, a transmitter, a transceiver, a hardware server, or others. For example, the signal can be sent outside the defined area 702 or inside the defined area 702. For example, the signal can be sent to or received from the object 708, the defined area 702, or another device, whether local to or remote to the object 708 or the defined area 702. For example, the datum can include information about the position or others.

In block 808, the processor 704 can cause a path of the object 708 within the defined area 702 to be determined based on the position, which can be in real-time. For example, the path can be symbolically depicted over a map. The path can correspond to a path already traveled by the object 708 within the defined area 702. The path can correspond to a path that the object 708 should travel relative to the defined area 702 within the defined area 702 or external of the defined area 702. For example, the path can enable a user of the object 708 to navigate to a specified or predetermined point within the defined area 702 or external to the defined area 702.

In block 810, the processor 704 can cause a map of the defined area 702 to be formed based on the position, which can be in real-time. The map can symbolically depict a perimeter or periphery of the defined area 702 and can symbolically depict the object 708 within the perimeter or periphery. The map can be stored local to or remote from the processor 704 or remote from or local to the object 708 or external to the defined area 702, such as via a server or others. The map, when formed, can be presented via an output device in communication with the processor 704, such as via the output device 112. For example, the map can be displayed via the output device 112.

In block 812, the DSU 706 is included in a first cluster of DSUs, as explained above. As such, the processor 704 can determine a position of the first cluster of DSUs with respect to a second cluster of DSUs, as explained above.

In some embodiments, the processor 704 can cause a content to be output, as explained above. The content can be based on the position or include information about the position. For example, the content can include an audio containing a warning message, a direction message, a navigational content, an instructional content, or others. The processor 704 can cause a content to be modified, as explained above. The content can be based on the position or include information about the position. For example, the content can include an graphic containing a warning message, a direction message, a navigational content, an instructional content, or others. The content can include an augmented reality content based on the position. For example, the augmented reality content can include at least one of images or sound based on the position. For example, the augmented reality content can be a navigational content, a warning content, a directional content, an instructional content, a videogame content, an immersive experience content, an educational content, a shopping content, or others. The augmented reality content can be modifiable based on the position in real-time. The content can include a virtual reality content based on the position. For example, the virtual reality content can include at least one of images or sound based on the position. For example, the augmented reality content can be a navigational content, a warning content, a directional content, an instructional content, a videogame content, an immersive experience content, an educational content, a shopping content, or others. The virtual reality content can be modifiable based on the position in real-time. For example, when the object 708 is a head-mounted display or an eyewear unit, the virtual reality content can help a wearer of the head-mounted display or the eyewear unit to track a position thereof (e.g., inside-out tracking, outside-in tracking, with markers, without markers) or to avoid obstacles, such as via minimize walking into an obstacle, such as the defined area 702 or others.

Figure 9:
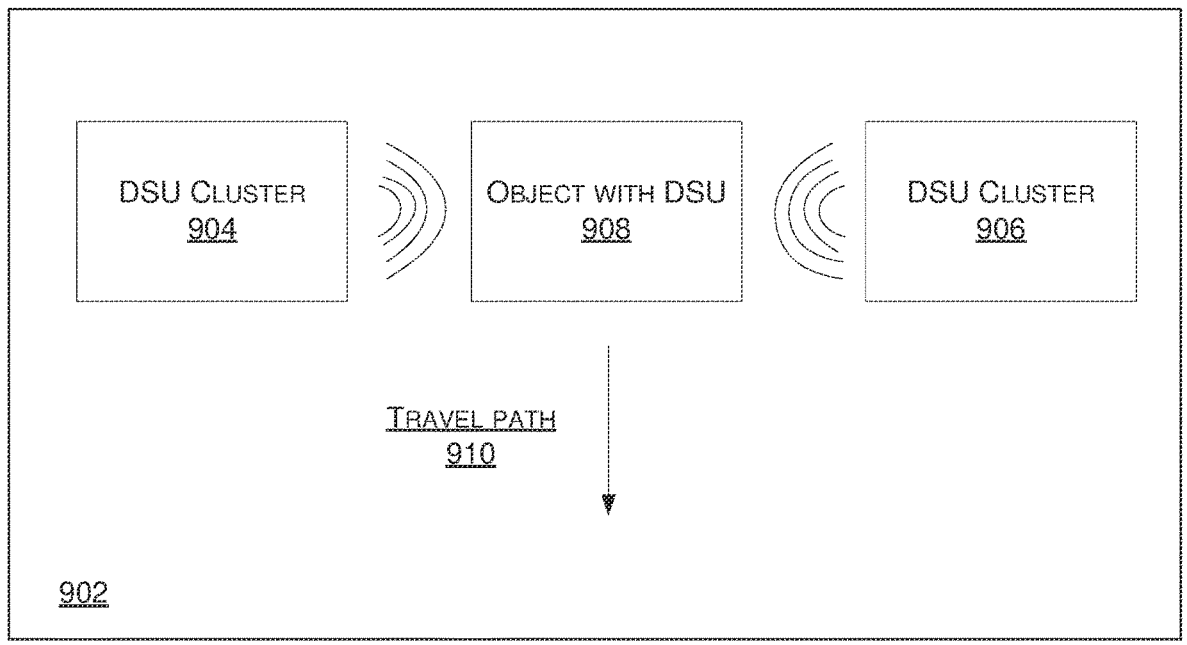
FIG. 9 shows a schematic diagram of an embodiment of a defined area containing a plurality of distance sensing unit clusters tracking an object traveling along the distance sensing unit clusters within the defined area according to this disclosure.
Figure 10:
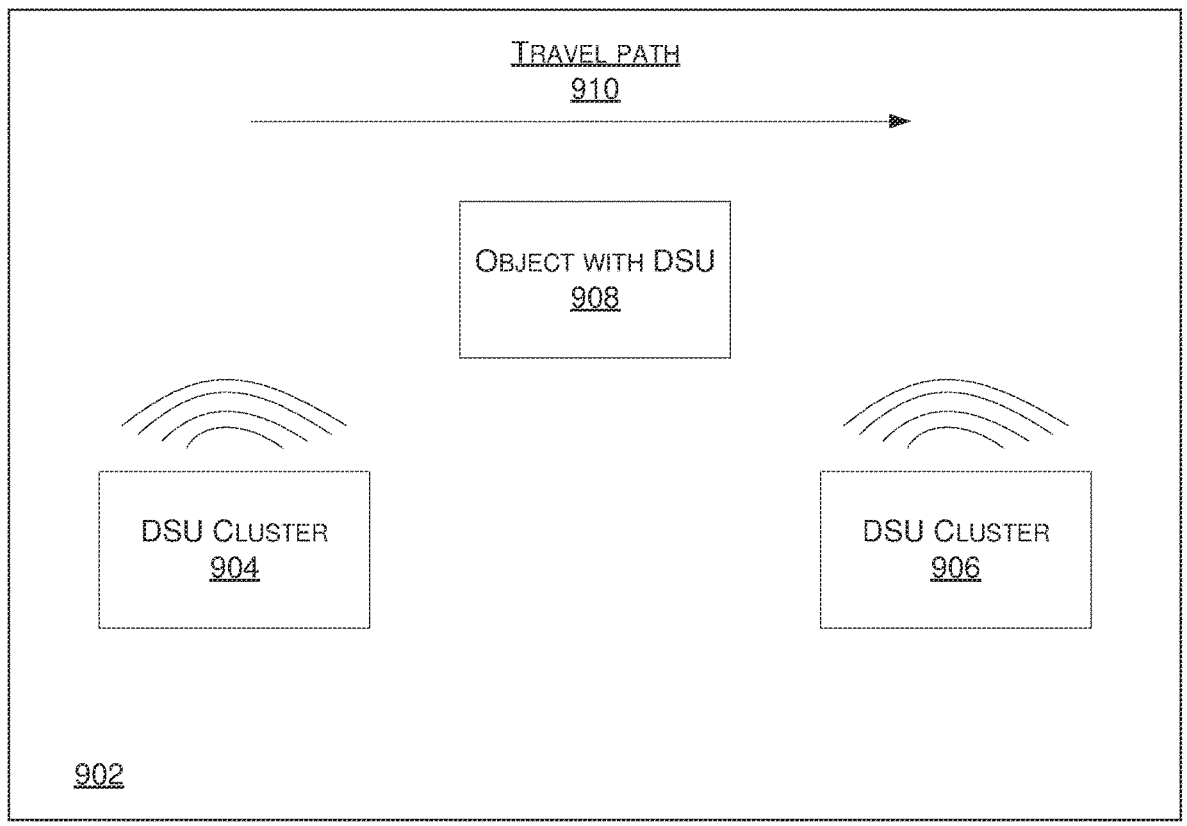
FIG. 10 shows a schematic diagram of an embodiment of a defined area containing a plurality of distance sensing unit clusters tracking an object traveling between the distance sensing unit clusters within the defined area according to this disclosure.

FIG. 9 shows a schematic diagram of an embodiment of a defined area containing a plurality of distance sensing unit clusters tracking an object traveling along the distance sensing unit clusters within the defined area according to this disclosure. FIG. 10 shows a schematic diagram of an embodiment of a defined area containing a plurality of distance sensing unit clusters tracking an object traveling between the distance sensing unit clusters within the defined area according to this disclosure. In particular, each of a system 900A and 900B includes a first DSU cluster 904, as explained above, a second DSU cluster 906, as explained above, and an object 908. The first DSU cluster 602 and the second DSU cluster 604 are in communication with a processor, such as the processor 704, a server, or others. The object 908 can be the housing 202, the object 204, the object 412, or others. The object 908 hosts a DSU. As shown in FIG. 10, in the system 900B, the first DSU cluster 904 and the second DSU cluster 906 are positioned on a same side relative to the object 908, as explained above, regardless whether the object 908 is moving relative to the first DSU cluster 904 and the second DSU cluster 906 or vice versa. As shown in FIG. 9, in the system 900A, the object 908 is positioned between the first DSU cluster 904 and the second DSU cluster 906, as explained above, regardless whether the object 908 is moving relative to the first DSU cluster 904 and the second DSU cluster 906 or vice versa. Therefore, as per FIGS. 9 and 10, if the object 908 is moving along a travel path 910 relative to the first DSU cluster 904 and the second DSU cluster 906 or vice versa, then the first DSU cluster 904 and the second DSU cluster 906 can concurrently obtain a plurality of readings based on the object 908 moving along the travel path 910 and send the readings to the processor. As such, the processor can learn a position of each of the first DSU cluster 904 and the second DSU cluster 906 relative to the object 908, in real-time, while the object 908 is moving along the travel path 910, due to data sharing via the processor. Note that at least one of the system 900A or the system 900B can occur internal to or external to a defined area or without a defined area, as explained above. Also, note that since the object 908 includes the DSU, as explained above, the object 908 can position itself relative to at least one of the first DSU cluster 904 or the second DSU cluster 906, such as in the system 900A and the system 900B. This technique also works where the first DSU cluster 904 and the second DSU cluster 906 are not overlapping each other in coverage, as described above.

In some embodiments, an object can include a land vehicle, such as an automobile, a motorcycle, a bus, a truck, a skateboard, a moped, a scooter, a bicycle, a tank, a tractor, a rail car, a locomotive, or others, where the land vehicle hosts a DSU. The land vehicle can collect a set of data from the DSU and share the set of data, which can be in real-time, with an land vehicle infrastructure item, such as a gas station, a charging station, a toll station, a parking meter, a drive-through-commerce station, an emergency service vehicle, a vehicle, which can be via a V2V protocol, a garage, a parking spot, a hydrant, a street sign, a traffic light, a load cell, an road-based wireless induction charger, a fence, a sprinkler, or others. When the land vehicle infrastructure item also hosts a DSU, then that DSU can also collect a set of data and share that set of data, which can be in real-time, with the land vehicle, as explained above. Such configurations can detect discrepancies, such as objects that the land vehicle infrastructure item is not aware of or does not know enough about. Also, as explained above, the land vehicle with the DSU can detect and thereby track consumer communication units, whether internal or external the land vehicle, such as Wi-Fi enabled devices, such as smartphones, tablets, wearables, infotainment unit, video gaming consoles, toys, or others, in order to determine its position or a position of a consumer communication unit. For example, the land vehicle with the DSU can track its position relative to a plurality of consumer communication units based on where the consumer communication units are typically positioned. As such, when density or frequency of the consumer communications units is increased or decreased from a typical amount, then the land vehicle with the DSU can take an action or avoid taking an action, such as changing speed, slowing down, accelerating, stopping, operating a component of the vehicle, such as a window, infotainment system, sound a horn, siren, or alarm, opening/closing a door, a trunk, a hood, turn on windshield wipers, turn on regular or high beam lights, activate/deactivate parking/brake, navigate on road, swerve, turn, or others.

One or more embodiments of the subject matter described herein relate to distance and/or motion sensing systems and methods, such as radar and/or optical remote sensing systems and methods.

Known radar systems transmit analog electromagnetic waves toward targets and receive echoes of the waves that reflect off the targets. Based on the distance between antennas that transmit the analog waves and the target objects, and/or movement of the target objects, the strength and/or frequency of the received echoes may change. The strength, frequency, and/or time-of-flight of the echoes may be used to derive the distance to the targets and/or movement of the targets.

Some known radar systems are limited in the accuracy at which the systems can measure distances to the targets. For example, the resolution at which these systems may be able to calculate the distance to targets may be relatively large. Moreover, some of these systems may have circuitry, such as a transmit/receive switch, that controls when the systems transmit waves or receive echoes. The switch can require a nonzero period of time to allow the systems to switch from transmitting waves to receiving echoes. This period of time may prevent the systems from being used to measure distances to targets that are relatively close, as the transmitted waves may reflect off the targets back to the receiving antennas before the systems can switch from transmission to reception. Additionally, some known systems have energy leakage from the transmitting antenna to the receiving antenna. This energy leakage can interfere with and/or obscure the measurement of distances to the targets and/or the detection of motion.

In one embodiment, a method (e.g., a method for measuring a separation distance to a target object) is provided. The method includes transmitting an electromagnetic first transmitted signal from a transmitting antenna toward a target object that is a separated from the transmitting antenna by a separation distance. The first transmitted signal includes a first transmit pattern representative of a first sequence of digital bits. The method also includes receiving a first echo of the first transmitted signal that is reflected off the target object, converting the first echo into a first digitized echo signal, and comparing a first receive pattern representative of a second sequence of digital bits to the first digitized echo signal to determine a time of flight of the first transmitted signal and the echo.

In another embodiment, a system (e.g., a sensing system) is provided that includes a transmitter, a receiver, and a correlator device. The transmitter is configured to generate an electromagnetic first transmitted signal that is communicated from a transmitting antenna toward a target object that is a separated from the transmitting antenna by a separation distance. The first transmitted signal includes a first transmit pattern representative of a sequence of digital bits. The receiver is configured to generate a first digitized echo signal that is based on an echo of the first transmitted signal that is reflected off the target object. The correlator device is configured to compare a first receive pattern representative of a second sequence of digital bits to the first digitized echo signal to determine a time of flight of the first transmitted signal and the echo.

In another embodiment, another method (e.g., for measuring a separation distance to a target object) is provided. The method includes transmitting a first transmitted signal having waveforms representative of a first transmit pattern of digital bits and generating a first digitized echo signal based on a first received echo of the first transmitted signal. The first digitized echo signal includes waveforms representative of a data stream of digital bits. The method also includes comparing a first receive pattern of digital bits to plural different subsets of the data stream of digital bits in the first digitized echo signal to identify a subset of interest that more closely matches the first receive pattern than one or more other subsets. The method further includes identifying a time of flight of the first transmitted signal and the first received echo based on a time delay between a start of the data stream in the first digitized echo signal and the subset of interest.

In accordance with one or more embodiments of the presently described subject matter, systems and methods are provided for determining distances between a sensing apparatus and one or more targets. The distances may be determined by measuring times of flight of transmitted signals (e.g., radar, light, or other signals) that reflect off the targets. As one example, a signal that includes a known or designated transmit pattern (such as waveforms that represent a sequence of bits) is transmitted and echoes of this signal are received. This transmit pattern can be referred to as a coarse stage transmit pattern. The echoes may include information representative of the pattern in the transmitted signal. For example, the echoes may be received and digitized to identify a sequence or stream of data that is representative of noise, partial reflections of the transmitted signal off one or more objects other than the target, and reflections off the target.

A coarse stage receive pattern can be compared to the digitized data stream that is based on the received echoes to determine a time of flight of the transmitted signal. The coarse stage receive pattern can be the same as the transmit pattern or differ from the transmit pattern by having a different length and/or sequence of bits (e.g., "0" and "1"). The coarse stage receive pattern is compared to different portions of the digitized data stream to determine which portion of the data stream more closely matches the receive pattern than one or more other portions. For example, the coarse stage receive pattern may be shifted (e.g., with respect to time) along the data stream to identify a portion of the data stream that matches the coarse stage receive pattern. A time delay between the start of the data stream and the matching portion of the coarse stage receive pattern may represent the time of flight of the transmitted signal. This measurement of the time of flight may be used to calculate a separation distance to the target. As described below, this process for measuring the time of flight may be referred to as coarse stage determination of the time of flight. The coarse stage determination may be performed once or several times in order to measure the time of flight. For example, a single "burst" of a transmitted signal may be used to measure the time of flight, or several "bursts" of transmitted signals (having the same or different transmit patterns) may be used.

A fine stage determination may be performed in addition to or in place of the coarse stage determination. The fine stage determination can include transmitting one or more additional signals (e.g., "bursts") toward the target and generating one or more baseband echo signals based on the received echoes of the signals. The additional signals may include a fine stage transmit pattern that is the same or different pattern as the coarse stage transmit pattern. The fine stage determination can use the time of flight measured by the coarse stage determination (or as input by an operator) and compare a fine stage receive pattern that is delayed by the measured time of flight to a corresponding portion of the data stream. For example, instead of shifting the fine stage receive pattern along all or a substantial portion of the baseband echo signal, the fine stage receive pattern (or a portion thereof) can be time shifted by an amount that is equal to or based on the time delay measured by the coarse stage determination. Alternatively, the fine stage receive pattern may be shifted along all or a substantial portion of the baseband echo signal. The time shifted fine stage receive pattern can be compared to the baseband echo signal to determine an amount of overlap or, alternatively, an amount of mismatch between the waveforms of the time-shifted fine stage receive pattern and the baseband echo signal. This amount of overlap or mismatch may be translated to an additional time delay. The additional time delay can be added with the time delay measured by the coarse stage determination to calculate a fine stage time delay. The fine stage time delay can then be used to calculate a time of flight and separation distance to the target.

In one embodiment, an ultrafine stage determination may be performed in addition to or in place of the coarse stage determination and/or the fine stage determination. The ultrafine stage determination can involve a similar process as the fine stage determination, but using a different component of the receive pattern and/or the data stream. For example, the fine stage determination may examine the in-phase (I) component or channel of the receive pattern and the data stream to measure the overlap or mismatch between the receive pattern and the data stream. The ultrafine stage determination can use the quadrature (Q) component or channel of the receive pattern and the data stream to measure an additional amount of overlap or mismatch between the waveforms of the receive pattern and the data stream. Alternatively, the ultrafine stage determination may separately examine the I channel and Q channel of the receive pattern and the data stream. The use of I and Q channels or components is provided as one example embodiment. Alternatively, one or more other channels or components may be used. For example, a first component or channel and a second component or channel may be used, where the first and second components or channels are phase shifted relative to each other by an amount other than ninety degrees.

The amounts of overlap or mismatch calculated by the ultrafine stage determination can be used to calculate an additional time delay that can be added to the time delays from the coarse stage and/or the fine stage to determine a time of flight and/or separation distance to the target. Alternatively or additionally, the amount of overlap or mismatch between the waveforms in the I channel and Q channel can be examined to resolve phases of the echoes in order to detect motion of the target.

Alternatively or additionally, the ultrafine stage determination may involve a similar process as the coarse stage determination. For example, the coarse stage determination may examine the I channel of the receive pattern and the data stream to determine correlation values of different subsets of the data stream and, from those correlation values, determine a subset of interest and a corresponding time-of-flight, as described herein. The ultrafine stage determination can use the Q channel of the receive pattern and the data stream to determine correlation values of different subsets of the data stream and, from those correlation values, determine a subset of interest and a time-of-flight. The times-of-flight from the I channel and Q channel can be combined (e.g., averaged) to calculate a time of flight and/or separation distance to the target. The correlation values calculated by the ultrafine stage determination can be used to calculate an additional time delay that can be added to the time delays from the coarse stage and/or the fine stage to determine a time of flight and/or separation distance to the target. Alternatively or additionally, the correlation values of the waveforms in the I channel and Q channel can be examined to resolve phases of the echoes in order to calculate separation distance or motion of the target.

The coarse, fine, and ultrafine stage determinations can be performed independently (e.g., without performing one or more of the other stages) and/or together. The fine and ultrafine stage determinations can be performed in parallel (e.g., with the fine stage determination examining the I channel and the ultrafine stage determination examining the Q channel) or sequentially (e.g., with the ultrafine stage determination examining both the I and Q channels). The coarse and ultrafine stage determinations can be performed in parallel (e.g., with the coarse stage determination examining the I channel and the ultrafine stage determination examining the Q channel) or sequentially (e.g., with the ultrafine stage determination examining both the I and Q channels).

In one embodiment, a receive pattern mask may be applied to the digitized data stream to remove (e.g., mask off) or otherwise change one or more portions or segments of the data stream. The masked data stream can then be compared to the receive pattern of the corresponding stage determination (e.g., coarse stage, fine stage, or ultrafine stage) to measure the time of flight, as described herein.

In one embodiment, the various patterns (e.g., the coarse stage transmit pattern, the fine stage transmit pattern, the coarse stage receive pattern, the fine stage receive pattern, and/or the receive pattern mask) may be the same. Alternatively, one or more (or all) of these patterns may differ from each other. For example, different ones of the patterns may include different sequences of bits and/or lengths of the sequences. The various patterns (e.g., the coarse stage transmit pattern, the fine stage transmit pattern, the coarse stage receive pattern, the fine stage receive pattern, and/or the receive pattern mask) that are used in the ultrafine stage may also differ from those used in the coarse or fine stages alone, and from each other.

Figure 11:
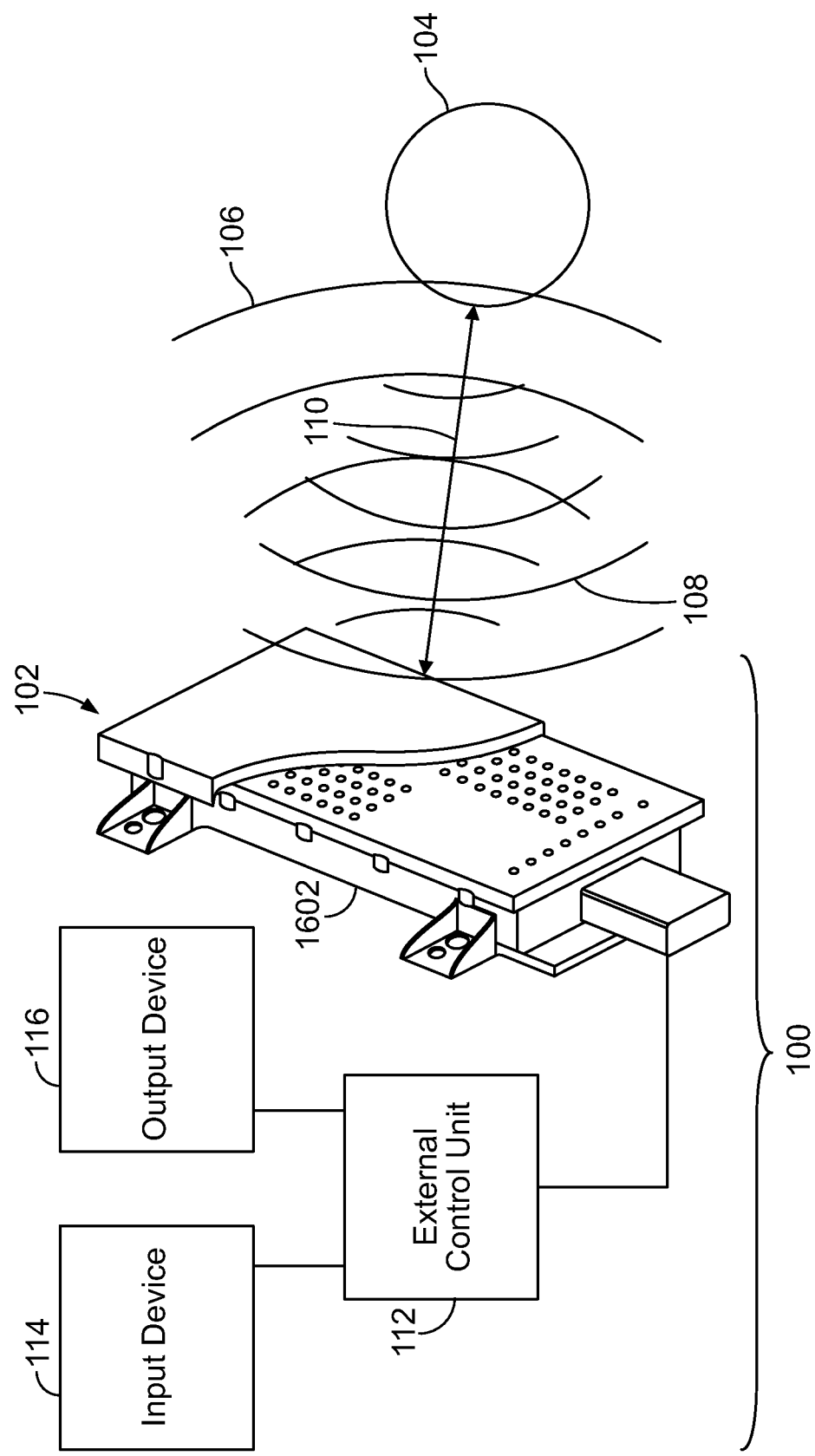
FIG. 11 is a schematic diagram of one embodiment of a sensing system.

FIG. 11 is a schematic diagram of one embodiment of a sensing system 100. The system 100 can be used to determine distances between a sensing apparatus 102 and one or more objects 104 and/or to identify movement of the one or more target objects 104, where the target objects 104 may have positions that may change or that are not known. In one embodiment, the sensing apparatus 102 includes a radar system that transmits electromagnetic pulse sequences as transmitted signals 106 toward the target object 104 that are at least partially reflected as echoes 108. Alternatively, the sensing apparatus 102 can include an optical sensing system, such as a Light Detection And Ranging (LIDAR) system, that transmits light toward the target object 104 as the transmitted signals 106 and receives reflections of the light off the target object 104 as the echoes 108. In another embodiment, another method of transmission may be used, such as sonar, in order to transmit the transmitted signals 106 and receive the echoes 108.

A time of flight of the transmitted signals 106 and echoes 108 represents the time delay between transmission of the transmitted signals 106 and receipt of the echoes 108 off of the target object 104. The time of flight can be proportional to a distance between the sensing apparatus 102 and the target object 104. The sensing apparatus 102 can measure the time of flight of the transmitted signals 106 and echoes 108 and calculate a separation distance 110 between the sensing apparatus 102 and the target object 104 based on the time of flight.

The sensing system 100 may include a control unit 112 ("External Control Unit" in FIG. 1) that directs operations of the sensing apparatus 102. The control unit 112 can include one or more logic-based hardware devices, such as one or more processors, controllers, and the like. The control unit 112 shown in FIG. 11 may represent the hardware (e.g., processors) and/or logic of the hardware (e.g., one or more sets of instructions for directing operations of the hardware that is stored on a tangible and non-transitory computer readable storage medium, such as computer software stored on a computer memory). The control unit 112 can be communicatively coupled (e.g., connected so as to communicate data signals) with the sensing apparatus 102 by one or more wired and/or wireless connections. The control unit 112 may be remotely located from the sensing apparatus 102, such as by being disposed several meters away, in another room of a building, in another building, in another city block, in another city, in another county, state, or country (or other geographic boundary), and the like.

In one embodiment, the control unit 112 can be communicatively coupled with several sensing assemblies 102 located in the same or different places. For example, several sensing assemblies 102 that are remotely located from each other may be communicatively coupled with a common control unit 112. The control unit 112 can separately send control messages to each of the sensing assemblies 102 to individually activate (e.g., turn ON) or deactivate (e.g., turn OFF) the sensing assemblies 102. In one embodiment, the control unit 112 may direct the sensing assembly 102 to take periodic measurements of the separation distance 110 and then deactivate for an idle time to conserve power.

In one embodiment, the control unit 112 can direct the sensing apparatus 102 to activate (e.g., turn ON) and/or deactivate (e.g., turn OFF) to transmit transmitted signals 106 and receive echoes 108 and/or to measure the separation distances 110. Alternatively, the control unit 112 may calculate the separation distance 110 based on the times of flight of the transmitted signals 106 and echoes 108 as measured by the sensing apparatus 102 and communicated to the control unit 112. The control unit 112 can be communicatively coupled with an input device 114, such as a keyboard, electronic mouse, touchscreen, microphone, stylus, and the like, and/or an output device 116, such as a computer monitor, touchscreen (e.g., the same touchscreen as the input device 114), speaker, light, and the like. The input device 114 may receive input data from an operator, such as commands to activate or deactivate the sensing apparatus 102. The output device 116 may present information to the operator, such as the separation distances 110 and/or times of flight of the transmitted signals 106 and echoes 108. The output device 116 may also connect to a communications network, such the internet.

The form factor of the sensing assembly 102 may have a wide variety of different shapes, depending on the application or use of the system 100. The sensing assembly 102 may be enclosed in a single enclosure 1602, such as an outer housing. The shape of the enclosure 1602 may depend on factors including, but not limited to, needs for power supply (e.g., batteries and/or other power connections), environmental protection, and/or other communications devices (e.g., network devices to transmit measurements or transmit/receive other communications). In the illustrated embodiment, the basic shape of the sensing assembly 102 is a rectangular box. The size of the sensing assembly 102 can be relatively small, such as three inches by six inches by two inches (7.6 centimeters by 15.2 centimeters by 5.1 centimeters), 70 mm by 140 mm by 10 mm, or another size. Alternatively, the sensing assembly 102 may have one or more other dimensions.

Figure 12:
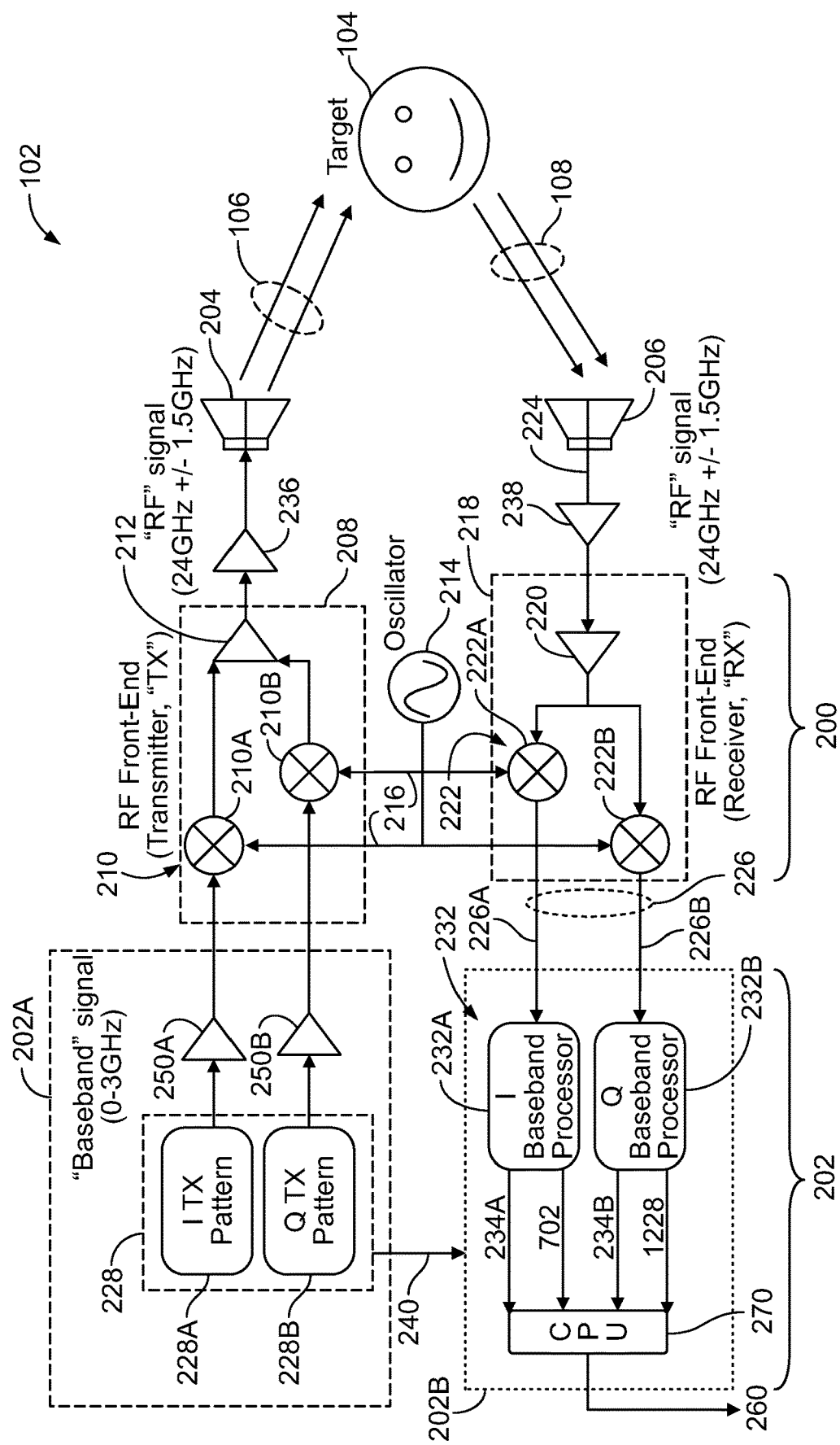
FIG. 12 is a schematic diagram of one embodiment of a sensing apparatus shown in FIG. 11.

FIG. 12 is a schematic diagram of one embodiment of the sensing apparatus 102. The sensing apparatus 102 may be a direct-sequence spread-spectrum radar device that uses a relatively high speed digital pulse sequence that directly modulates a carrier signal, which is then transmitted as the transmitted signals 106 toward a target object 104. The echoes 108 may be correlated to the same pulse sequence in the transmitted signals 106 in order to determine the time of flight of the transmitted signals 106 and echoes 108. This time of flight can then be used to calculate the separation distance 110 (shown in FIG. 11).

The sensing apparatus 102 includes a front end 200 and a back end 202. The front end 200 may include the circuitry and/or other hardware that transmits the transmitted signals 106 and receives the reflected echoes 108. The back end 202 may include the circuitry and/or other hardware that forms the pulse sequences for the transmitted signals 106 or generates control signals that direct the front end 200 to form the pulse sequences for inclusion in the transmitted signals 106, and/or that processes (e.g., analyzes) the echoes 108 received by the front end 200. Both the front end 200 and the back end 202 may be included in a common housing. For example (and as described below), the front end 200 and the back end 202 may be relatively close to each other (e.g., within a few centimeters or meters) and/or contained in the same housing. Alternatively, the front end 200 may be remotely located from the back end 202. The components of the front end 200 and/or back end 202 are schematically shown as being connected by lines and/or arrows in FIG. 12, which may be representative of conductive connections (e.g., wires, busses, and the like) and/or wireless connections (e.g., wireless networks).

The front end 200 includes a transmitting antenna 204 and a receiving antenna 206. The transmitting antenna 204 transmits the transmitted signals 106 toward the target object 104 and the receiving antenna 206 receives the echoes 108 that are at least partially reflected by the target object 104. As one example, the transmitting antenna 204 may transmit radio frequency (RF) electromagnetic signals as the transmitted signals 106, such as RF signals having a frequency of 24 gigahertz ("GHz")±1.5 GHz. Alternatively, the transmitting antenna 204 may transmit other types of signals, such as light, and/or at another frequency. In the case of light transmission the antenna may be replaced by a laser or LED or other device. The receiver may be replaced by a photo detector or photodiode.

A front end transmitter 208 ("RF Front-End," "Transmitter, and/or "TX" in FIG. 12) of the front end 200 is communicatively coupled with the transmitting antenna 204. The front end transmitter 208 forms and provides the transmitted signal 106 to the transmitting antenna 204 so that the transmitting antenna 204 can communicate (e.g., transmit) the transmitted signal 106. In the illustrated embodiment, the front end transmitter 208 includes mixers 210A, 210B and an amplifier 212. Alternatively, the front end transmitter 208 may not include the amplifier 212. The mixers 210A, 210B combine (e.g., modulate) a pulse sequence or pattern provided by the back end 202 with an oscillating signal 216 (e.g., a carrier signal) to form the transmitted signal 106 that is communicated by the transmitting antenna 204. In one embodiment, the mixers 210A, 210B multiply pattern signals 230A, 230B ("Baseband signal" in FIG. 12) received from one or more transmit (TX) pattern generators 228A, 228B by the oscillating signal 216. The pattern signal 230 includes the pattern formed by the pattern code generator 228. As described below, the pattern signal 230 can include several bits arranged in a known or designated sequence.

An oscillating device 214 ("Oscillator" in FIG. 12) of the front end 200 generates the oscillating signal 216 that is communicated to the mixers 210A, 210B. As one example, the oscillating device 214 may include or represent a voltage controlled oscillator (VCO) that generates the oscillating signal 216 based on a voltage signal that is input into the oscillating device 214, such as by a power source (e.g., battery) disposed in the sensing apparatus 102 and/or as provided by the control unit 112 (shown in FIG. 11). The amplifier 212 may increase the strength (e.g., gain) of the transmitted signal 106.

In the illustrated embodiment, the mixer 210A receives an in-phase (I) component or channel of a pattern signal 230A and mixes the I component or channel of the pattern signal 230A with the oscillating signal 216 to form an I component or channel of the transmitted signal 106. The mixer 210B receives a quadrature (Q) component or channel of a pattern signal 230B and mixes the I component or channel of the pattern signal 230B with the oscillating signal 216 to form a Q component or channel of the transmitted signal 106.

The transmitted signal 106 (e.g., one or both of the I and Q channels) is generated when the TX baseband signal 230 flows to the mixers 210. The digital output gate 250 may be disposed between the TX pattern generator and the mixers 210 for added control of the TX baseband signal 230. After a burst of one or more transmitted signals 106 is transmitted by the transmitting antenna 204, the sensing assembly 102 may switch from a transmit mode (e.g., that involves transmission of the transmitted signals 106) to a receive mode to receive the echoes 108 off the target object 104. In one embodiment, the sensing assembly 102 may not receive or sense the echoes 108 when in the transmit mode and/or may not transmit the transmitted signals 106 when in the receive mode. When the sensing assembly 102 switches from the transmit mode to the receive mode, the digital output gate 250 can reduce the amount of time that the transmit signal 106 generated by the transmitter 208 to the point that it is eliminated (e.g., reduced to zero strength). For example, the gate 250 can include tri-state functionality and a differential high-pass filter (which is represented by the gate 250). The baseband signal 230 passes through the filter before the baseband signal 230 reaches the upconversion mixer 210. The gate 250 can be communicatively coupled with, and controlled by, the control unit 112 (shown in FIG. 11) so that the control unit 112 can direct the filter of the gate 250 to enter into a tri-state (e.g., high-impedance) mode when the transmitted signal 106 (or burst of several transmitted signals 106) is transmitted and the sensing assembly 102 is to switch over to receive the echoes 108. The highpass filter across differential outputs of the gate 250 can reduce the input transmit signal 106 relatively quickly after the tri-state mode is initiated. As a result, the transmitted signal 106 is prevented from flowing to the transmitting antenna 204 and/or from leaking to the receiving antenna 206 when the sensing assembly 102 receives the echoes 108.

A front end receiver 218 ("RF Front-End," "Receiver," and/or "RX") of the front end 200 is communicatively coupled with the receiving antenna 206. The front end receiver 218 receives an echo signal 224 representative of the echoes 108 (or data representative of the echoes 108) from the receiving antenna 206. The echo signal 224 may be an analog signal in one embodiment. The receiving antenna 206 may generate the echo signal 224 based on the received echoes 108. In the illustrated embodiment, an amplifier 238 may be disposed between the receive antenna 206 and the front end receiver 218. The front end receiver 218 can include an amplifier 220 and mixers 222A, 222B. Alternatively, one or more of the amplifiers 220, 238 may not be provided. The amplifiers 220, 238 can increase the strength (e.g., gain) of the echo signal 224. The mixers 222A, 222B may include or represent one or more mixing devices that receive different components or channels of the echo signal 224 to mix with the oscillating signal 216 (or a copy of the oscillating signal 216) from the oscillating device 214. For example, the mixer 222A can combine the analog echo signal 224 and the I component of the oscillating signal 216 to extract the I component of the echo signal 224 into a first baseband echo signal 226A that is communicated to the back end 202 of the sensing apparatus 102. The first baseband echo signal 226A may include the I component or channel of the baseband echo signal. The mixer 222B can combine the analog echo signal 224 and the Q component of the oscillating signal 216 to extract the Q component of the analog echo signal 224 into a second baseband echo signal 226B that is communicated to the back end 202 of the sensing apparatus 102. The second baseband echo signal 226B can include the Q component or channel of the baseband echo signal. In one embodiment, the echo signals 226A, 226B can be collectively referred to as a baseband echo signal 226. In one embodiment, the mixers 222A, 222B can multiply the echo signal 224 by the I and Q components of the oscillating signal 216 to form the baseband echo signals 226A, 226B.

The back end 202 of the sensing apparatus 102 includes a transmit (TX) pattern code generator 228 that generates the pattern signal 230 for inclusion in the transmitted signal 106. The transmit pattern code generator 228 includes the transmit code generators 228A, 228B. In the illustrated embodiment, the transmit code generator 228A generates the I component or channel pattern signal 230A ("I TX Pattern" in FIG. 12) while the transmit code generator 228B generates the Q component or channel pattern signal 230B ("Q TX Pattern" in FIG. 12). The transmit patterns generated by the transmit pattern code generator 228 can include a digital pulse sequence having a known or designated sequence of binary digits, or bits. A bit includes a unit of information that may have one of two values, such as a value of one or zero, high or low, ON or OFF, +1 or −1, and the like. Alternatively, a bit may be replaced by a digit, a unit of information that may have one of three or more values, and the like. The pulse sequence may be selected by an operator of the system 100 shown in FIG. 11 (such as by using the input device 114 shown in FIG. 11), may be hard-wired or programmed into the logic of the pattern code generator 228, or may otherwise be established.

The transmit pattern code generator 228 creates the pattern of bits and communicates the pattern in the pattern signals 230A, 230B to the front end transmitter 208. The pattern signals 230A, 230B may be individually or collectively referred to as a pattern signal 230. In one embodiment, the pattern signal 230 may be communicated to the front end transmitter 208 at a frequency that is no greater than 3 GHz. Alternatively, the pattern signal 230 may be communicated to the front end transmitter 208 at a greater frequency. The transmit pattern code generator 228 also communicates the pattern signal 230 to a correlator device 232 ("Correlator" in FIG. 12). For example, the pattern code generator 228 may generate a copy of the pattern signal that is sent to the correlator device 232.

The backend section 202 includes or represents hardware (e.g., one or more processors, controllers, and the like) and/or logic of the hardware (e.g., one or more sets of instructions for directing operations of the hardware that is stored on a tangible and non-transitory computer readable storage medium, such as computer software stored on a computer memory). The RX backend section 202B receives the pattern signal 230 from the pattern code generator 228 and the baseband echo signal 226 (e.g., one or more of the signals 226A, 226B) from the front end receiver 200. The RX backend section 202B may perform one or more stages of analysis of the baseband echo signal 226 in order to determine the separation distance 110 and/or to track and/or detect movement of the target object 104.

The stages of analysis can include a coarse stage, a fine stage, and/or an ultrafine stage, as described above. In the coarse stage, the baseband processor 232 compares the pattern signal 230 with the baseband echo signal 226 to determine a coarse or estimated time of flight of the transmitted signals 106 and the echoes 108. For example, the baseband processor 232 can measure a time delay of interest between the time when a transmitted signal 106 is transmitted and a subsequent time when the pattern in the pattern signal 230 (or a portion thereof) and the baseband echo signal 226 match or substantially match each other, as described below. The time delay of interest may be used as an estimate of the time of flight of the transmitted signal 106 and corresponding echo 108.

In the fine stage, the sensing assembly 102 can compare a replicated copy of the pattern signal 230 with the baseband echo signal 226. The replicated copy of the pattern signal 230 may be a signal that includes the pattern signal 230 delayed by the time delay of interest measured during the coarse stage. The sensing assembly 102 compares the replicated copy of the pattern signal 230 with the baseband echo signal 226 to determine a temporal amount or degree of overlap or mismatch between the replicated pattern signal and the baseband echo signal 226. This temporal overlap or mismatch can represent an additional portion of the time of flight that can be added to the time of flight calculated from the coarse stage. In one embodiment, the fine stage examines I and/or Q components of the baseband echo signal 226 and the replicated pattern signal.

In the ultrafine stage, the sensing assembly 102 also can examine the I and/or Q component of the baseband echo signal 226 and the replicated pattern signal to determine a temporal overlap or mismatch between the I and/or Q components of the baseband echo signal 226 and the replicated pattern signal. The temporal overlap or mismatch of the Q components of the baseband echo signal 226 and the replicated pattern signal may represent an additional time delay that can be added to the time of flight calculated from the coarse stage and the fine stage (e.g., by examining the I and/or Q components) to determine a relatively accurate estimation of the time of flight. Alternatively or additionally, the ultrafine stage may be used to precisely track and/or detect movement of the target object 104 within the bit of interest. The terms "fine" and "ultrafine" are used to mean that the fine stage may provide a more accurate and/or precise (e.g., greater resolution) calculation of the time of flight ($t_F$) and/or the separation distance 110 relative to the coarse stage and that the ultrafine stage may provide a more accurate and/or precise (e.g., greater resolution) calculation of the time of flight ($t_F$) and/or the separation distance 110 relative to the fine stage and the coarse stage. Alternatively or additionally, the time lag of the waveforms in the I channel and Q channel can be examined to resolve phases of the echoes in order to calculate separation distance or motion of the target.

As described above, the ultrafine stage determination may involve a similar process as the coarse stage determination. For example, the coarse stage determination may examine the I channel of the receive pattern and the data stream to determine correlation values of different subsets of the data stream and, from those correlation values, determine a subset of interest and a corresponding time-of-flight, as described herein. The ultrafine stage determination can use the I and/or Q channel of the receive pattern and the data stream to determine correlation values of different subsets of the data stream and, from those correlation values, determine a subset of interest and a time-of-flight. The times-of-flight from the I channel and Q channel can be combined (e.g., averaged) to calculate a time of flight and/or separation distance to the target. The correlation values calculated by the ultrafine stage determination can be used to calculate an additional time delay that can be added to the time delays from the coarse stage and/or the fine stage to determine a time of flight and/or separation distance to the target. Alternatively or additionally, the correlation values of the waveforms in the I channel and Q channel can be examined to resolve phases of the echoes in order to calculate separation distance or motion of the target.

The backend 202 can include a first baseband processor 232A ("I Baseband Processor" in FIG. 12) and a second baseband processor 232B ("Q Baseband Processor" in FIG. 12). The first baseband processor 232A may examine the I component or channel of the echo signal 226A and the second baseband processor 232B may examine the Q component or channel of the echo signal 226B. The backend 202 can provide a measurement signal 234 as an output from the analysis of the baseband echo signal 226. In one embodiment, the measurement signal 234 includes an I component or channel measurement signal 234A from the first baseband processor 232A and a Q component or channel measurement signal 234B from the second baseband processor 232B. The measurement signal 234 may include the separation distance 110 and/or the time of flight. The total position estimate 260 can be communicated to the control unit 112 (shown in FIG. 11) so that the control unit 112 can use data or information representative of the separation distance 110 and/or the time of flight for one or more other uses, calculations, and the like, and/or for presentation to an operator on the output device 116 (shown in FIG. 11).

As described below, a correlation window that also includes the pattern (e.g., the pulse sequence of bits) or a portion thereof that was transmitted in the transmitted signal 106 may be compared to the baseband echo signal 226. The correlation window may be progressively shifted or delayed from a location in the baseband echo signal 226 representative of a start of the echo signal 226 (e.g., a time that corresponds to the time at which the transmitted signal 106 is transmitted, but which may or may not be the exact beginning of the baseband echo signal) and successively, or in any other order, compared to different subsets or portions of the baseband echo signal 226. Correlation values representative of degrees of match between the pulse sequence in the correlation window and the subsets or portions of the baseband echo signal 226 can be calculated and a time delay of interest (e.g., approximately the time of flight) can be determined based on the time difference between the start of the baseband echo signal 226 and one or more maximum or relatively large correlation values. The maximum or relatively large correlation value may represent at least partial reflection of the transmitted signals 106 off the target object 104, and may be referred to as a correlation value of interest.

As used herein, the terms "maximum," "minimum," and forms thereof, are not limited to absolute largest and smallest values, respectively. For example, while a "maximum" correlation value can include the largest possible correlation value, the "maximum" correlation value also can include a correlation value that is larger than one or more other correlation values, but is not necessarily the largest possible correlation value that can be obtained. Similarly, while a "minimum" correlation value can include the smallest possible correlation value, the "minimum" correlation value also can include a correlation value that is smaller than one or more other correlation values, but is not necessarily the smallest possible correlation value that can be obtained.

The time delay of interest can then be used to calculate the separation distance 110 from the coarse stage. For example, in one embodiment, the separation distance 110 may be estimated or calculated as:

$$d = \frac{t_F \times c}{2} \qquad \text{(Equation \#1)}$$

where d represents the separation distance 110, $t_F$ represents the time delay of interest (calculated from the start of the baseband echo signal 226 to the identification of the correlation value of interest), and c represents the speed of light. Alternatively, c may represent the speed at which the transmitted signals 106 and/or echoes 108 move through the medium or media between the sensing apparatus 102 and the target object 104. In another embodiment, the value of $t_F$ and/or c may be modified by a calibration factor or other factor in order to account for portions of the delay between transmission of the transmitted signals 106 and receipt of the echoes 108 that are not due to the time of flight of the transmitted signals 106 and/or echoes 108.

Figure 13A:
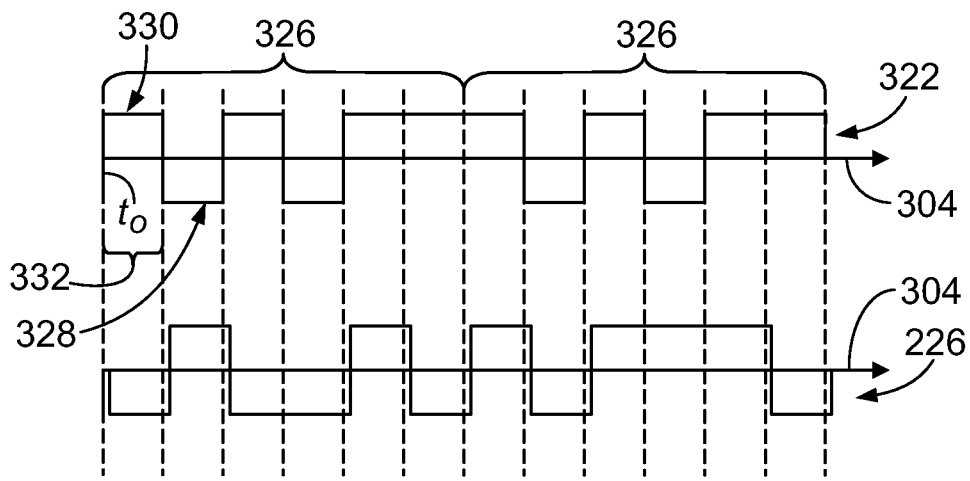
FIG. 13A is a schematic diagram of a coarse stage determination of a time of flight for a transmitted signal and corresponding echo in accordance with one embodiment.
Figure 13B:
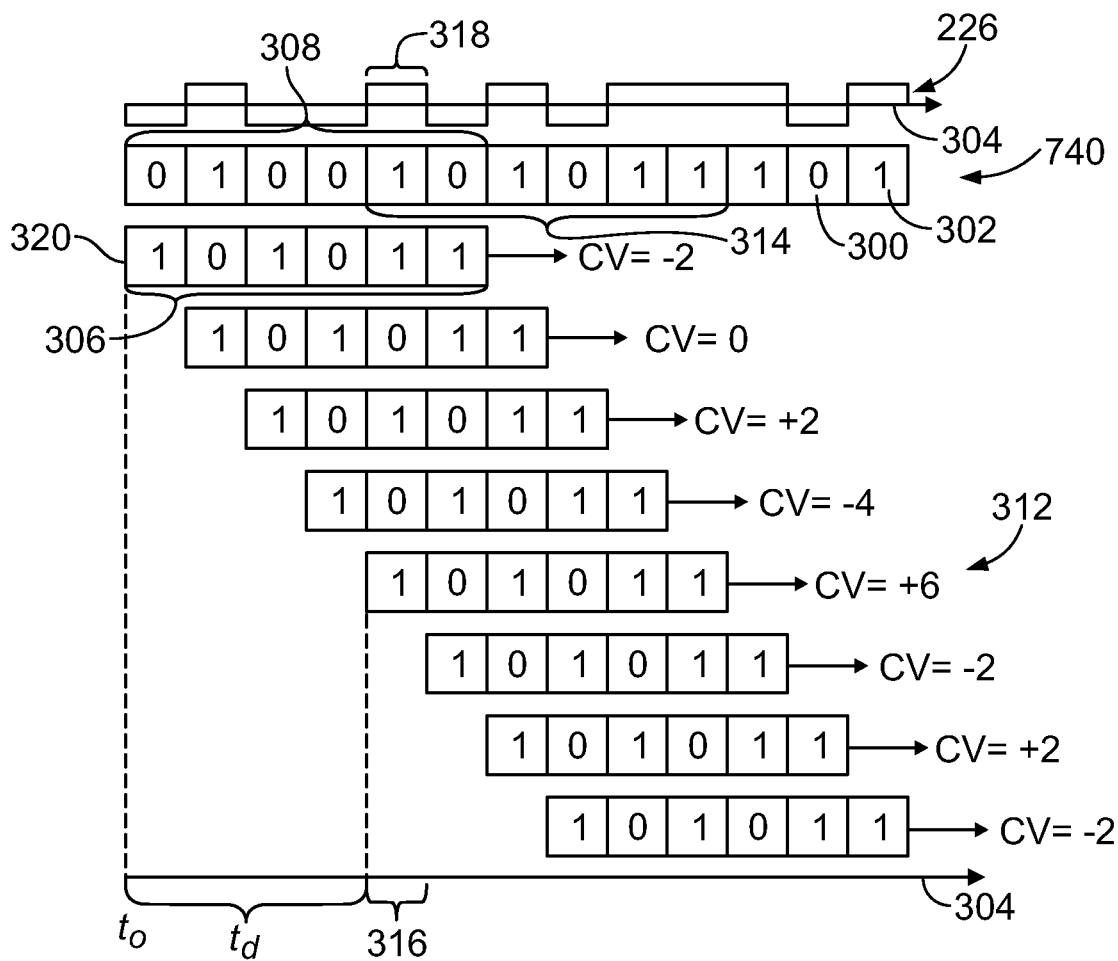
FIG. 13B is another schematic diagram of the coarse stage determination of a time of flight for a transmitted signal and corresponding echo in accordance with one embodiment.

With continued reference to the sensing assembly 102 shown in FIG. 12, FIGS. 13A and 13B are schematic diagrams of a coarse stage determination of a time of flight for a transmitted signal 106 and corresponding echo 108 in accordance with one embodiment. By "coarse," it is meant that one or more additional measurements or analyses of the same or different echo signal 224 (shown in FIG. 12) that is generated from the reflected echoes 108 may be performed to provide a more accurate and/or precise measurement of the time of flight ($t_F$) and/or separation distance 110. The use of the term "coarse" is not intended to mean that the measurement technique described above is inaccurate or imprecise. As described above, the pattern generated by the pattern code generator 228 and the baseband echo signal 226 are received by the RX backend 202B. The baseband echo signal 226 can be formed by mixing (e.g., multiplying) the echo signal 224 by the oscillating signal 216 in order to translate the echo signal 224 into a baseband signal.

FIG. 13A illustrates a square waveform transmitted signal 322 representative of the transmitted signal 106 (shown in FIG. 11) and the digitized echo signal 226. The echo signal 226 shown in FIG. 13A may represent the I component or channel of the echo signal 226 (e.g., the signal 226A). The signals 322, 226 are shown alongside horizontal axes 304 representative of time. The transmitted signal 322 includes pattern waveform segments 326 that represent the pattern that is included in the transmitted signal 106. In the illustrated embodiment, the pattern waveform segments 326 correspond to a bit pattern of 101011, where 0 represents a low value 328 of the transmitted signal 322 and 1 represents a high value 330 of the transmitted signal 322. Each of the low or high values 328, 330 occurs over a bit time 332. In the illustrated embodiment, each pattern waveform segment 326 includes six bits (e.g., six 0s and 1s), such that each pattern waveform segment 326 extends over six bit times 332. Alternatively, one or more of the pattern waveform segments 326 may include a different sequence of low or high values 328, 330 and/or occur over a different number of bit times 332.

The baseband echo signal 226 includes in one embodiment a sequence of square waves (e.g., low and high values 328, 330), but the waves may have other shapes. The echo signal 226 may be represented as a digital echo signal 740 (shown and described below in connection with FIG. 13B). As described below, different portions or subsets of the digital echo signal 740 can be compared to the pattern sequence of the transmitted signal 106 (e.g., the pattern waveform segments 326) to determine a time delay of interest, or estimated time of flight. As shown in FIG. 13A, the square waves (e.g., low and high values 328, 330) of the baseband echo signal 226 may not exactly line up with the bit times 332 of the transmitted signal 322.

FIG. 13B illustrates the digitized echo signal 740 of FIG. 13A along the axis 304 that is representative of time. As shown in FIG. 13B, the digitized echo signal 740 may be schematically shown as a sequence of bits 300, 302. Each bit 300, 302 in the digitized echo signal 740 can represent a different low or high value 328, 330 (shown in FIG. 13A) of the digitized echo signal 740. For example, the bit 300 (e.g., "0") can represent low values 328 of the digitized echo signal 740 and the bit 302 (e.g., "1") can represent high values 330 of the digitized echo signal 740.

The baseband echo signal 226 begins at a transmission time (to) of the axis 304. The transmission time (to) may correspond to the time at which the transmitted signal 106 is transmitted by the sensing assembly 102. Alternatively, the transmission time (to) may be another time that occurs prior to or after the time at which the transmitted signal 106 is transmitted.

The baseband processor 232 obtains a receive pattern signal 240 from the pattern generator 228, similar to the transmit pattern (e.g., in the signal 230) that is included in the transmitted signal 106, the receive pattern signal 240 may include a waveform signal representing a sequence of bits, such as a digital pulse sequence receive pattern 306 shown in FIG. 13.

The baseband processor 232 compares the receive pattern 306 to the echo signal 226. In one embodiment, the receive pattern 306 is a copy of the transmit pattern of bits that is included in the transmitted signal 106 from the pattern code generator 228, as described above. Alternatively, the receive pattern 306 may be different from the transmit pattern that is included in the transmitted signal 106. For example, the receive pattern 306 may have a different sequence of bits (e.g., have one or more different waveforms that represent a different sequence of bits) and/or have a longer or shorter sequence of bits than the transmit pattern. The receive pattern 306 may be represented by one or more of the pattern waveform segments 326, or a portion thereof, shown in FIG. 13A.

The baseband processor 232 uses all or a portion of the receive pattern 306 as a correlation window 320 that is compared to different portions of the digitized echo signal 740 in order to calculate correlation values ("CV") at the different positions. The correlation values represent different degrees of match between the receive pattern 306 and the digitized echo signal 740 across different subsets of the bits in the digitized echo signal 740. In the example illustrated in FIG. 13, the correlation window 320 includes six bits 300, 302. Alternatively, the correlation window 320 may include a different number of bits 300, 302. The correlator device 731 can temporally shift the correlation window 320 along the echo signal 740 in order to identify where (e.g., which subset of the echo signal 226) more closely matches the pattern in the correlation window 320 more than one or more (or all) of the other portions of the echo signal 740. In one embodiment, when operating in the coarse stage determination, the first baseband processor 232A compares the correlation window 320 to the I component or channel of the echo signal 226.

For example, the correlator device 731 may compare the bits in the correlation window 320 to a first subset 308 of the bits 300, 302 in the digitized echo signal 740. For example, the correlator device 731 can compare the receive pattern 306 with the first six bits 300, 302 of the digitized echo signal 740. Alternatively, the correlator device 731 can begin by comparing the receive pattern 306 with a different subset of the digitized echo signal 740. The correlator device 731 calculates a first correlation value for the first subset 308 of bits in the digitized echo signal 740 by determining how closely the sequence of bits 300, 302 in the first subset 308 match the sequence of bits 300, 302 in the receive pattern 306.

In one embodiment, the correlator device 731 assigns a first value (e.g., +1) to those bits 300, 302 in the subset of the digitized echo signal 740 being compared to the correlation window 320 that match the sequence of bits 300, 302 in the correlation window 320 and a different, second value (e.g., −1) to those bits 300, 302 in the subset of the digitized echo signal 740 being examined that do not match the sequence of bits 300, 302 in the correlation window 320. Alternatively, other values may be used. The correlator device 731 may then sum these assigned values for the subset of the digitized echo signal 740 to derive a correlation value for the subset.

With respect to the first subset 308 of bits in the digitized echo signal, only the fourth bit (e.g., zero) and the fifth bit (e.g., one) match the fourth bit and the fifth bit in the correlation window 320. The remaining four bits in the first subset 308 do not match the corresponding bits in the correlation window 320. As a result, if +1 is assigned to the matching bits and −1 is assigned to the mismatching bits, then the correlation value for the first subset 308 of the digitized echo signal 740 is calculated to be −2. On the other hand, if +1 is assigned to the bits and 0 is assigned to the mismatching bits, then the correlation value for the first subset 308 of the digitized echo signal 740 is calculated to be +2. As described above, other values may be used instead of +1 and/or −1.

The correlator device 731 then shifts the correlation window 320 by comparing the sequence of bits 300, 302 in the correlation window 320 to another (e.g., later or subsequent) subset of the digitized echo signal 740. In the illustrated embodiment, the correlator device 731 compares the correlation window 320 to the sixth through seventh bits 300, 302 in the digitized echo signal 740 to calculate another correlation value. As shown in FIG. 13, the subsets to which the correlation window 320 is compared may at least partially overlap with each other. For example, each of the subsets to which the correlation window 320 is compared may overlap with each other by all but one of the bits in each subset. In another example, each of the subsets may overlap with each other by a fewer number of the bits in each subset, or even not at all.

The correlator device 731 may continue to compare the correlation window 320 to different subsets of the digitized echo signal 740 to calculate correlation values for the subsets. In continuing with the above example, the correlator device 731 calculates the correlation values shown in FIG. 13 for the different subsets of the digitized echo signal 740.

In FIG. 13, the correlation window 320 is shown shifted below the subset to which the correlation window 320 is compared, with the correlation value of the subset to which the correlation window 320 is compared shown to the right of the correlation window 320 (using values of +1 for matches and −1 for mismatches). As shown in the illustrated example, the correlation value associated with the fifth through tenth bits 300, 302 in the digitized echo signal 226 has a correlation value (e.g., +6) that is larger than one or more other correlation values of the other subsets, or that is the largest of the correlation values.

In another embodiment, the receive pattern 306 that is included in the correlation window 320 and that is compared to the subsets of the digitized echo signal 740 may include a portion, and less than the entirety, of the transmit pattern that is included in the transmitted signal 106 (shown in FIG. 11). For example, if the transmit pattern in the transmitted signal 106 includes a waveform representative of a digital pulse sequence of thirteen (or a different number) of bits 300, 302, the correlator device 731 may use a receive pattern 306 that includes less than thirteen (or a different number) of the bits 300, 302 included in the transmit pattern.

In one embodiment, the correlator device 731 can compare less than the entire receive pattern 306 to the subsets by applying a mask to the receive pattern 306 to form the correlation window 320 (also referred to as a masked receive pattern). With respect to the receive pattern 306 shown in FIG. 13, the correlator device 731 may apply a mask comprising the sequence "000111" (or another mask) to the receive pattern 306 to eliminate the first three bits 300, 302 from the receive pattern 306 such that only the last three bits 300, 302 are compared to the various subsets of the digitized echo signal 740. The mask may be applied by multiplying each bit in the mask by the corresponding bit in the receive pattern 306. In one embodiment, the same mask also is applied to each of the subsets in the digitized echo signal 740 when the correlation window 320 is compared to the subsets.

The correlator 731 may identify a correlation value that is largest, that is larger than one or more correlation values, and/or that is larger than a designated threshold as a correlation value of interest 312. In the illustrated example, the fifth correlation value (e.g., +6) may be the correlation value of interest 312. The subset or subsets of bits in the digitized echo signal 740 that correspond to the correlation value of interest 312 may be identified as the subset or subsets of interest 314. In the illustrated example, the subset of interest 314 includes the fifth through tenth bits 300, 302 in the digitized echo signal 740. In this example, if the start of the subset of interest is used to identify the subset of interest then the delay of interest would be five. Multiple subsets of interest may be identified where the transmitted signals 106 (shown in FIG. 11) are reflected off of multiple target objects 104 (shown in FIG. 11), such as different target objects 104 located different separation distances 110 from the sensing assembly 102.

Each of the subsets of the digitized echo signal 740 may be associated with a time delay ($t_d$) between the start of the digitized echo signal 740 (e.g., $t_O$) and the beginning of the first bit in each subset of the digitized echo signal 740. Alternatively, the beginning of the time delay ($t_d$) for the subset can be measured from another starting time (e.g., a time before or after the start of the digitized echo signal 740 ($t_O$) and/or the end of the time delay ($t_d$) may be at another location in the subset, such as the middle or at another bit of the subset.

The time delay ($t_d$) associated with the subset of interest may represent the time of flight ($t_F$) of the transmitted signal 106 that is reflected off a target object 104. Using Equation #1 above, the time of flight can be used to calculate the separation distance 110 between the sensing assembly 102 and the target object 104. In one embodiment, the time of flight ($t_F$) may be based on a modified time delay ($t_d$), such as a time delay that is modified by a calibration factor to obtain the time of flight ($t_F$). As one example, the time of flight ($t_F$) can be corrected to account for propagation of signals and/or other processing or analysis. Propagation of the echo signal 224, formation of the baseband echo signal 226, propagation of the baseband echo signal 226, and the like, through the components of the sensing assembly 102 can impact the calculation of the time of flight ($t_F$). The time delay associated with a subset of interest in the baseband echo signal 226 may include the time of flight of the transmitted signals 106 and echoes 108, and also may include the time of propagation of various signals in the analog and digital blocks (e.g., the correlator device 731 and/or the pattern code generator 228 and/or the mixers 210 and/or the amplifier 238) of the system 100.

In order to determine the propagation time of data and signals through these components, a calibration routine can be employed. A measurement can be made to a target of known distance. For example, one or more transmitted signals 106 can be sent to the target object 104 that is at a known separation distance 110 from the transmit and/or receiving antennas 204, 206. The calculation of the time of flight for the transmitted signals 106 can be made as described above, and the time of flight can be used to determine a calculated separation distance 110. Based on the difference between the actual, known separation distance 110 and the calculated separation distance 110, a measurement error that is based on the propagation time through the components of the sensing assembly 102 may be calculated. This propagation time may then be used to correct (e.g., shorten) further times of flight that are calculated using the sensing assembly 102.

In one embodiment, the sensing assembly 102 may transmit several bursts of the transmitted signal 106 and the correlator device 731 may calculate several correlation values for the digitized echo signals 740 that are based on the reflected echoes 108 of the transmitted signals 106. The correlation values for the several transmitted signals 106 may be grouped by common time delays ($t_d$), such as by calculating the average, median, or other statistical measure of the correlation values calculated for the same or approximately the same time delays ($t_d$). The grouped correlation values that are larger than other correlation values or that are the largest may be used to more accurately calculate the time of flight ($t_F$) and separation distance 110 relative to using only a single correlation value and/or burst.

Figure 14:
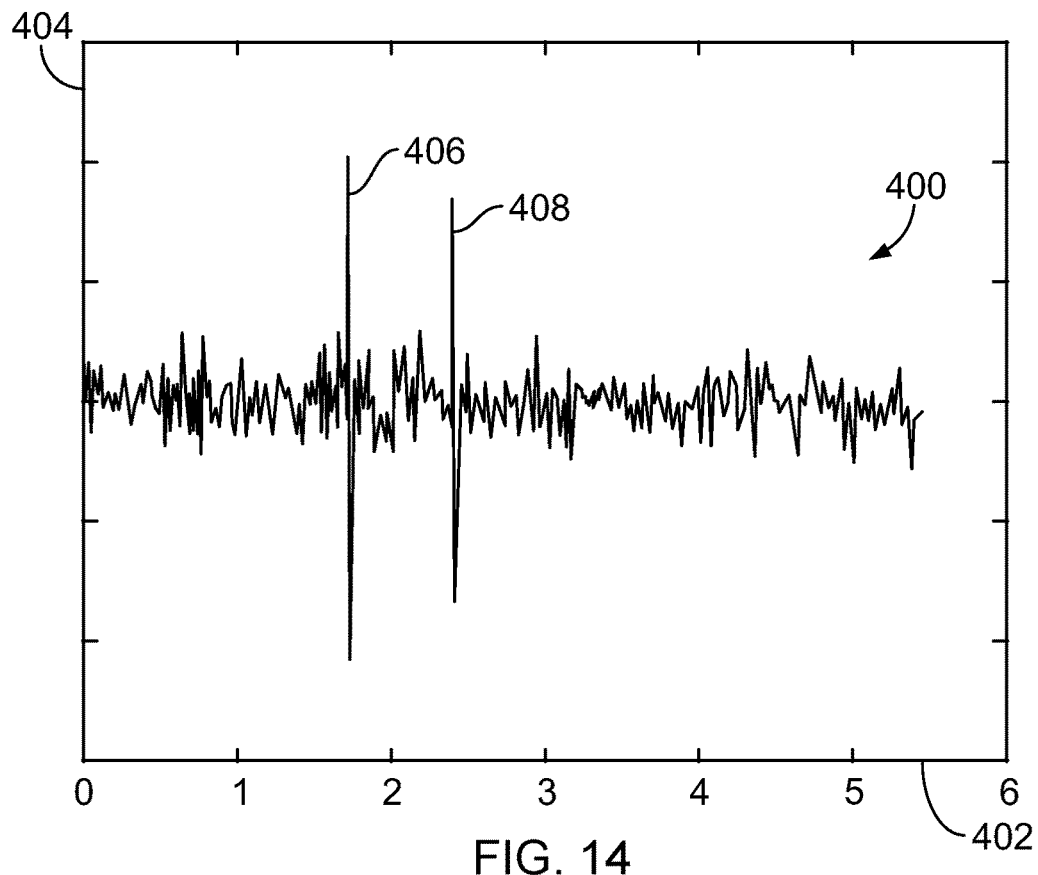
FIG. 14 illustrates one example of correlation values that are calculated and averaged over several transmitted signals shown in FIG. 11.

FIG. 14 illustrates one example of correlation values that are calculated and averaged over several transmitted signals 106 shown in FIG. 11. The correlation values 400 are shown alongside a horizontal axis 402 representative of time (e.g., time delays or times of flight) and a vertical axis 404 representative of the magnitude of the correlation values 400. As shown in FIG. 14, several peaks 406, 408 may be identified based on the multiple correlation values 400 that are grouped over several transmitted signals 106. The peaks 406, 408 may be associated with one or more target objects 104 (shown in FIG. 11) off which the transmitted signals 106 reflected. The time delays associated with one or more of the peaks 406, 408 (e.g., the time along the horizontal axis 402) can be used to calculate the separation distance(s) 110 of one or more of the target objects 104 associated with the peaks 406, 408, as described above.

Figure 15:
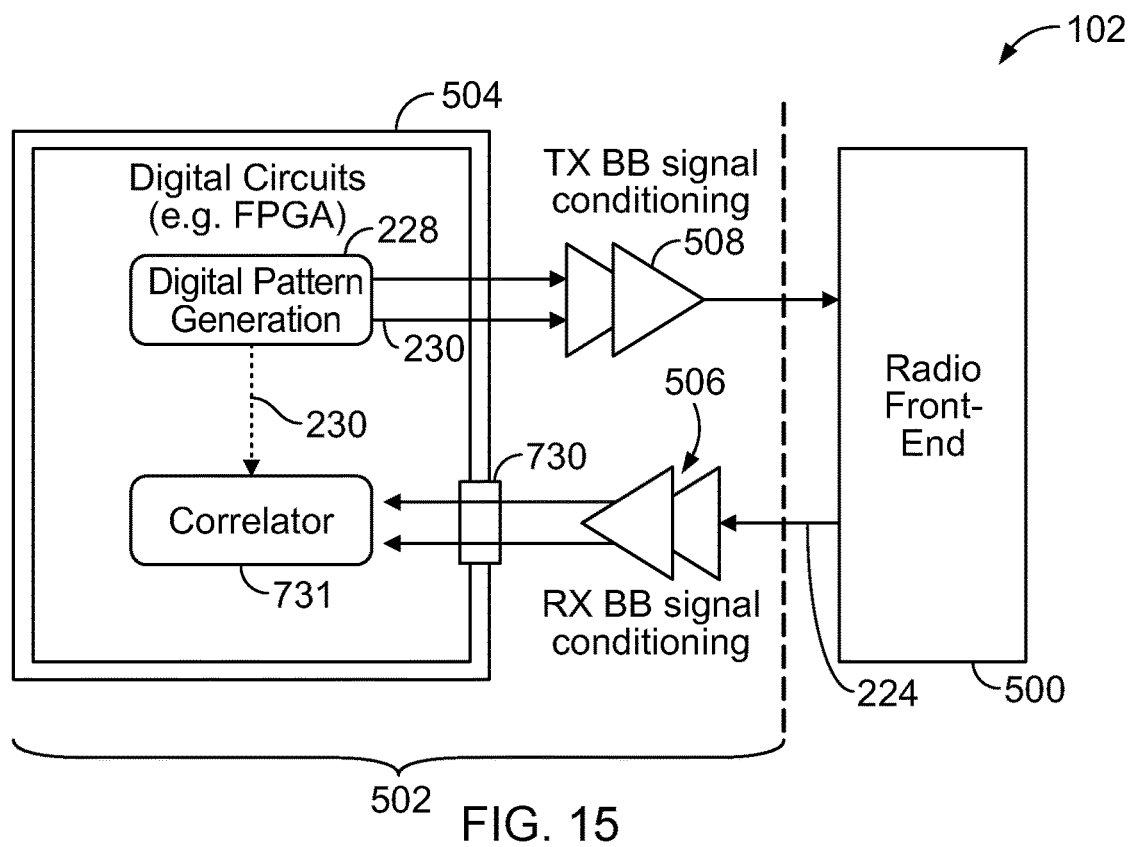
FIG. 15 is another schematic diagram of part or one implementation of the sensing assembly shown in FIG. 12.

FIG. 15 is another schematic diagram of the sensing assembly 102 shown in FIG. 12. The sensing assembly 102 is illustrated in FIG. 5 as including a radio front end 500 and a processing back end 502. The radio front end 500 may include at least some of the components included in the front end 200 (shown in FIG. 12) of the sensing assembly 102 and the processing back end 502 may include at least some of the components of the back end 202 (shown in FIG. 12) of the sensing assembly 102, and/or one or more components (e.g., the front end transmitter 208 and/or receiver 218 shown in FIG. 12) of the front end 200.

As described above, the received echo signal 224 may be conditioned by circuits 506 (e.g., by the front end receiver 218 shown in FIG. 12) that are used for high-speed optical communications systems in one embodiment. This conditioning may include amplification and/or quantization only. The signal 224 may then pass to a digitizer 730 that creates a digital signal based on the signal 224, which is then passed to the correlator 731 (described below) for comparison to the original transmit sequence to extract time-of-flight information. The correlator device 731 and the conditioning circuits may be collectively referred to as the baseband processing section of the sensing apparatus 102.

Also as described above, the pattern code generator 228 generates the pattern (e.g., a digital pulse sequence) that is communicated in the pattern signal 230. The digital pulse sequence may be relatively high speed in order to make the pulses shorter and increase accuracy and/or precision of the system 100 (shown in FIG. 11) and/or to spread the transmitted radio energy over a very wide band. If the pulses are sufficiently short enough, the bandwidth may be wide enough to be classified as Ultra-wideband (UWB). As a result, the system 100 can be operated in the 22-27 GHz UWB band and/or the 3-10 GHz UWB band that are available worldwide (with regional variations) for unlicensed operation.

In one embodiment, the digital pulse sequence is generated by one or more digital circuits, such as a relatively low-power Field-Programmable Gate Array (FPGA) 504. The FPGA 504 may be an integrated circuit designed to be configured by the customer or designer after manufacturing to implement a digital or logical system. As shown in FIG. 15, the FPGA 504 can be configured to perform the functions of the pulse code generator 228 and the correlator device 731. The pulse sequence can be buffered and/or conditioned by one or more circuits 508 and then passed directly to the transmit radio of the front end 500 (e.g., the front end transmitter 208).

Figure 16:
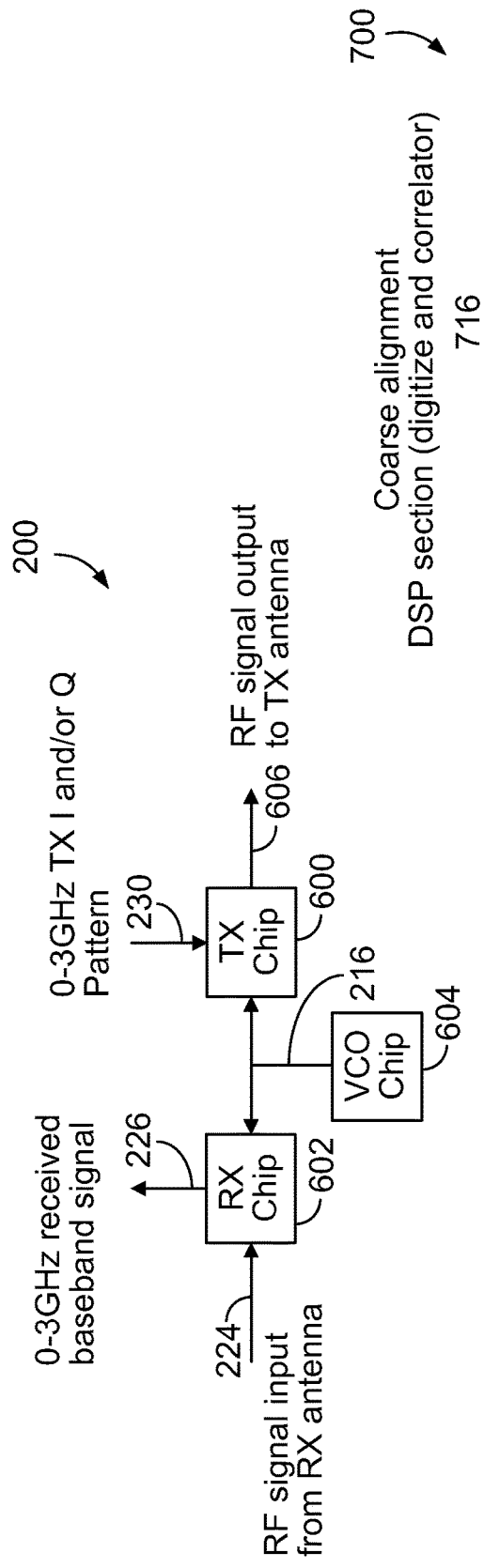
FIG. 16 is a schematic diagram of one embodiment of a front end of the sensing assembly shown in FIG. 12.

FIG. 16 is a schematic diagram of one embodiment of the front end 200 of the sensing assembly 102 shown in FIG. 12. The front end 200 of the sensing assembly 102 may alternatively be referred to as the radio front end 500 (shown in FIG. 15) or the "radio" of the sensing assembly 102. In one embodiment, the front end 200 includes a direct-conversion transmitter 600 ("TX Chip" in FIG. 16) and receiver 602 ("RX Chip" in FIG. 6), with a common frequency reference generator 604 ("VCO Chip" in FIG. 16). The transmitter 600 may include or represent the front end transmitter 208 (shown in FIG. 12) and the receiver 602 may include or represent the front end receiver 218 (shown in FIG. 12).

The common frequency reference generator 604 may be or include the oscillator device 214 shown in FIG. 12. The common frequency reference generator 604 may be a voltage controlled oscillator (VCO) that produces a frequency reference signal as the oscillating signal 216. In one embodiment, the frequency of the reference signal 216 is one half of a designated or desired carrier frequency of the transmitted signal 106 (shown in FIG. 11). Alternatively, the reference signal 216 may be another frequency, such as the same frequency as the carrier frequency, an integer multiple or divisor of the carrier frequency, and the like.

In one embodiment, the reference generator 604 emits a frequency reference signal 216 that is a sinusoidal wave at one half the frequency of the carrier frequency. The reference signal is split equally and delivered to the transmitter 600 and the receiver 602. Although the reference generator 604 may be able to vary the frequency of the reference signal 216 according to an input control voltage, the reference generator 604 can be operated at a fixed control voltage in order to cause the reference generator 604 to output a fixed frequency reference signal 216. This is acceptable since frequency coherence between the transmitter 600 and the receiver 602 may be automatically maintained. Furthermore, this arrangement can allow for coherence between the transmitter 600 and the receiver 602 without the need for a phase locked loop (PLL) or other control structure that may limit the accuracy and/or speed at which the sensing assembly 102 operates. In another embodiment a PLL may be added to for other purposes, such as stabilizing the carrier frequency or otherwise controlling the carrier frequency.

The reference signal 216 can be split and sent to the transmitter 600 and receiver 602. The reference signal 216 drives the transmitter 600 and receiver 602, as described above. The transmitter 600 may drive (e.g., activate to transmit the transmitted signal 106 shown in FIG. 11) the transmitting antenna 204 (shown in FIG. 12). The receiver 602 may receive the return echo signal through the receiving antenna 206 (shown in FIG. 12) that is separate from the transmitting antenna 204. This can reduce the need for a T/R (transmit/receive) switch disposed between the transmitter 600 and the receiver 602. The transmitter 600 can up-convert the timing reference signal 216 and transmit an RF transmit signal 606 through the transmitting antenna 204 in order to drive the transmitting antenna 204 to transmit the transmitted signal 106 (shown in FIG. 11). In one embodiment, the output of the transmitter 600 can be at a maximum frequency or a frequency that is greater than one or more other frequencies in the sensing assembly 102 (shown in FIG. 11). For example, the transmit signal 606 from the transmitter 600 can be at the carrier frequency. This transmit signal 606 can be fed directly to the transmitting antenna 204 to minimize or reduce the losses incurred by the transmit signal 606.

In one embodiment, the transmitter 600 can take separate in-phase (I) and quadrature (Q) digital patterns or signals from the pattern generator 604 and/or the pattern code generator 228 (shown in FIG. 12). This can allow for increased flexibility in the transmit signal 606 and/or can allow for the transmit signal 606 to be changed "on the fly," or during transmission of the transmitted signals 106.

As described above, the receiver 602 may also receive a copy of the frequency reference signal 216 from the reference generator 604. The returning echoes 108 (shown in FIG. 11) are received by the receiving antenna 206 (shown in FIG. 12) and may be fed directly to the receiver 602 as the echo signal 224. This arrangement can give the system maximum or increased possible input signal-to-noise ratio (SNR), since the echo signal 224 propagates a minimal or relatively small distance before the echo signal 224 enters the receiver 602. For example, the echo signal 224 may not propagate or otherwise go through a switch, such as a transmit/receive (TX/RX) switch.

The receiver 602 can down-convert a relatively wide block of frequency spectrum centered on the carrier frequency to produce the baseband signal (e.g., the baseband echo signal 226 shown in FIG. 12). The baseband signal may then be processed by a baseband analog section of the sensing assembly 102 (shown in FIG. 11), such as the correlator device 731 (shown in FIG. 12) and/or one or more other components, to extract the time of flight ($t_F$). As described above, this received echo signal 224 includes a delayed copy of the TX pattern signal. The delay may be representative of and/or is a measurement of the round-trip, time-of-flight of the transmitted signal 106 and the corresponding echo 108.

The frequency reference signal 216 may contain or comprise two or more individual signals such as the I and Q components that are phase shifted relative to each other. The phase shifted signals can also be generated internally by the transmitter 600 and the receiver 602. For example, the signal 216 may be generated to include two or more phase shifted components (e.g., I and Q components or channels), or may be generated and later modified to include the two or more phase shifted components.

In one embodiment, the front end 200 provides relatively high isolation between the transmit signal 606 and the echo signal 224. This isolation can be achieved in one or more ways. First, the transmit and receive components (e.g., the transmitter 600 and receiver 602) can be disposed in physically separate chips, circuitry, or other hardware. Second, the reference generator 604 can operate at one half the carrier frequency so that feed-through can be reduced. Third, the transmitter 600 and the receiver 602 can have dedicated (e.g., separate) antennas 204, 206 that are also physically isolated from each other. This isolation can allow for the elimination of a TX/RX switch that may otherwise be included in the system 100. Avoiding the use of the TX/RX switch also can remove the switch-over time between the transmitting of the transmitted signals 106 and the receipt of the echoes 108 shown in FIG. 11. Reducing the switch-over time can enable the system 100 to more accurately and/or precisely measure distances to relatively close target objects 104. For example, reducing this switch-over time can reduce the threshold distance that may be needed between the sensing assembly 102 and the target object 104 in order for the sensing assembly 102 to measure the separation distance 110 shown in FIG. 11 before transmitted signals 106 are received as echoes 108.

Figure 17:
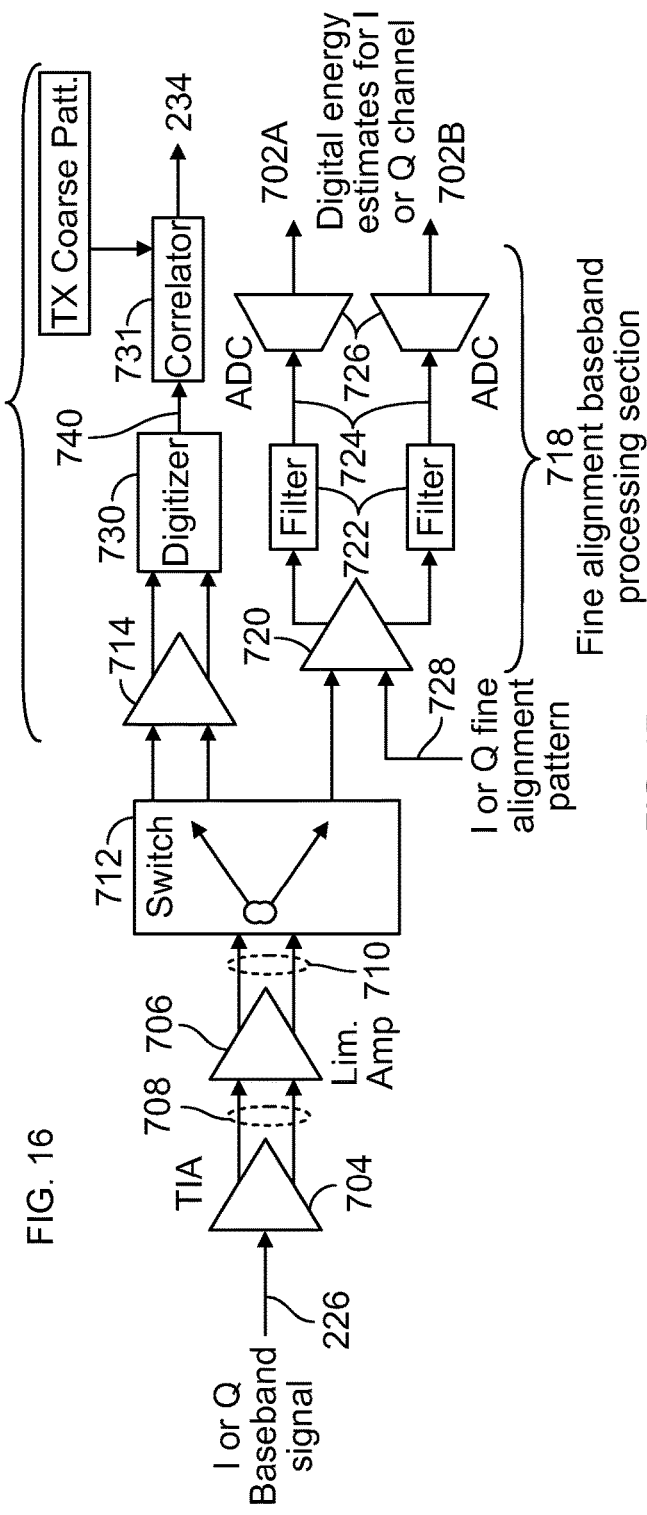
FIG. 17 is a circuit diagram of one embodiment of a base-band processing system of the system shown in FIG. 11.

FIG. 17 is a circuit diagram of one embodiment of a baseband processing system 232 of the system 100 shown in FIG. 11. In one embodiment, the baseband processing system 232 is included in the sensing assembly 102 (shown in FIG. 11) or is separate from the system 100 but operatively coupled with the system 100 to communicate one or more signals between the systems 100, 232. For example, the baseband processing system 232 can be coupled with the front end receiver 218 (shown in FIG. 12) to receive the echo signal 226 (e.g., the echo signal 226A and/or 226B). For example, at least part of the system 232 may be disposed between the front end receiver 218 and the Control and Processing Unit (CPU) 270 shown in FIG. 17. The baseband processing system 232 may provide for the coarse and/or fine and/or ultrafine stage determinations described above.

In one embodiment, the system 100 (shown in FIG. 11) includes a fine transmit pattern (e.g., a transmit pattern for fine stage determination) in the transmitted signal 106 following the coarse stage determination. For example, after transmitting a first transmit pattern in a first transmitted signal 106 (or one or more bursts of several transmitted signals 106) to use the coarse stage and calculate a time delay in the echo signal 226 (and/or the time of flight), a second transmit pattern can be included in a subsequent, second transmitted signal 106 for the fine stage determination of the time of flight (or a portion thereof). The transmit pattern in the coarse stage may be the same as the transmit pattern in the fine stage. Alternatively, the transmit pattern of the fine stage may differ from the transmit pattern of the coarse stage, such as by including one or more different waveforms or bits in a pulse sequence pattern of the transmitted signal 106.

The baseband processing system 232 receives the echo signal 226 (e.g., the I component or channel of the echo signal 226A and/or the Q component or channel of the echo signal 226B from the front end receiver 218 (shown in FIG. 11). The echo signal 226 that is received from the front end receiver 218 is referred to as "I or Q Baseband signal" in FIG. 17. As described below, the system 232 also may receive a receive pattern signal 728 ("I or Q fine alignment pattern" in FIG. 17) from the pattern code generator 228 (shown in FIG. 12). Although not shown in FIG. 12 or 17, the pattern code generator 228 and the system 232 may be coupled by one or more conductive pathways (e.g., busses, wires, cables, and the like) to communicate with each other. The system 232 can provide output signals 702A, 702B (collectively or individually referred to as an output signal 702 and shown as "Digital energy estimates for I or Q channel" in FIG. 17). In one embodiment, the baseband processing system 232 is an analog processing system. In another embodiment, the baseband processing system 232 is a hybrid analog and digital system comprised of components and signals that are analog and/or digital in nature.

The digitized echo signal 226 that is received by the system 232 may be conditioned by signal conditioning components of the baseband processing system 232, such as by modifying the signals using a conversion amplifier 704 (e.g., an amplifier that converts the baseband echo signal 226, such as by converting current into a voltage signal). In one embodiment, the conversion amplifier 704 includes or represents a trans-impedance amplifier, or "TIA" in FIG. 17). The signal conditioning components can include a second amplifier 706 (e.g., a limiting amplifier or "Lim. Amp" in FIG. 17). The conversion amplifier 704 can operate on a relatively small input signal that may be a single-ended (e.g., non-differential) signal to produce a differential signal 708 (that also may be amplified and/or buffered by the conversion amplifier 704 and/or one or more other components). This differential signal 708 may still be relatively small in amplitude. In one embodiment, the differential signal 708 is then passed to the second amplifier 706 that increases the gain of the differential signal 708. Alternatively, the second amplifier 706 may not be included in the system 232 if the conversion amplifier 704 produces a sufficiently large (e.g., in terms of amplitude and/or energy) output differential signal 710. The second amplifier 706 can provide relatively large gain and can tolerate saturated outputs 710. There may be internal positive feedback in the second amplifier 706 so that even relatively small input differences in the differential signal 708 can produce a larger output signal 710. In one embodiment, the second amplifier 706 quantizes the amplitude of the received differential signal 708 to produce an output signal 710.

The second amplifier 706 may be used to determine the sign of the input differential signal 708 and the times at which the sign changes from one value to another. For example, the second amplifier 706 may act as an analog-to-digital converter with only one bit precision in one embodiment. Alternatively, the second amplifier 706 may be a high-speed analog-to-digital converter that periodically samples the differential signal 708 at a relatively fast rate. Alternatively, the second amplifier may act as an amplitude quantizer while preserving timing information of the baseband signal 226. The use of a limiting amplifier as the second amplifier 706 can provide relatively high gain and relatively large input dynamic range. As a result, relatively small differential signals 708 that are supplied to the limiting amplifier can result in a healthy (e.g., relatively high amplitude and/or signal-to-noise ratio) output signal 710. Additionally, larger differential signals 708 (e.g., having relatively high amplitudes and/or energies) that may otherwise result in another amplifier being overdriven instead result in a controlled output condition (e.g., the limiting operation of the limiting amplifier). The second amplifier 706 may have a relatively fast or no recovery time, such that the second amplifier 706 may not go into an error or saturated state and may continue to respond to the differential signals 708 that are input into the second amplifier 706. When the input differential signal 708 returns to an acceptable level (e.g., lower amplitude and/or energy), the second amplifier 706 may avoid the time required by other amplifiers for recovery from an overdrive state (that is caused by the input differential signal 708). The second amplifier 706 may avoid losing incoming input signals during such a recovery time.

A switch device 712 ("Switch" in FIG. 17) that receives the output differential signal 710 (e.g., from the second amplifier 706) can control where the output differential signal 710 is sent. For example, the switch device 712 may alternate between states where, in one state (e.g., a coarse acquisition or determination state), the switch device 712 directs the output differential signal 710 along a first path 716 to the digitizer 730 and then to the correlator device 731. The digitizer 730 includes one or more analog or digital components, such as a processor, controller, buffers, digital gates, delay lines, samplers and the like, that digitize received signals into a digital signal, such as the digital echo signal 740 described above in connection with FIG. 13B. The first path 716 is used to provide for the coarse stage determination of the time of flight, as described above. In one embodiment, the signals 710 may pass through another amplifier 714 and/or one or more other components before reaching the correlator device 731 for the coarse stage determination. In another state, the switch device 712 directs the output differential signal 710 along a different, second path 718 to one or more other components (described below). The second path 718 is used for the fine stage determination of the time of flight in the illustrated embodiment.

The switch device 712 may alternate the direction of flow of the signals (e.g., the output differential signal 710) from the first path 716 to the second path 718. Control of the switch device 712 may be provided by the control unit 112 (shown in FIG. 11). For example, the control unit 112 may communicate control signals to the switch device 712 to control where the signals flow after passing through the switch device 712.

The output differential signals 710 received by the switch device 712 may be communicated to a comparison device 720 in the second path 718. Alternatively, the switch device 712 (or another component) may convert the differential signals 710 into a single-ended signal that is input into the comparison device 720. The comparison device 720 also receives the receive pattern signal 728 from the pattern generator 228 (shown in FIG. 12). The receive pattern signal 728 is referred to as "I or Q fine alignment pattern" in FIG. 17). The receive pattern signal 728 may include a copy of the same transmit pattern that is transmitted in the transmitted signal 106 used to generate the echo signal 226 being analyzed by the system 232. Alternatively, the receive pattern signal 728 may differ from the transmit signal that is transmitted in the transmitted signal 106 used to generate the echo signal 226 being analyzed by the system 232.

The comparison device 720 compares the signals received from the switch device 712 with the receive pattern signal 728 to identify differences between the echo signal 226 and the receive pattern signal 728.

In one embodiment, the receive pattern signal 728 includes a pattern that is delayed by the time delay (e.g., the time of flight) identified by the coarse stage determination. The comparison device 720 may then compare this time-delayed pattern in the pattern signal 728 to the echo signal 226 (e.g., as modified by the amplifiers 704, 710) to identify overlaps or mismatches between the time-delayed pattern signal 728 and the echo signal 226.

In one embodiment, the comparison device 720 may include or represent a limiting amplifier that acts as a relatively high-speed XOR gate. An "XOR gate" includes a device that receives two signals and produces a first output signal (e.g., a "high" signal) when the two signals are different and a second output signal (e.g., a "low" signal) or no signal when the two signals are not different.

In another embodiment, the system may only include the coarse baseband processing circuits 716 or the fine baseband processing circuits 718. In this case, the switch 712 may also be eliminated. For example, this may be to reduce the cost or complexity of the overall system. As another example, the system may not need the fine accuracy and the rapid response of the coarse section 716 is desired. The coarse, fine and ultrafine stages may be used in any combination at different times in order to balance various performance metrics. Intelligent control can be manually provided by an operator or automatically generated by a processor or controller (such as the control unit 112) autonomously controlling the assembly 102 based on one or more sets of instructions (such as software modules or programs) stored on a tangible computer readable storage medium (such as a computer memory). The intelligent control can manually or automatically switch between which stages are used and/or when based on feedback from one or more other stages. For example, based on the determination from the coarse stage (e.g., an estimated time of flight or separation distance), the sensing assembly 102 may manually or automatically switch to the fine and/or ultrafine stage to further refine the time of flight or separation distance and/or to monitor movement of the target object 104.

Figure 18:
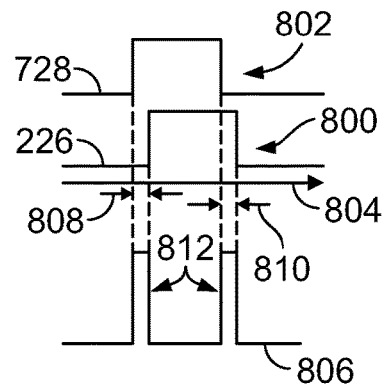
FIG. 18 is a schematic diagram of one example of how a comparison device compares a bit of interest of a baseband echo signal shown in FIG. 12 with a pattern bit of a pattern signal shown in FIG. 12 in one embodiment.

With continued reference to FIG. 17, FIG. 18 is a schematic diagram of one example of how the comparison device 720 compares a portion 800 of the baseband echo signal 226 with a portion 802 of the time-delayed pattern signal 728 in one embodiment. Although only portions 800, 802 of the pattern signal 728 and the echo signal 226 are shown, the comparison device 720 may compare more, or all, of the echo signal 226 with the pattern signal 728. The portion 800 of the echo signal 226 and the portion 802 of the pattern signal 728 are shown disposed above each other and above a horizontal axis 804 that is representative of time. An output signal 806 represents the signal that is output from the comparison device 720. The output signal 806 represents differences (e.g., a time lag, amount of overlap, or other measure) between the portion 800 of the echo signal 226 and the portion 802 of the pattern signal 728. The comparison device 720 may output a single ended output signal 806 or a differential signal as the output signal 806 (having components 806A and 806B, as shown in FIG. 18).

In one embodiment, the comparison device 720 generates the output signal 806 based on differences between the portion 800 of the echo signal 226 and the portion 802 of the time-delayed pattern signal 728. For example, when a magnitude or amplitude of both portions 800, 802 is "high" (e.g., has a positive value) or when the magnitude or amplitude of both portions 800, 802 is "low" (e.g., has a zero or negative value), the comparison device 720 may generate the output signal 806 to have a first value. In the illustrated example, this first value is zero. When a magnitude or amplitude of both portions 800, 802 differ (e.g., one has a high value and the other has a zero or low value), the comparison device 720 may generate the output signal 806 with a second value, such as a high value.

In the example of FIG. 18, the portion 800 of the echo signal 226 and the portion 802 of the pattern signal 728 have the same or similar value except for time periods 808, 810. During these time periods 808, 810, the comparison device 720 generates the output signal 806 to have a "high" value. Each of these time periods 808, 810 can represent the time lag, or delay, between the portions 800, 802. During other time periods, the comparison device 720 generates the output signal 806 to have a different value, such as a "low" or zero value, as shown in FIG. 18. Similar output signals 806 may be generated for other portions of the echo signal 226 and pattern signal 728.

Figure 19:
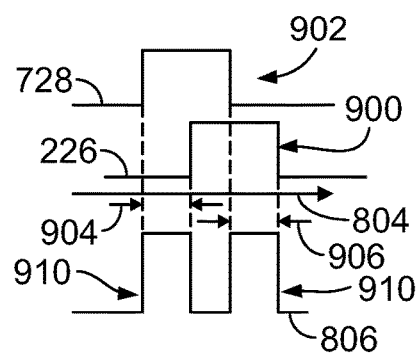
FIG. 19 illustrates another example of how the comparison device shown in FIG. 17 compares a bit of interest of the baseband echo signal shown in FIG. 12 with a pattern bit of the pattern signal shown in FIG. 12.

FIG. 19 illustrates another example of how the comparison device 720 compares a portion 900 of the baseband echo signal 226 with a portion 902 of the pattern signal 728. The portions 900, 902 have the same or similar values except for time periods 904, 906. During these time periods 904, 906, the comparison device 720 generates the output signal 806 to have a "high" value. During other time periods, the comparison device 720 generates the output signal 806 to have a different value, such as a "low" or zero value. As described above, the comparison device 720 may compare additional portions of the baseband signal 226 with the pattern signal 728 to generate additional portions or waveforms in the output signal 806.

Figure 20:
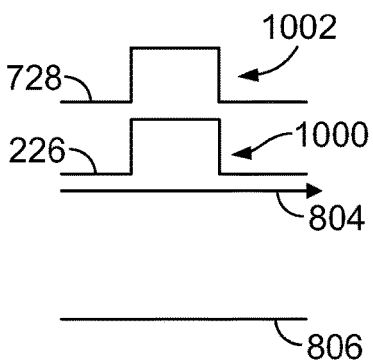
FIG. 20 illustrates another example of how the comparison device shown in FIG. 17 compares a bit of interest of the baseband echo signal shown in FIG. 12 with a pattern bit of the pattern signal shown in FIG. 12.

FIG. 20 illustrates another example of how the comparison device 720 compares a portion 1000 of the baseband echo signal 226 with a portion 1002 of the pattern signal 230. The portions 1000, 1002 have the same or similar values over the time shown in FIG. 20. As a result, the output signal 806 that is generated by the comparison device 720 does not include any "high" values that represent differences in the portions 1000, 1002. As described above, the comparison device 720 may compare additional portions of the baseband signal 226 with the pattern signal 728 to generate additional portions or waveforms in the output signal 806. The output signals 806 shown in FIGS. 8, 9, and 10 are provided merely as examples and are not intended to be limitations on all embodiments disclosed herein.

The output signals 806 generated by the comparison device 720 represent temporal misalignment between the baseband echo signal 226 and the pattern signal 728 that is delayed by the time of flight or time delay measured by the coarse stage determination. The temporal misalignment may be an additional portion (e.g., to be added to) the time of flight of the transmitted signals 106 (shown in FIG. 11) and the echoes 108 (shown in FIG. 11) to determine the separation distance 110 (shown in FIG. 11).

The temporal misalignment between the baseband signal 226 and the pattern signal 728 may be referred to as a time lag. The time lag can be represented by the time periods 808, 810, 904, 906. For example, the time lag of the data stream 226 in FIG. 18 may be the time encompassed by the time period 808 or 810, or the time by which the portion 802 of the baseband signal 226 follows behind (e.g., lags) the portion 800 of the pattern signal 728. Similarly, the time lag of the portion 902 of the baseband signal 226 may be the time period 904 or 906. With respect to the example shown in FIG. 20, the portion 1000 of the baseband signal does not lag behind the portion 1002 of the pattern signal 728. As described above, several time lags may be measured by comparing more of the baseband signal 226 with the time-delayed pattern signal 728.

In order to measure the temporal misalignment between the baseband signal 226 and the time-delayed pattern signal, the output signals 806 may be communicated from the conversion device 720 to one or more filters 722. In one embodiment, the filters 722 are low-pass filters. The filters 722 generate energy signals 724 that are proportional to the energy of the output signals 806. The energy of the output signals 806 is represented by the size (e.g., width) of waveforms 812, 910 in the output signals 806. As the temporal misalignment between the baseband signal 226 and the pattern signal 728 increases, the size (and energy) of the waveforms 812, 910 increases. As a result, the amplitude and/or energy conveyed or communicated by the energy signals 724 increases. Conversely, as the temporal misalignment between the baseband signal 226 and the time-delayed pattern signal 728 decreases, the size and/or amplitude and/or energy of the waveforms 812, 910 also decreases. As a result, the energy conveyed or communicated by the energy signals 724 decreases.

As another example, the above system could be implemented using the opposite polarity, such as with an XNOR comparison device that produces "high" signals when the baseband signal 226 and the time-delayed pattern signal 728 are the same and "low" when they are different. In this example, as the temporal misalignment between the baseband signal 226 and the pattern signal 728 increases, the size (and energy) of the waveforms 812, 910 decreases. As a result, the amplitude and/or energy conveyed or communicated by the energy signals 724 decreases. Conversely, as the temporal misalignment between the baseband signal 226 and the time-delayed pattern signal 728 decreases, the size, amplitude, and/or energy of the waveforms 812, 910 also increases. As a result, the energy conveyed or communicated by the energy signals 724 increases.

The energy signals 724 may be communicated to measurement devices 726 ("ADC" in FIG. 17). The measurement devices 726 can measure the energies of the energy signals 724. The measured energies can then be used to determine the additional portion of the time of flight that is represented by the temporal misalignment between the baseband signal 226 and the time-delayed pattern signal 728. In one embodiment, the measurement device 726 periodically samples the energy and/or amplitude of energy signals 724 in order to measure the energies of the energy signals 724. For example, the measurement devices 726 may include or represent analog-to-digital converters (ADC) that sample the amplitude and/or energy of the energy signals 724 in order to measure or estimate the alignment (or misalignment) between the echo signal 226 and the pattern signal 728. The sampled energies can be communicated by the measurement devices 726 as the output signal 702 to the control unit 112 or other output device or component (shown as "Digital energy estimates for I or Q channel" in FIG. 17).

The control unit 112 (or other component that receives the output signal 710) may examine the measured energy of the energy signals 724 and calculate the additional portion of the time of flight represented by the temporal misalignment between the baseband signal 226 and the time-delayed pattern signal 728. The control unit 112 also may calculate the additional portion of the separation distance 110 that is associated with the temporal misalignment. In one embodiment, the control unit 112 compares the measured energy to one or more energy thresholds. The different energy thresholds may be associated with different amounts of temporal misalignment. Based on the comparison, a temporal misalignment can be identified and added to the time of flight calculated using the coarse stage determination described above. The separation distance 110 may then be calculated based on the combination of the coarse stage determination of the time of flight and the additional portion of the time of flight from the fine stage determination.

Figure 21:
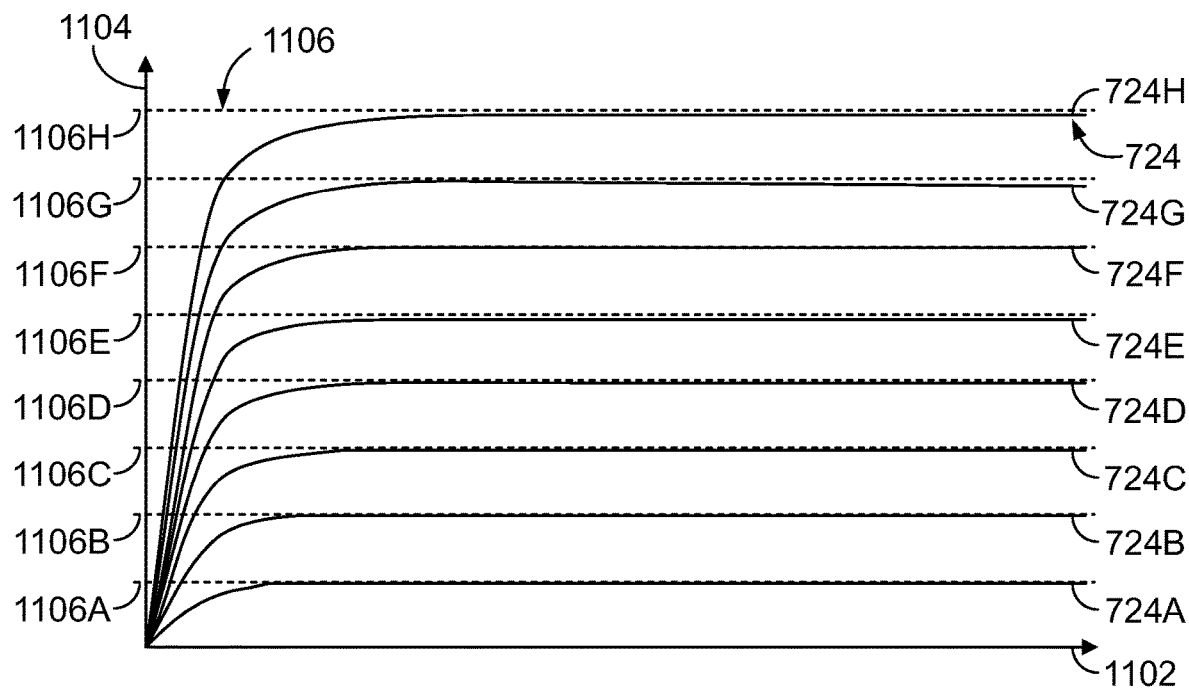
FIG. 21 illustrates examples of output signals shown in FIG. 17 provided by measurement devices shown in FIG. 17 and energy thresholds used by a CPU device shown in FIG. 12 in accordance with one example.

FIG. 21 illustrates examples of output signals 724 provided to the measurement devices 726 and energy thresholds used by the control unit 112 or other component or device (shown in FIG. 12) in accordance with one example. The output signals 702 are shown alongside a horizontal axis 1102 representative of time and a vertical axis 1104 representative of energy. Several energy thresholds 1106 are shown above the horizontal axis 1102. Although eight output signals 724A-H and eight energy thresholds 1106A-H are shown, alternatively, a different number of output signals 724 and/or energy thresholds 1106 may be used.

The measurement devices 726 may digitize the energy signals 724 to produce the energy data output signals 702. When the output signals 702 are received from the measurement devices 726 (shown in FIG. 17) by the CPU 270, the output signals 706 can be compared to the energy thresholds 1106 to determine which, if any, of the energy thresholds 1106 are exceeded by the output signals 702. For example, the output signals 702 having less energy (e.g., a lower magnitude) than the energies associated with the output signal 702A may not exceed any of the thresholds 1106, while the output signal 702A approaches or reaches the threshold 1106A. The output signal 702B is determined to exceed the threshold 1106A, but not exceed the threshold 1106B. As shown in FIG. 21, other output signals 702 may exceed some thresholds 1106 while not exceeding other thresholds 1106.

The different energy thresholds 1106 are associated with different temporal misalignments between the echo signal 226 and the time-delayed pattern signal 728 in one embodiment. For example, the energy threshold 1106A may represent a temporal misalignment of 100 picoseconds, the energy threshold 1106B may represent a temporal misalignment of 150 picoseconds, the energy threshold 1106C may represent a temporal misalignment of 200 picoseconds, the energy threshold 1106D may represent a temporal misalignment of 250 picoseconds, and so on. For example, 724B may be the result of the situation shown in FIGS. 8 and 724E may be the result of the situation in FIG. 19.

The measured energy of the output signal 702 can be compared to the thresholds 1106 to determine if the measured energy exceeds one or more of the thresholds 1106. The temporal misalignment associated with the largest threshold 1106 that is approached or reached or represented by the energy of the output signal 702 may be identified as the temporal misalignment between the echo signal 226 and the time-delayed pattern signal 728. In one embodiment, no temporal alignment may be identified for output signals 702 having or representing energies that are less than the threshold 1106A.

The energy thresholds 1106 may be established by positioning target objects 104 (shown in FIG. 11) a known separation distance 110 (shown in FIG. 11) from the sensing assembly 102 (shown in FIG. 11) and observing the levels of energy that are represented or reached or approached by the output signals 702.

In addition or as an alternate to performing the fine stage determination of the time of flight, the ultrafine stage may be used to refine (e.g., increase the resolution of) the time of flight measurement, track movement, and/or detect movement of the target object 104 (shown in FIG. 11). In one embodiment, the ultrafine stage includes comparing different components or channels of the same or different echo signals 226 as the fine stage determination. For example, in one embodiment, the coarse stage determination may measure a time of flight from echo signals 226 that are based on echoes 108 received from transmission of a first set or burst of one or more transmitted signals 106, as described above. The fine stage determination may measure an amount of temporal misalignment or overlap between echo signals 226 that are based on echoes 108 received from transmission of a subsequent, second set or burst of one or more transmitted signals 106 (that may use the same or different transmit pattern as the first set or burst of transmitted signals 106). The fine stage determination may measure the temporal misalignment between the echo signals 226 from the second set or burst of transmitted signals 106 and a receive pattern signal (which may be the same or different receive pattern as used by the coarse stage determination) as that is time delayed by the time of flight measured by the coarse stage, as described above. In one embodiment, the fine stage determination examines the I and/or Q component or channel of the echo signals 226. The ultrafine stage determination may measure the temporal misalignment of the echo signals 226 from the same second set or burst of transmitted signals 106 as the fine stage determination, or from a subsequent third set or burst of transmitted signals 106. The ultrafine stage determination may measure the temporal misalignment between the echo signals 226 and a receive pattern signal (that is the same or different as the receive pattern signal used by the fine stage determination) that is time-delayed by the time of flight measured by the coarse stage. In one embodiment, the ultrafine stage measures the temporal misalignment of the I and/or Q component or channel of the echo signals 226 while the fine stage measures the temporal misalignment of the Q and/or I component or channel of the same or different echo signals 226. The temporal misalignment of the I component may be communicated to the control unit 112 (or other component or device) as the output signals 702 (as described above) while the temporal misalignment of the Q component may be communicated to the control unit 112 (or other component or device) as output signals 1228. Alternatively or additionally, the time lag of the waveforms in the I channel and Q channel can be examined to resolve phases of the echoes in order to calculate separation distance or motion of the target.

As described above, the ultrafine stage determination may alternatively or additionally involve a similar process as the coarse stage determination. For example, the coarse stage determination may examine the I channel of the receive pattern and the data stream to determine correlation values of different subsets of the data stream and, from those correlation values, determine a subset of interest and a corresponding time-of-flight, as described herein. The ultrafine stage determination can use the Q channel of the receive pattern and the data stream to determine correlation values of different subsets of the data stream and, from those correlation values, determine a subset of interest and a time-of-flight. The times-of-flight from the I channel and Q channel can be combined (e.g., averaged) to calculate a time of flight and/or separation distance to the target. The correlation values calculated by the ultrafine stage determination can be used to calculate an additional time delay that can be added to the time delays from the coarse stage and/or the fine stage to determine a time of flight and/or separation distance to the target. Alternatively or additionally, the correlation values of the waveforms in the I channel and Q channel can be examined to resolve phases of the echoes in order to calculate separation distance or motion of the target.

Figure 22:
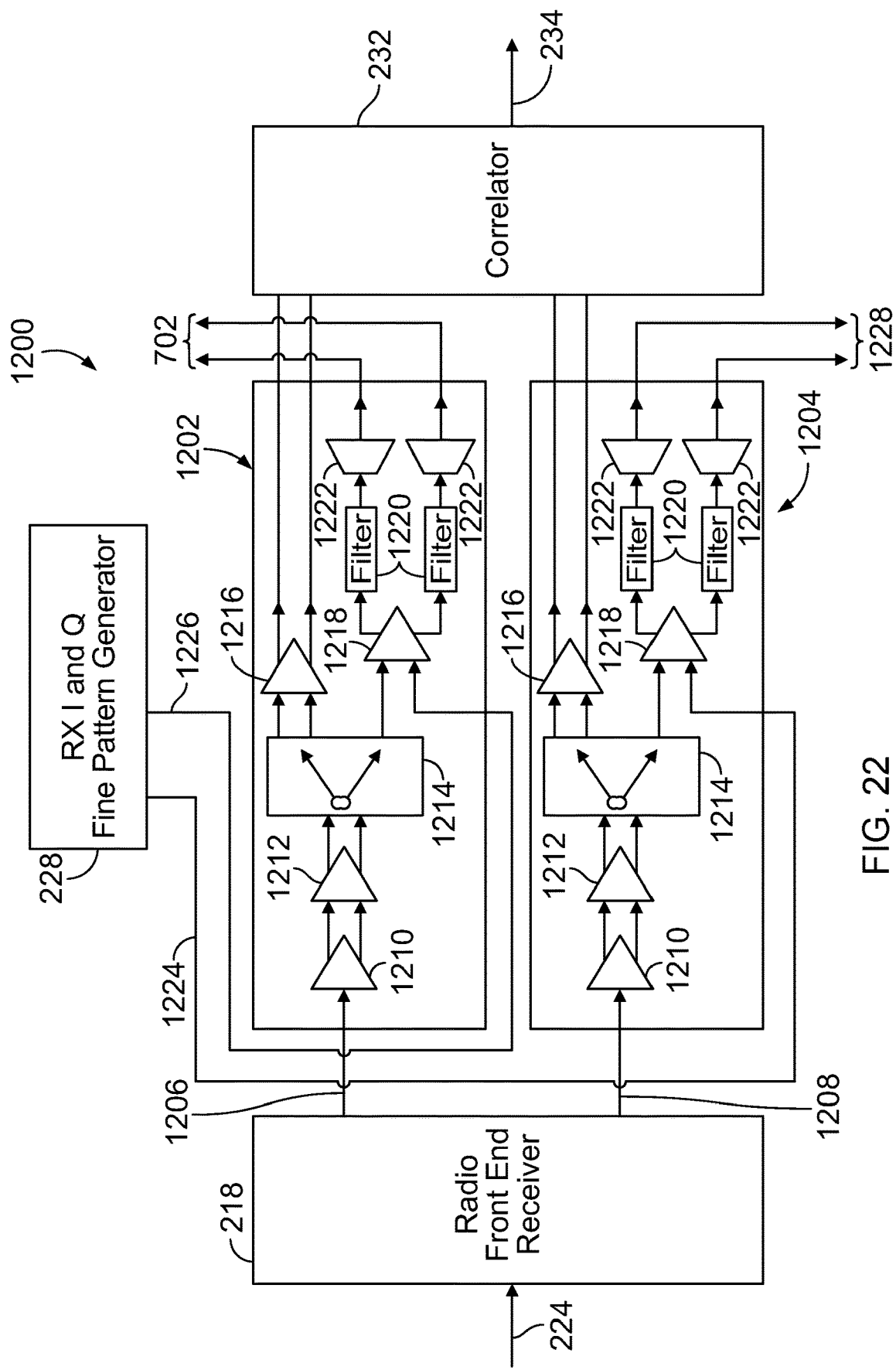
FIG. 22 is a circuit diagram of another embodiment of a baseband processing system of the system shown in FIG. 11.

FIG. 22 is a circuit diagram of another embodiment of a baseband processing system 1200 of the system 100 shown in FIG. 11. In one embodiment, the baseband processing system 1200 is similar to the baseband processing system 232 (shown in FIG. 17). For example, the baseband processing system 1200 may be included in the sensing assembly 102 (shown in FIG. 11) by being coupled with the front end receiver 218, the pattern code generator 228, and/or the baseband processor 232 of the sensing assembly 102. The baseband processing system 1200 includes two or more parallel paths 1202, 1204 that the I and Q components of the baseband echo signal 226 and the pattern signal can flow through for processing and analysis. For example, a first path 1202 can process and analyze the I components of the echo signal 224 and baseband echo signal 226 and the second path 1204 can process and analyze the Q components of the echo signal 224 and the baseband echo signal 226. In the illustrated embodiment, each of the paths 1202, 1204 includes the baseband processing system 232 described above. Alternatively, one or more of the paths 1202, 1204 may include one or more other components for processing and/or analyzing the signals. In another embodiment, only a single path 1202 or 1204 may process and/or analyze multiple, different components of the baseband echo signal 224 and/or baseband echo signal 226. For example, the path 1202 may examine the I component of the signal 224 and/or 226 during a first time period and then examine the Q component of the signal 224 and/or 226 during a different (e.g., subsequent or preceding) second time period.

In operation, the echo signal 224 is received by the front end receiver 218 and is separated into separate I and Q signals 1206, 1208 (also referred to herein as I and Q channels). Each separate I and Q signal 1206, 1208 includes the corresponding I or Q component of the echo signal 224 and can be processed and analyzed similar to the signals described above in connection with the baseband processing system 232 shown in FIG. 17. For example, each of the I signal 1206 and the Q signal 1208 can be received and/or amplified by a conversion amplifier 1210 (that is similar to the conversion amplifier 704) in each path 1202, 1204 to output a differential signal (e.g., similar to the signal 708 shown in FIG. 17) to another amplifier 1212 (e.g., similar to the amplifier 706 shown in FIG. 17). The amplifiers 1212 can produce signals having increased gain (e.g., similar to the signals 710 shown in FIG. 17) that are provided to switch devices 1214. The switch devices 1214 can be similar to the switch device 712 (shown in FIG. 17) and can communicate the signals from the amplifiers 1212 to amplifiers 1216 (which may be similar to the amplifier 714 shown in FIG. 17) and/or the correlator device 232 for the coarse stage identification of a time of flight, as described above.

Similar to as described above in connection with the switch device 712 (shown in FIG. 17), the switch devices 1214 can direct the signals from the amplifiers 1212 to comparison devices 1218 (that may be similar to the comparison device 720 shown in FIG. 17), filters 1220 (that may be similar to the filters 722 shown in FIG. 17), and measurement devices 1222 (that may be similar to the measurement devices 726 shown in FIG. 17). The comparison devices 1218 may each receive different components of a receive pattern signal from the pattern code generator 228. For example, the comparison device 1218 in the first path 1202 may receive an I component 1224 of a receive pattern signal for the fine stage and the comparison device 1218 in the second path 1202 may receive the Q component 1226 of the receive pattern signal for the ultrafine stage. The comparison devices 1218 generate output signals that represent temporal misalignments between the I or Q components 1224, 1226 of the receive pattern signal and the I or Q components of the echo signal 226, similar to as described above. For example, the comparison device 1218 in the first path 1202 may output a signal having an energy that represents (e.g., is proportional to) the temporal misalignment between the I component of the baseband echo signal 226 and the I component of the time-delayed receive pattern signal 728. The comparison device 1218 in the second path 1204 may output another signal having an energy that represents the temporal misalignment between the Q component of the baseband echo signal 226 and the Q component of the time-delayed pattern signal 728. Alternatively, there may be a single path 700, as shown in FIG. 17, that may be shared between I and Q operation. This could be accomplished by alternately providing or switching between the I and Q components of the baseband echo signal 226A and 226B.

As described above, the energies of the signals output from the comparison devices 1218 can pass through the filters 1220 and be measured by the measurement devices 1222 to determine each of the temporal misalignments associated with the I and Q components of the echo signal 226 and the receive pattern signal. These temporal misalignments can be added together and added to the time of flight determined by the coarse stage determination. The sum of the temporal misalignments and the time of flight from the coarse stage determination can be used by the baseband processor 232 to calculate the separation distance 110 (shown in FIG. 11), as described above. Because the I and Q components of the echo signal and the time-delayed receive pattern signal are phase shifted by approximately 90 degrees from each other, separately examining the I and Q components allows calculation of the carrier phase of the returning signal 108 according to Equation 2 below and can provide resolution on the order of one eighth or better (smaller) of the wavelength of the carrier signal of the transmitted signals 106 and echoes 108. Alternatively, there may be 3 or more components separated by an amount other than 90 degrees.

In one embodiment, the ultrafine stage determination described above can be used to determine relatively small movements that change the separation distance 110 (shown in FIG. 11). For example, the ultrafine stage may be used to identify relatively small movements within a portion of the separation distance 110 that is associated with the subset of interest in the baseband echo signal 226.

Figure 23:
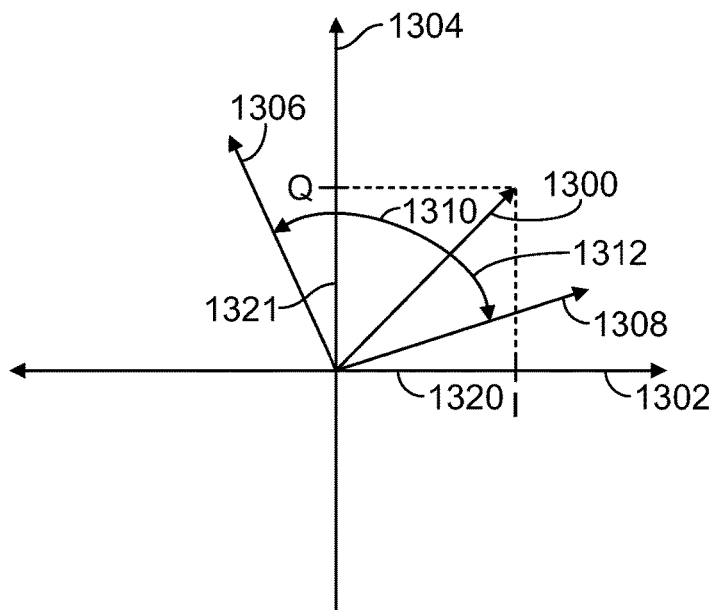
FIG. 23 illustrates projections of in-phase (I) and quadrature (Q) components of a digitized echo signal shown in FIG. 12 in accordance with one embodiment.

FIG. 23 illustrates projections of I and Q components of the baseband echo signal 226 in accordance with one embodiment. The ultrafine stage determination can include the baseband processor 232 (shown in FIG. 12) projecting a characteristic of the I and Q components of the baseband echo signal 226 onto a vector. As shown in FIG. 23, a vector 1300 is shown alongside a horizontal axis 1302 and a vertical axis 1304. The backend 202 or control unit 112 or other processing or computation devices by examination of the data signals 234, 702, 1228, 260, or others or a combination of some or all of the signals may determine the vector 1300 as a projection of the characteristic (e.g., amplitude) of the I component 1320 of the echo signal along the horizontal axis 1302 and a projection of the characteristic (e.g., amplitude) of the Q component 1321 of the echo signal along the vertical axis 1304. For example, the vector 1300 may extend to a location along the horizontal axis 1302 by an amount that is representative of an amplitude of the I component of the echo signal and to a location along the vertical axis 1304 by an amount that is representative of an amplitude of the Q component of the echo signal. The phase of the carrier can then calculated as:

$$\varphi = \arctan\left(\frac{I}{Q}\right) \qquad \text{(Equation \#2)}$$

where φ denotes the phase and I is the I projection 1320 and Q is the Q projection 1321. The carrier phase or the change in carrier phase can be used to calculate the distance or change in distance through the equation:

$$\text{distance} = \frac{\varphi \times \lambda}{360} \qquad \text{(Equation \#3)}$$

where λ, is the wavelength of the carrier frequency and φ is the phase expressed in degrees as calculated from Equation 2 above.

The baseband processor 232 (shown in FIG. 12) may then determine additional vectors 1306, 1308 based on the echoes 108 (shown in FIG. 11) received from additional transmitted signals 106 (shown in FIG. 11). Based on changes in the vector 1300 to the vector 1306 or the vector 1308, the baseband processor 232 may identify movement of the target object 104 (shown in FIG. 11) within the portion of the separation distance 110 (shown in FIG. 11) that is associated with the subset of interest. For example, rotation of the vector 1300 in a counterclockwise direction 1310 toward the location of the vector 1306 may represent movement of the target object 104 toward the sensing assembly 102 shown in FIG. 11 (or movement of the sensing assembly 102 toward the target object 104). Rotation of the vector 1300 in a clockwise direction 1312 toward the location of the vector 1308 may represent movement of the target object 104 away from the sensing assembly 102 (or movement of the sensing assembly 102 toward the target object 104). Alternatively, movement of the vector 1300 in the counter-clockwise direction 1310 may represent movement of the target object 104 away from the sensing assembly 102 (or movement of the sensing assembly 102 toward the target object 104) while movement of the vector 1300 in the clockwise direction 1312 may represent movement of the target object 104 toward the sensing assembly 102 shown in FIG. 11 (or movement of the sensing assembly 102 toward the target object 104). The correlator device 232 may be calibrated by moving the target object 104 toward and away from the sensing assembly 102 to determine which direction of movement results in rotation of the vector 1300 in the clockwise direction 1312 or counter-clockwise direction 1310.

The coarse, fine, and/or ultrafine stage determinations described above may be used in a variety of combinations. For example, the coarse stage determination may be used to calculate the separation distance 110 (shown in FIG. 11), even if the approximate distance from the sensing device 102 (shown in FIG. 11) to the target object 104 (shown in FIG. 11) is not known. Alternatively, the coarse stage may be used with the fine and/or ultrafine stage determinations to obtain a more precise calculation of the separation distance 110. The coarse, fine and ultrafine stages may be used in any combination at different times in order to balance various performance metrics.

As another example, if the separation distance 110 (shown in FIG. 11) is known, the fine or ultrafine stage determinations can be activated without the need for first identifying the bit of interest using the coarse stage determination. For example, the system 100 (shown in FIG. 11) may be in a "tracking" mode where updates from the initial known separation distance 110 are identified and/or recorded using the fine and/or ultrafine state determinations.

Returning to the discussion of the system 100 shown in FIG. 11, in another embodiment, the system 100 discern between echoes 108 that are reflected off of different target objects 104. For example, in some uses of the system 100, the transmitted signals 106 may reflect off of multiple target objects 104. If the target objects 104 are located different separation distances 110 from the sensing assembly 102, a single baseband echo signal 226 (shown in FIG. 12) may represent several sequences of bits that represent echoes off the different target objects 104. As described below, a mask may be applied to the baseband echo signal 226 and the pattern in the correlation window that is compared to the baseband echo signal 226 in order to distinguish between the different target objects 104.

Figure 24:
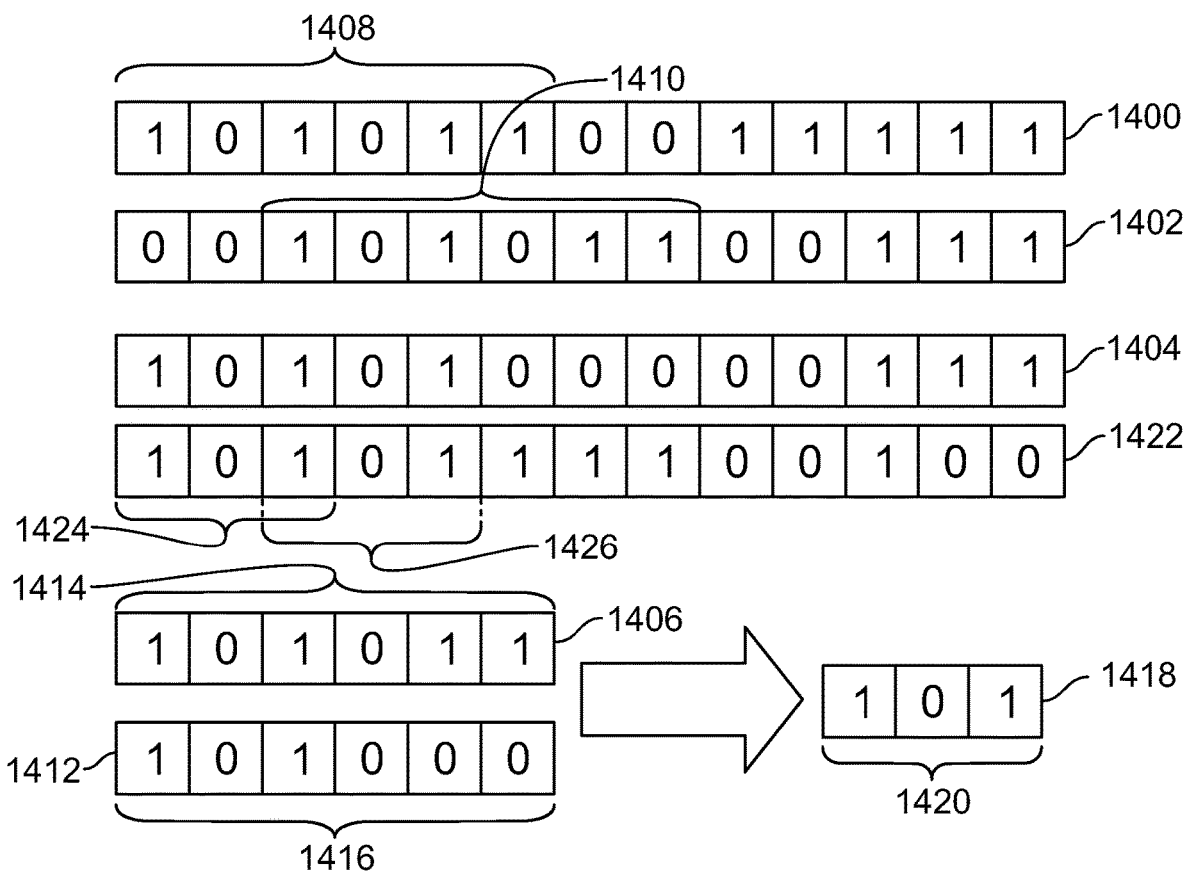
FIG. 24 illustrates a technique for distinguishing between echoes shown in FIG. 11 that are reflected off different target objects 104 shown in FIG. 11 in accordance with one embodiment.

FIG. 24 illustrates a technique for distinguishing between echoes 108 (shown in FIG. 11) that are reflected off different target objects 104 (shown in FIG. 11) in accordance with one embodiment. When a first transmitted signal 106 shown in FIG. 11 (or a series of first transmitted signals 106) reflect off of multiple target objects 104, the digital pulse sequence (e.g., the pattern of bits) in the pattern signal 230 (shown in FIG. 12) may be modified relative to the digital pulse sequence in the first transmitted signal 106 for transmission of a second transmitted signal 106 (or series of second transmitted signals 106). The echoes 108 and corresponding baseband echo signal 226 (shown in FIG. 12) of the second transmitted signal 106 may be compared to the modified digital pulse sequence to distinguish between the multiple target objects 104 (e.g., to calculate different times of flight and/or separation distances 110 associated with the different target objects 104).

A first digitized echo signal 1400 in FIG. 24 represents the sequence of bits that may be generated when a transmitted signal 106 (shown in FIG. 11) reflects off a first target object 104 at a first separation distance 110 (shown in FIG. 11) from the sensing assembly 102 (shown in FIG. 11). A second digitized echo signal 1402 represents the sequence of bits that so may be generated when the transmitted signal 106 reflects off a different, second target object 104 that is a different, second separation distance 110 from the sensing assembly 102. Instead of separately generating the digitized echo signals 1400, 1402, the sensing assembly 102 may generate a com biped digitized echo signal 1404 that represents the combination of echoes 108 off the different target objects 104. The combined digitized echo signal 1404 may represent a combination of the digitized echo signals 1400, 1402.

A correlation window 1406 includes a sequence 1414 of bits that can be compared to either digitized echo signal 1400, 1402 to determine a subset of interest, such as the subsets of interest 1408, 1410, in order to determine times of flight to the respective target objects 104 (shown in FIG. 11), as described above. However, when the echoes 108 (shown in FIG. 11) off the target objects 104 are combined and the combined digitized echo signal 1404 is generated, the correlation window 1406 may be less accurate or unable to determine the time of flight to one or more of the several target objects 104. For example, while separate comparison of the correlation window 1406 to each of the digitized echo signals 1400, 1402 may result in correlation values of +6 being calculated for the subsets of interest 1408, 1410, comparison of the correlation window 1406 to the combined digitized echo signal 1404 may result in correlation values of +5, +4, and +4 for the subsets that include the first through sixth bits, the third through eighth bits, and the seventh through twelfth bits in the combined digitized echo signal 1404. As a result, the baseband processor 232 (shown in FIG. 12) may be unable to distinguish between the different target objects 104 (shown in FIG. 11).

In one embodiment, a mask 1412 can be applied to the sequence 1414 of bits in the correlation window 1406 to modify the sequence 1414 of bits in the correlation window 1406. The mask 1412 can eliminate or otherwise change the value of one or more of the bits in the correlation window 1406. The mask 1412 can include a sequence 1416 of bits that are applied to the correlation window 1406 (e.g., by multiplying the values of the bits) to create a modified correlation window 1418 having a sequence 1420 of bits that differs from the sequence 1414 of bits in the correlation window 1406. In the illustrated example, the mask 1412 includes a first portion of the first three bits ("101") and a second portion of the last three bits ("000"). Alternatively, another mask 1412 may be used that has a different sequence of bits and/or a different length of the sequence of bits. Applying the mask 1412 to the correlation window 1406 eliminates the last three bits ("011") in the sequence 1414 of bits in the correlation window 1406. As a result, the sequence 1420 of bits in the modified correlation window 1418 includes only the first three bits ("101") of the correlation window 1418. In another embodiment, the mask 1412 adds additional bits to the correlation window 1406 and/or changes values of the bits in the correlation window 1406.

The sequence 1420 of bits in the modified correlation window 1418 can be used to change the sequence of bits in the pattern signal 230 (shown in FIG. 12) that is communicated to the transmitter for inclusion in the transmitted signals 106 (shown in FIG. 11). For example, after receiving the combined digitized echo signal 1404 and being unable to discern between the different target objects 104 (shown in FIG. 11), the sequence of bits in the pattern that is transmitted toward the target objects 104 can be changed to include the sequence 1420 of bits in the modified correlation window 1412 or some other sequence of bits to aid in the discernment of the different target objects 104. An additional combined digitized echo signal 1422 may be received based on the echoes 108 of the transmitted signals 106 that include the sequence 1420 of bits.

The modified correlation window 1418 can then be compared with the additional digitized echo signal 1422 to identify subsets of interest associated with the different target objects 104 (shown in FIG. 11). In the illustrated embodiment, the modified correlation window 1418 can be compared to different subsets of the digitized echo signal 1422 to identify first and second subsets of interest 1424, 1426, as described above. For example, the first and second subsets of interest 1424, 1426 may be identified as having higher or the highest correlation values relative to other subsets of the digitized echo signal 1422.

In operation, when transmitted signals 106 reflect off multiple target objects 104, the pattern transmitted in the signals 106 can be modified relatively quickly between successive bursts of the transmitted signals 106 when one or more of the target objects 104 cannot be identified from examination of the digitized echo signal 226. The modified pattern can then be used to distinguish between the target objects 104 in the digitized echo signal 740 using the correlation window that includes the modified pattern.

In another embodiment, the digital pulse sequence of bits included in a transmitted signal 106 (shown in FIG. 11) may be different from the digital pulse sequence of bits included in the correlation window and compared to the baseband echo signal 226 (shown in FIG. 12). For example, the pattern code generator 228 (shown in FIG. 12) may create heterogeneous patterns and communicate the heterogeneous patterns in the pattern signals 230 (shown in FIG. 12) to the transmitter 208 and the baseband processor 232. The transmitter 208 can mix a first pattern of bits in the transmitted signal 106 and the baseband processor 232 can compare a different, second pattern of bits to the baseband echo signal 226 that is generated based on echoes 108 (shown in FIG. 11) of the transmitted signals 106. With respect to the example described above in connection with FIG. 24, the sequence 1414 of bits in the correlation window 1406 can be included in the transmitted signals 106 while the sequence 1416 of bits in the mask 1412 or the sequence 1420 of bits in the modified correlation window 1418 can be compared to the digitized echo signal 1422. Using different patterns in this manner can allow for the sensing assembly 102 (shown in FIG. 11) to distinguish between multiple target objects 104, as described above. Using different patterns in this manner can additionally allow for the sensing assembly 102 (shown in FIG. 11) to perform other functions including, but not limited to clutter mitigation, signal-to-noise improvement, anti-jamming, anti-spoofing, anti-eavesdropping, and others.

Figure 25:
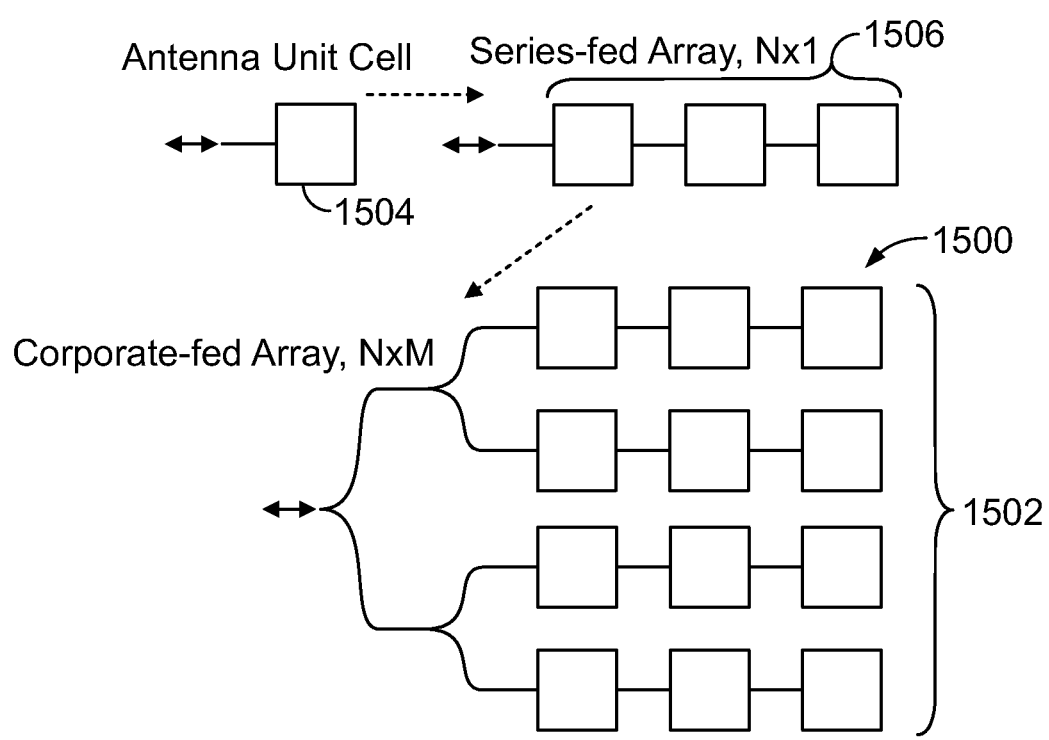
FIG. 25 is a schematic view of an antenna in accordance with one embodiment.

FIG. 25 is a schematic view of an antenna 1500 in accordance with one embodiment. The antenna 1500 may be used as the transmitting antenna 204 and/or the receiving antenna 206, both of which are shown in FIG. 12. Alternatively, another antenna may be used for the transmitting antenna 204 and/or the receiving antenna 206. The antenna 1500 includes a multidimensional (e.g., two dimensional) array 1502 of antenna unit cells 1504. The unit cells 1504 may represent or include microstrip patch antennas. Alternatively, the unit cells 1504 may represent another type of antenna. Several unit cells 1504 can be conductively coupled in series with each other to form a series-fed array 1506. In the illustrated embodiment, the unit cells 1504 are connected in a linear series. Alternatively, the unit cells 1504 can be connected in another shape.

Several series-fed arrays 1506 are conductively coupled in parallel to form the array 1502 in the illustrated embodiment. The numbers of unit cells 1504 and series-fed arrays 1506 shown in FIG. 15 are provided as examples. A different number of unit cells 1504 and/or arrays 1506 may be included in the antenna 1500. The antenna 1500 may use the several unit cells 1504 to focus the energy of the transmitted signals 106 (shown in FIG. 11) through constructive and/or destructive interference.

Figure 26:
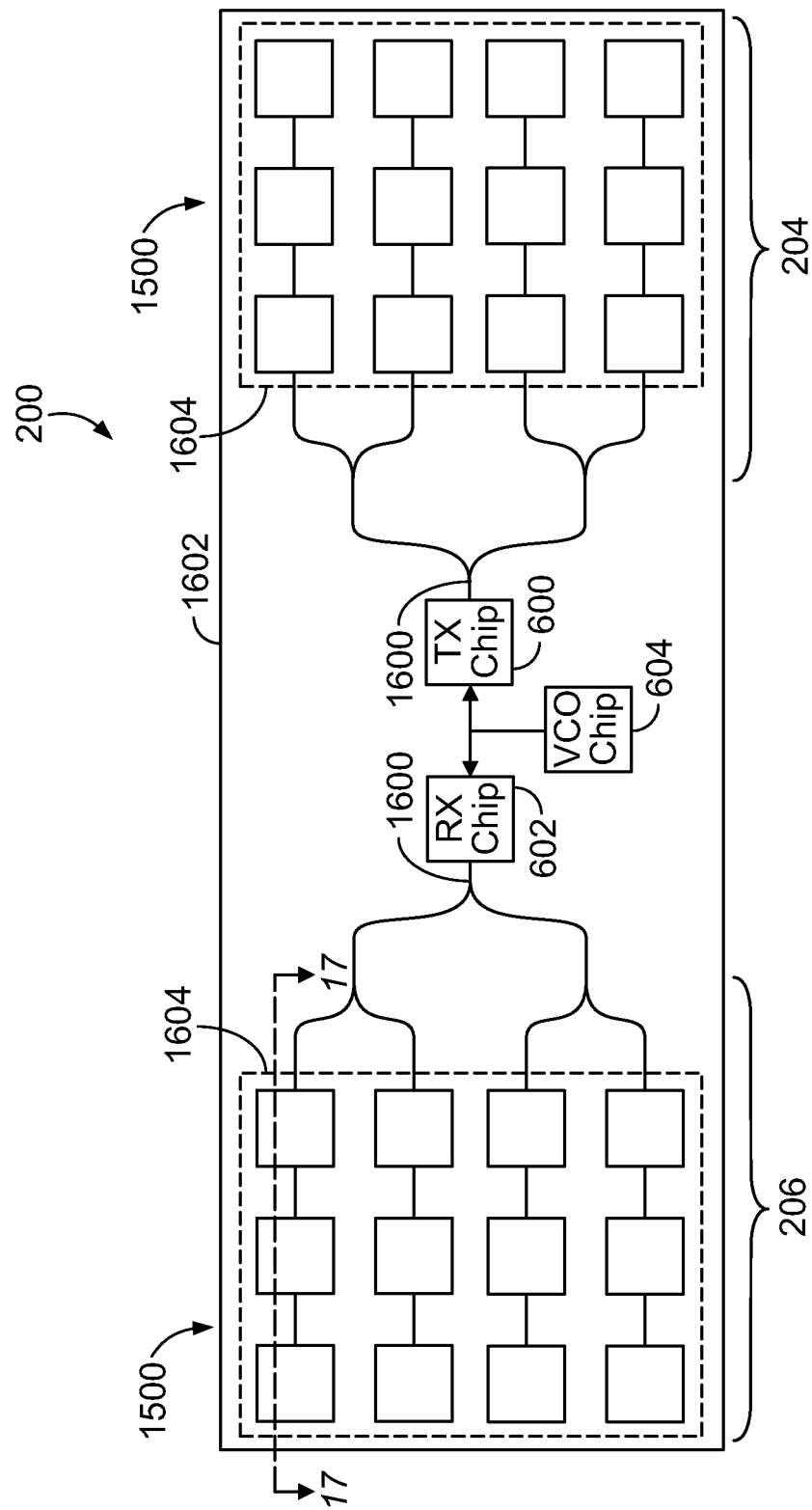
FIG. 26 is a schematic diagram of one embodiment of a front end of the sensing assembly shown in FIG. 11.

FIG. 26 is a schematic diagram of one embodiment of the front end 200 of the sensing assembly 102 (shown in FIG. 11). The antennas 1500 may be used as the transmitting antenna 204 and the receiving antenna 206, as shown in FIG. 26. Each antenna 1500 may be directly connected to the receiver 602 or transmitter 600 (e.g., with no other components disposed between the antenna 1500 and the receiver 602 or transmitter 600) by a relatively short length of transmission line 1600.

The front end 200 of the sensing assembly 102 may be housed in an enclosure 1602, such as a metal or otherwise conductive housing, with radio transmissive windows 1604 over the antennas 1500. Alternatively, the front end 200 may be housed in a non-metallic (e.g., dielectric) enclosure. The windows over the antennas 1500 may not be cut out of the enclosure 1602, but may instead represent portions of the enclosure 1602 that allows the transmitted signals 106 and echoes 108 pass through the windows 1604 from or to the antennas 1500.

The enclosure 1602 may wrap around the antennas 1500 so that the antennas are effectively recessed into the conducting body of the enclosure 1602, which can further improve isolation between the antennas 1500. Alternatively, in the case of a non-conducting enclosure 1602, the antennas 1500 may be completely enclosed by the enclosure 1602 and extra metal foil, and/or absorptive materials, or other measures may be added to improve isolation between the antennas 1500. In one embodiment, if the isolation is sufficiently high, the transmit and receiving antennas 1500 can be operated at the same time if the returning echoes 108 are sufficiently strong. This may be the case when the target is at very close range, and can allow for the sensing assembly 102 to operate without a transmit/receive switch.

Figure 27:
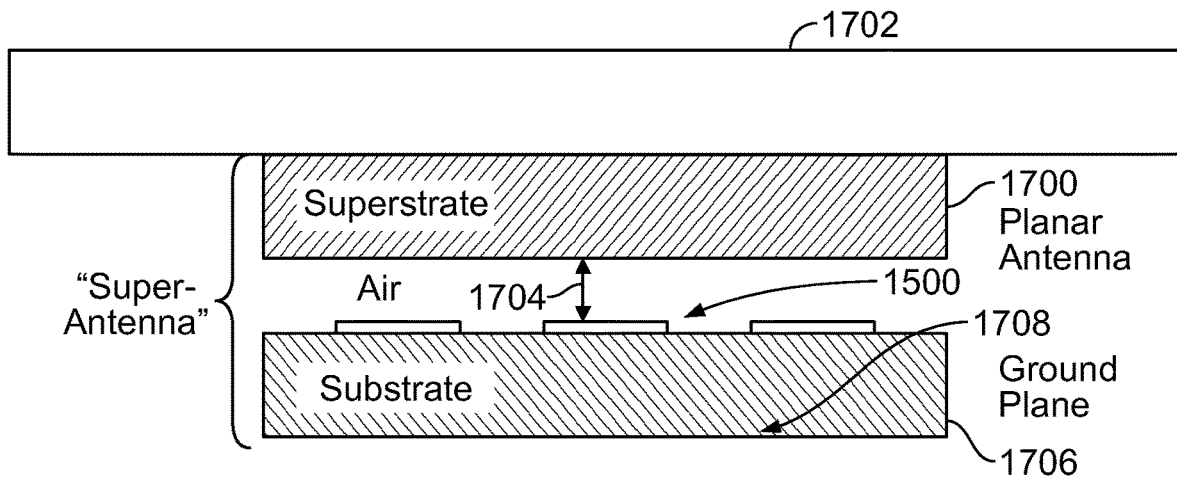
FIG. 27 is a cross-sectional view of one embodiment of the antenna shown in FIG. 25 along line 17-17 in FIG. 26.

FIG. 27 is a cross-sectional view of one embodiment of the antenna 1500 along line 17-17 in FIG. 26. The antenna 1500 ("Planar Antenna" in FIG. 27) includes a cover layer 1700 ("Superstate" in FIG. 27) of an electrically insulating material (such as a dielectric or other nonconducting material). Examples of such materials for the cover layer 1700 include, but are not limited to quartz, sapphire, various polymers, and the like.

The antenna 1500 may be positioned on a surface of a substrate 1706 that supports the antenna 1500. A conductive ground plane 1708 may be disposed on an opposite surface of the substrate 1706, or in another location.

The cover layer 1700 may be separated from the antenna 1500 by an air gap 1704 ("Air" in FIG. 27). Alternatively, gap between the cover layer 1700 and the antenna 1500 may be at least partially filled by another material or fluid other than air. As another alternative, the air gap may be eliminated, and the cover layer 1700 may rest directly on the antenna 1500. The cover layer 1700 can protect the antenna 1500 from the environment and/or mechanical damage caused by external objects. In one embodiment, the cover layer 1700 provides a lensing effect to focus the energy of the transmitted signals 106 emitted by the antenna 1500 into a beam or to focus the energy of the reflected echoes 108 toward the antenna 1500.

This lensing effect can permit transmitted signals 106 and/or echoes 108 to pass through additional layers 1702 of materials (e.g., insulators such as Teflon, polycarbonate, or other polymers) that are positioned between the antenna 1500 and the target object 104 (shown in FIG. 11). For example, the sensing assembly 102 can be mounted to an object being monitored (e.g., the top of a tank of fluid being measured by the sensing assembly 102), while the lensing effect can permit the sensing assembly 102 to transmit the signals 106 and receive the echoes 108 through the top of the tank without cutting windows or openings through the top of the tank).

In one embodiment, the substrate 1708 may have a thickness dimension between the opposite surfaces that is thinner than a wavelength of the carrier signal of the transmitted signals 106 and/or echoes 108. For example, the thickness of the substrate 1708 may be on the order of ½0th of a wavelength. The thicknesses of the air gap 1704 and/or superstrate 1700 may be larger, such as ⅓ of the wavelength. Either one or both of the air gap 1704 and the superstrate 1700 may also be removed altogether.

One or more embodiments of the system 100 and/or sensing assembly 102 described herein may be used for a variety of applications that use the separation distance 110 and/or time of flight that is measured by the sensing assembly 102. Several specific examples of applications of the system 100 and/or sensing assembly 102 are described herein, but not all applications or uses of the system 100 or sensing assembly 102 are limited to those set forth herein. For example, many applications that use the detection of the separation distance 110 (e.g., as a depth measurement) can use or incorporate the system 100 and/or sensing assembly 102.

Figure 28:
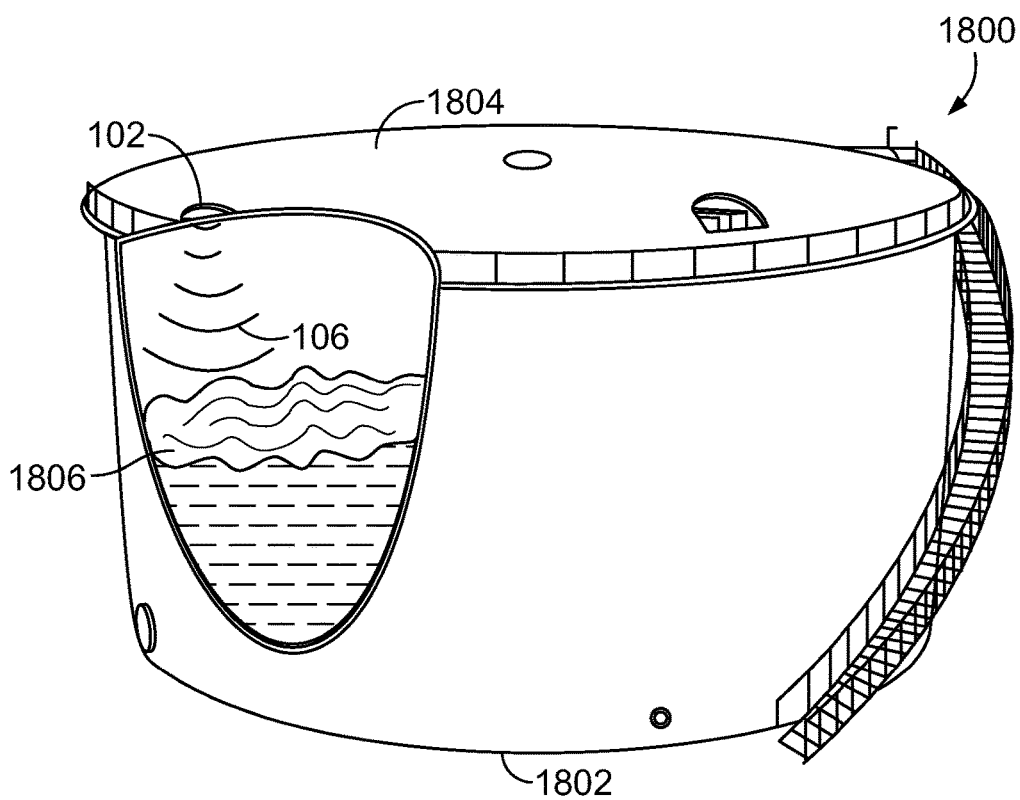
FIG. 28 illustrates one embodiment of a containment system.

FIG. 28 illustrates one embodiment of a containment system 1800. The system 1800 includes a containment apparatus 1802, such as a fluid tank, that holds or stores one or more fluids 1806. The sensing assembly 102 may be positioned on or at a top 1804 of the containment apparatus 1802 and direct transmitted signals 106 toward the fluid 1806. Reflected echoes 108 from the fluid 1806 are received by the sensing assembly 102 to measure the separation distance 110 between the sensing assembly 102 and an upper surface of the fluid 1806. The location of the sensing assembly 102 may be known and calibrated to the bottom of the containment apparatus 1802 so that the separation distance 110 to the fluid 1806 may be used to determine how much fluid 1806 is in the containment apparatus 1802. The sensing assembly 102 may be able to accurately measure the separation distance 110 using one or more of the coarse, fine, and/or ultrafine stage determination techniques described herein.

Alternatively or additionally, the sensing apparatus 102 may direct transmitted signals 106 toward a port (e.g., a filling port through which fluid 1806 is loaded into the containment apparatus 1802) and monitor movement of the fluid 1806 at or near the port. For example, if the separation distance 110 from the sensing assembly 102 to the port is known such that the bit of interest of the echoes 108 is known, the ultrafine stage determination described above maybe used to determine if the fluid 1806 at or near the port is moving (e.g., turbulent). This movement may indicate that fluid 1806 is flowing into or out of the containment apparatus 1802. The sensing assembly 102 can use this determination as an alarm or other indicator of when fluid 1806 is flowing into or out of the containment apparatus 1802. Alternatively, the sensing assembly 102 could be positioned or aimed at other strategically important locations where the presence or absence of turbulence and/or the intensity (e.g., degree or amount of movement) could indicate various operating conditions and parameters (e.g., amounts of fluid, movement of fluid, and the like). The sensing assembly 102 could periodically switch between these measurement modes (e.g., measuring the separation distance 110 being one mode and monitoring for movement being another mode), and then report the data and measurements to the control unit 112 (shown in FIG. 11). Alternatively, the control unit 112 could direct the sensing assembly 102 to make the various types of measurements (e.g., measuring the separation distance 110 or monitoring for movement) at different times.

Figure 29:
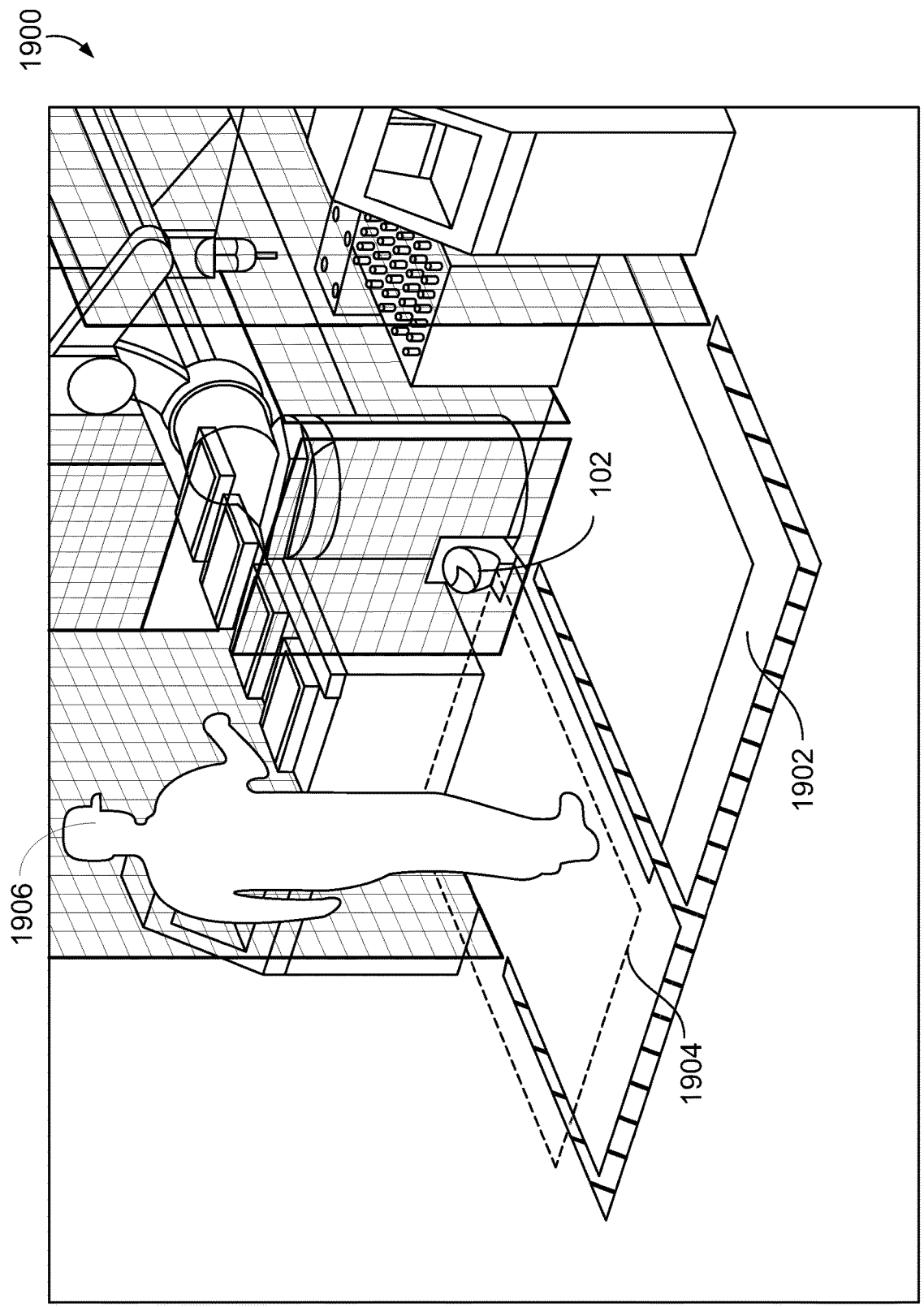
FIG. 29 illustrates one embodiment of a zone restriction system.

FIG. 29 illustrates one embodiment of a zone restriction system 1900. The system 1900 may include a sensing assembly 102 directing transmitted signals 106 (shown in FIG. 11) toward a first zone 1902 (e.g., area on a floor, volume in space, and the like). A human operator 1906 may be located in a different, second zone 1904 to perform various duties. The first zone 1902 may represent a restricted area or volume where the operator 1906 is to remain out of when one or more machines (e.g., automated robots or other components) operate for the safety of the operator 1906. The sensing assembly 102 can direct the transmitted signals 106 toward the first zone 1902 and monitor the received echoes 108 to determine if the operator 1906 enters into the first zone 1902. For example, intrusion of the operator 1906 into the first zone 1902 may be detected by identification of movement using the one or more of the coarse, fine, and/or ultrafine stage determination techniques described herein. If the sensing assembly 102 knows the distance to the first zone 1902 (e.g., the separation distance 110 to the floor in the first zone 1902), then the sensing assembly 102 can monitor for movement within the subset of interest in the echo signal that is generated based on the echoes, as described above. When the sensing assembly 102 detects entry of the operator 1906 into the first zone 1902, the sensing assembly 102 can notify the control unit 112 (shown in FIG. 11), which can deactivate machinery operating in the vicinity of the first zone 1902 to avoid injuring the operator 1906.

Figure 30:
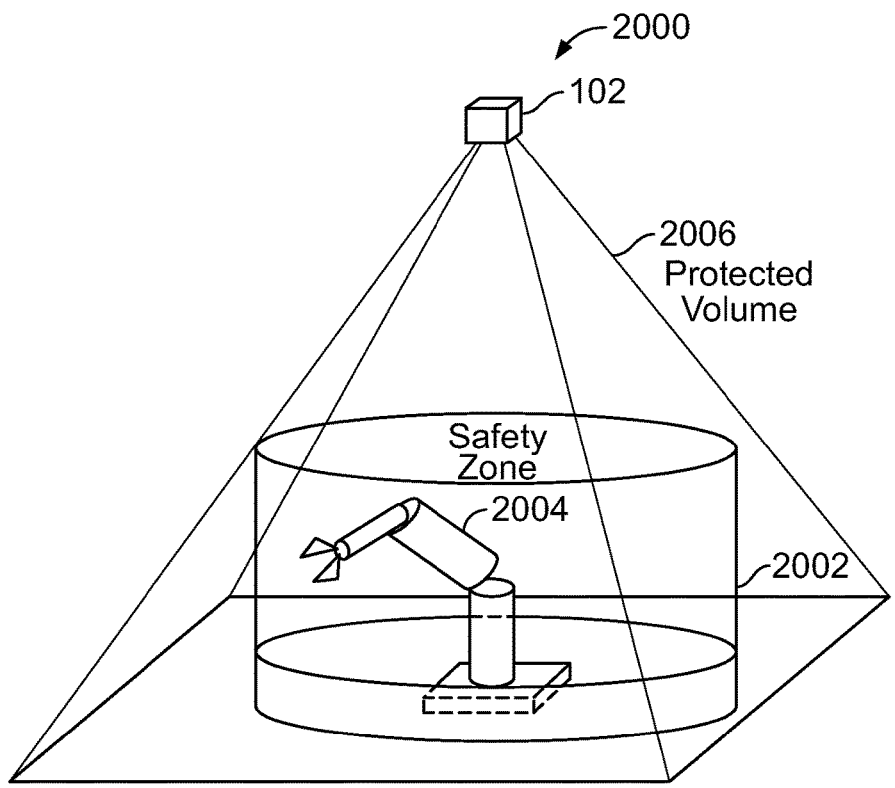
FIG. 30 illustrates another embodiment of a volume restriction system.

FIG. 30 illustrates another embodiment of a volume restriction system 2000. The system 2000 may include a sensing assembly 102 directing transmitted signals 106 (shown in FIG. 11) toward a safety volume 2002 ("Safety zone" in FIG. 30). Machinery 2004, such as an automated or manually control robotic device, may be located and configured to move within the safety volume 2002. The volume through which the transmitted signals 106 are communicated may be referred to as a protected volume 2006. The protected zone 2006 may represent a restricted area or volume where humans or other objects are to remain out of when the machinery 2004 operates. The sensing assembly 102 can direct the transmitted signals 106 through the protected volume 2006 and monitor the received echoes 108 to determine if there is any motion identified outside of the safety zone 2002 but within the protected zone 2006. For example, intrusion of a human into the protected volume 2006 may be detected by identification of movement using the ultrafine stage determination described above. When the sensing assembly 102 detects entry into the protected volume 2006, the sensing assembly 102 can notify the control unit 112 (shown in FIG. 11), which can deactivate the machinery 2004 to avoid injuring any person or thing that has entered into the protected volume 2006.

Figure 31:
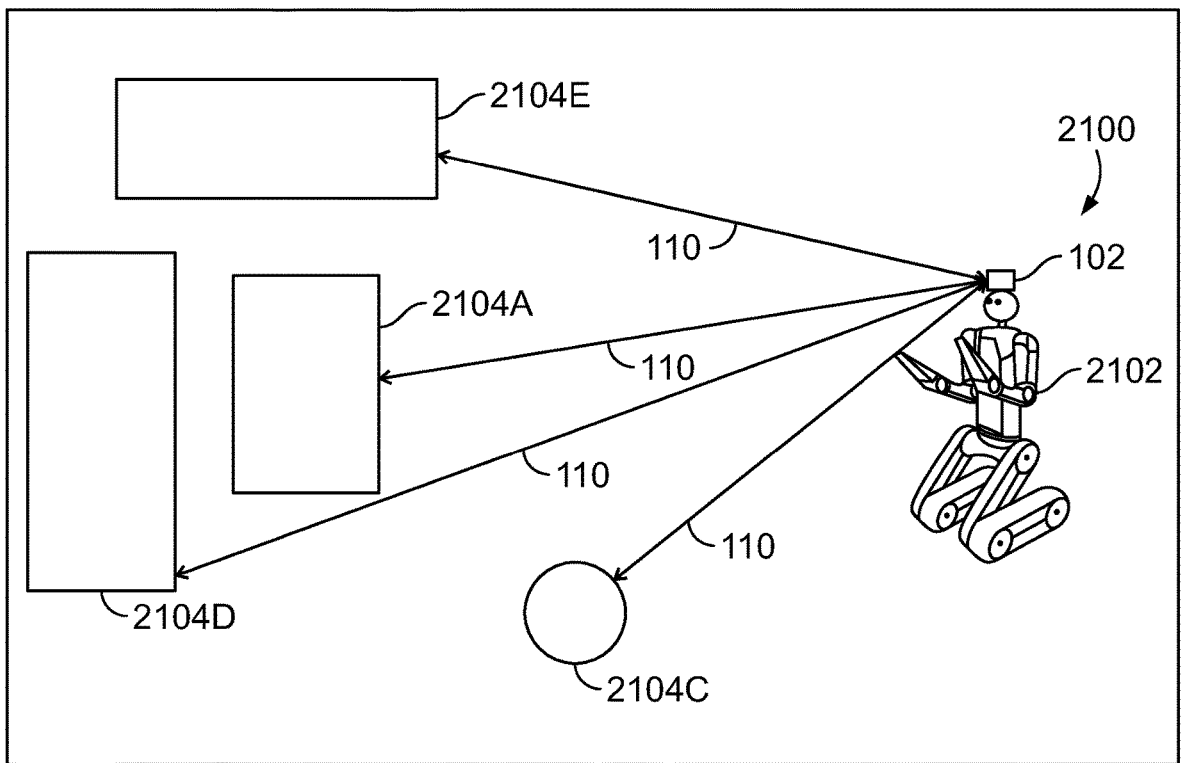
FIG. 31 is a schematic diagram of one embodiment of a mobile system.

FIG. 31 is a schematic diagram of one embodiment of a mobile system 2100 that includes the sensing assembly 102. The system 2100 includes a mobile apparatus 2102 with the sensing assembly 102 coupled thereto. In the illustrated embodiment, the mobile apparatus 2102 is a mobilized robotic system. Alternatively, the mobile apparatus 2102 may represent another type of mobile device, such as an automobile, an underground drilling vessel, or another type of vehicle. The system 2100 uses measurements made by the sensing assembly 102 to navigate around or through objects. The system 2100 may be useful for automated navigation based on detection of motion and/or measurements of separation distances 110 between the sensing assembly 102 and other objects, and/or for navigation that is assisted with such measurements and detections.

For example, the sensing assembly 102 can measure separation distances 110 between the sensing assembly 102 and multiple objects 2104A-D in the vicinity of the mobile apparatus 2102. The mobile apparatus 2102 can use these separation distances 110 to determine how far the mobile apparatus 2102 can travel before needing to turn or change direction to avoid contact with the objects 2104A-D.

In one embodiment, the mobile apparatus 2102 can use multiple sensing assemblies 102 to determine a layout or map of an enclosed vicinity 2106 around the mobile apparatus 2102. The vicinity 2106 may be bounded by the walls of a room, building, tunnel, and the like. A first sensing assembly 102 on the mobile apparatus 2102 may be oriented to measure separation distances 110 to one or more boundaries (e.g., walls or surfaces) of the vicinity 2106 along a first direction, a second sensing assembly 102 may be oriented to measure separation distances 110 to one or more other boundaries of the vicinity 2106 along a different (e.g., orthogonal) direction, and the like. The separation distances 110 to the boundaries of the vicinity 2106 can provide the mobile apparatus 2102 with information on the size of the vicinity 2106 and a current location of the mobile apparatus 2102. The mobile apparatus 2102 may then move in the vicinity 2106 while one or more of the sensing assemblies 102 acquire updated separation distances 110 to one or more of the boundaries of the vicinity 2106. Based on changes in the separation distances 110, the mobile apparatus 2102 may determine where the mobile apparatus 2102 is located in the vicinity 2106. For example, if an initial separation distance 110 to a first wall of a room is measured as ten feet (three meters) and an initial separation distance 110 to a second wall of the room is measured as five feet (1.5 meters), the mobile apparatus 2102 may initially locate itself within the room. If a later separation distance 110 to the first wall is four feet (1.2 meters) and a later separation distance 110 to the second wall is seven feet (2.1 meters), then the mobile apparatus 2102 may determine that it has moved six feet (1.8 meters) toward the first wall and two feet (0.6 meters) toward the second wall.

In one embodiment, the mobile apparatus 2102 can use information generated by the sensing assembly 102 to distinguish between immobile and mobile objects 2104 in the vicinity 2106. Some of the objects 2104A, 2104B, and 2104D may be stationary objects, such as walls, furniture, and the like. Other objects 210C may be mobile objects, such as humans walking through the vicinity 2106, other mobile apparatuses, and the like. The mobile apparatus 2102 can track changes in separation distances 110 between the mobile apparatus 2102 and the objects 2104A, 2104B, 2104C, 2104D as the mobile apparatus 2102 moves. Because the separation distances 110 between the mobile apparatus 2102 and the objects 2104 may change as the mobile apparatus 2102 moves, both the stationary objects 2104A, 2104B, 2104D and the mobile objects 2104C may appear to move to the mobile apparatus 2102. This perceived motion of the stationary objects 2104A, 2104B, 2104D that is observed by the sensing assembly 102 and the mobile apparatus 2102 is due to the motion of the sensing assembly 102 and the mobile apparatus 2102. To compute the motion (e.g., speed) of the mobile apparatus 2102, the mobile apparatus 210 can track changes in separation distances 110 to the objects 2104 and generate object motion vectors associated with the objects 2104 based on the changes in the separation distances 110.

Figure 32:
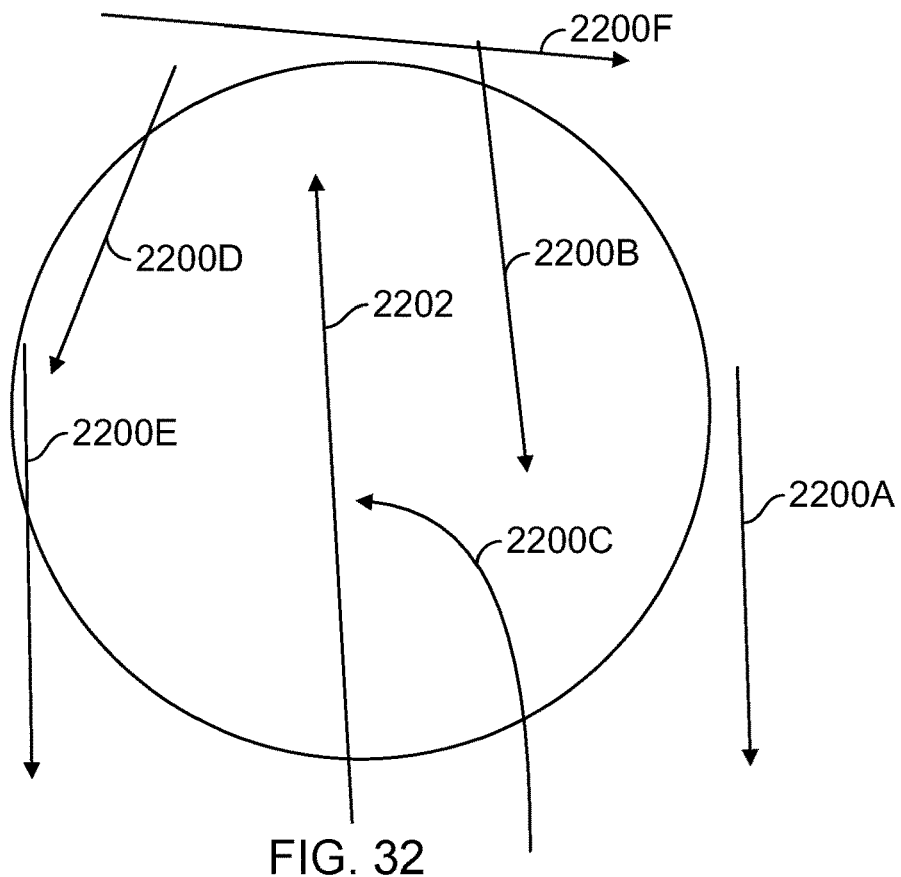
FIG. 32 is a schematic diagram of several object motion vectors in accordance with one example.

FIG. 32 is a schematic diagram of several object motion vectors generated based on changes in the separation distances 110 between the mobile apparatus 2102 and the objects (e.g., the objects 2104 of FIG. 31) in accordance with one example. The object motion vectors 2200A-F can be generated by tracking changes in the separation distances 110 over time. In order to estimate motion characteristics (e.g., speed and/or heading) of the mobile apparatus 2102, these object motion vectors 2200 can be combined, such as by summing and/or averaging the object motion vectors 2200. For example, a motion vector 2202 of the mobile apparatus 2102 may be estimated by determining a vector that is an average of the object motion vectors 2200 and then determining an opposite vector as the motion vector 2202. The combining of several object motion vectors 2200 can tend to correct spurious object motion vectors that are due to other mobile objects in the environment, such as the object motion vectors 2200C, 2200F that are based on movement of other mobile objects in the vicinity.

The mobile apparatus 2102 can learn (e.g., store) which objects are part of the environment and that can be used for tracking movement of the mobile apparatus 2102 and may be referred to as persistent objects. Other objects that are observed that do not agree with the known persistent objects are called transient objects. Object motion vectors of the transient objects will have varying trajectories and may not agree well with each other or the persistent objects. The transient objects can be identified by their trajectories as well as their radial distance from the mobile apparatus 2102, e.g. the walls of the tunnel will remain at their distance, whereas transient objects will pass closer to the mobile apparatus 2102.

In another embodiment, multiple mobile apparatuses 2102 may include the sensing system 100 and/or sensing assemblies 102 to communicate information between each other. For example, the mobile apparatuses 2102 may each use the sensing assemblies 102 to detect when the mobile apparatuses 2102 are within a threshold distance from each other. The mobile apparatuses 2102 may then switch from transmitting the transmitted signals 106 in order to measure separation distances 110 and/or detect motion to transmitting the transmitted signals 106 to communicate other information. For example, instead of generating the digital pulse sequence to measure separation distances 110, at least one of the mobile apparatuses 2102 may use the binary code sequence (e.g., of ones and zeros) in a pattern signal that is transmitted toward another mobile apparatus 2102 to communicate information. The other mobile apparatus 2102 may receive the transmitted signal 106 in order to identify the transmitted pattern signal and interpret the information that is encoded in the pattern signal.

Figure 33:
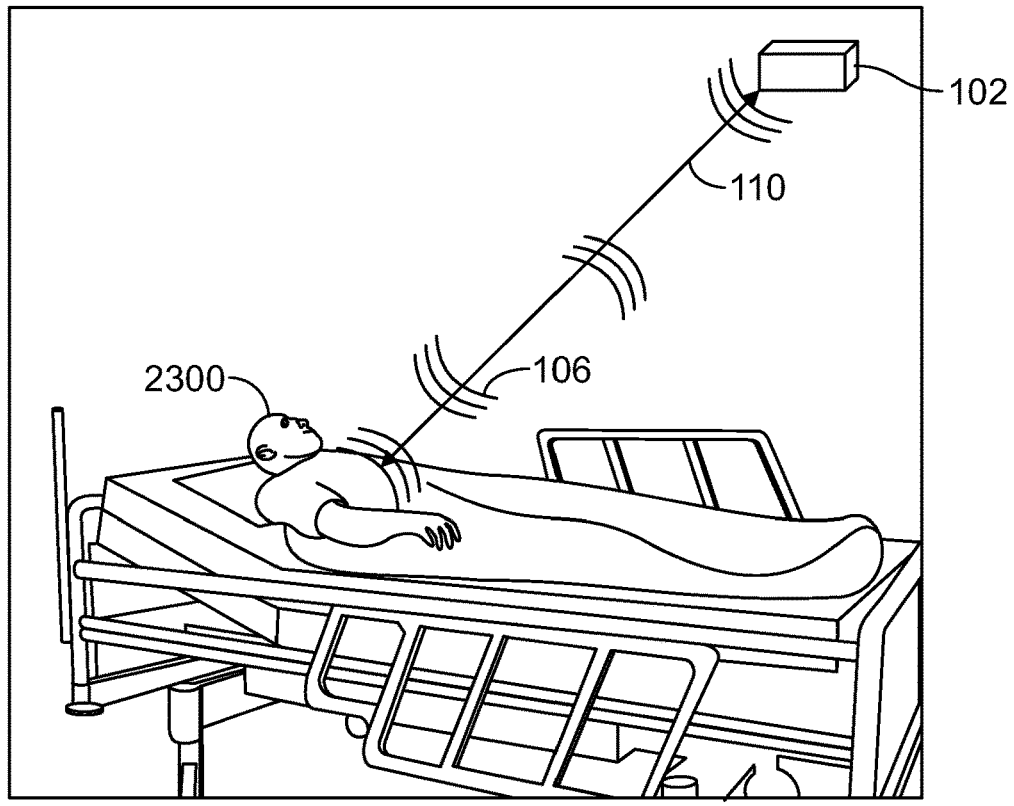
FIG. 33 is a schematic diagram of one example of using the sensing assembly shown in FIG. 11 in a medical application.

FIG. 33 is a schematic diagram of one example of using the sensing assembly 102 in a medical application. The sensing assembly 102 may use one or more of the stages described above (e.g., coarse stage, fine stage, and ultrafine stage) to monitor changes in position of a patient 2300 and/or relatively small movements of the patient. For example, the ultrafine stage determination of movement described above may be used for breath rate detection, heart rate detection, monitoring gross motor or muscle movement, and the like. Breath rate, heart rate and activity can be useful for diagnosing sleep disorders, and since the sensing is non-contact and can be more comfortable for the patient being observed. As one example, the separation distance 110 to the abdomen and/or chest of the patient 2300 can be determined to within one bit of the digital pulse sequence (e.g., the bit of interest), as described above. The sensing assembly 102 can then track relatively small motions of the chest and/or abdomen within the subset of interest to track a breathing rate and/or heart rate. Additionally or alternatively, the sensing assembly 102 can track the motions of the chest and/or abdomen and combine the motions with a known, measured, observed, or designated size of the abdomen to estimate the tidal volume of breaths of the patient 2300. Additionally or alternatively, the sensing assembly 102 can track the motions of the chest and abdomen together to detect paradoxical breathing of the patient 2300.

As another example, the sensing assembly 102 may communicate transmitted signals 106 that penetrate into the body of the patient 2300 and sense the motion or absolute position of various internal structures, such as the heart. Many of these positions or motions can be relatively small and subtle, and the sensing assembly 102 can use the ultrafine stage determination of motion or the separation distance 110 to sense the motion or absolute position of the internal structures.

Using the non-contact sensing assembly 102 also may be useful for situations where it is impossible or inconvenient to use wired sensors on the patient 2300 (e.g., sensors mounted directly to the test subject, connected by wires back to a medical monitor). For example, in high-activity situations where conventional wired sensors may get in the way, the sensing assembly 102 may monitor the separation distance 110 and/or motion of the patient 2300 from afar.

In another example, the sensing assembly 102 can be used for posture recognition and overall motion or activity sensing. This can be used for long-term observation of the patient 2300 for the diagnosis of chronic conditions, such as depression, fatigue, and overall health of at-risk individuals such as the elderly, among others. In the case of diseases with relatively slow onset, such as depression, the long term observation by the sensing assembly 102 may be used for early detection of the diseases. Also, since the unit can detect the medical parameters or quantities without anything being mounted on the patient 2300, the sensing assembly 102 may be used to make measurements of the patient 2300 without the knowledge or cooperation of the patient 2300. This could be useful in many situations, such as when dealing with children who would be made upset if sensors are attached to them. It may also give an indication of the mental state of a patient 2300, such as their breath becoming rapid and shallow when they become nervous. This would give rise to a remote lie-detector functionality.

In another embodiment, data generated by the sensing assembly 102 may be combined with data generated or obtained by one or more other sensors. For example, calculation of the separation distance 110 by the sensing assembly 102 may be used as a depth measurement that is combined with other sensor data. Such combination of data from different sensors is referred to herein as sensor fusion, and includes the fusing of two or more separate streams of sensor data to form a more complete picture of the phenomena or object or environment that is being sensed.

As one example, separation distances 110 calculated using the sensing assembly 102 may be combined with two-dimensional image data acquired by a camera. For example, without the separation distances 110, a computer or other machine may not be able to determine the actual physical size of the objects in a two-dimensional image.

Figure 34:
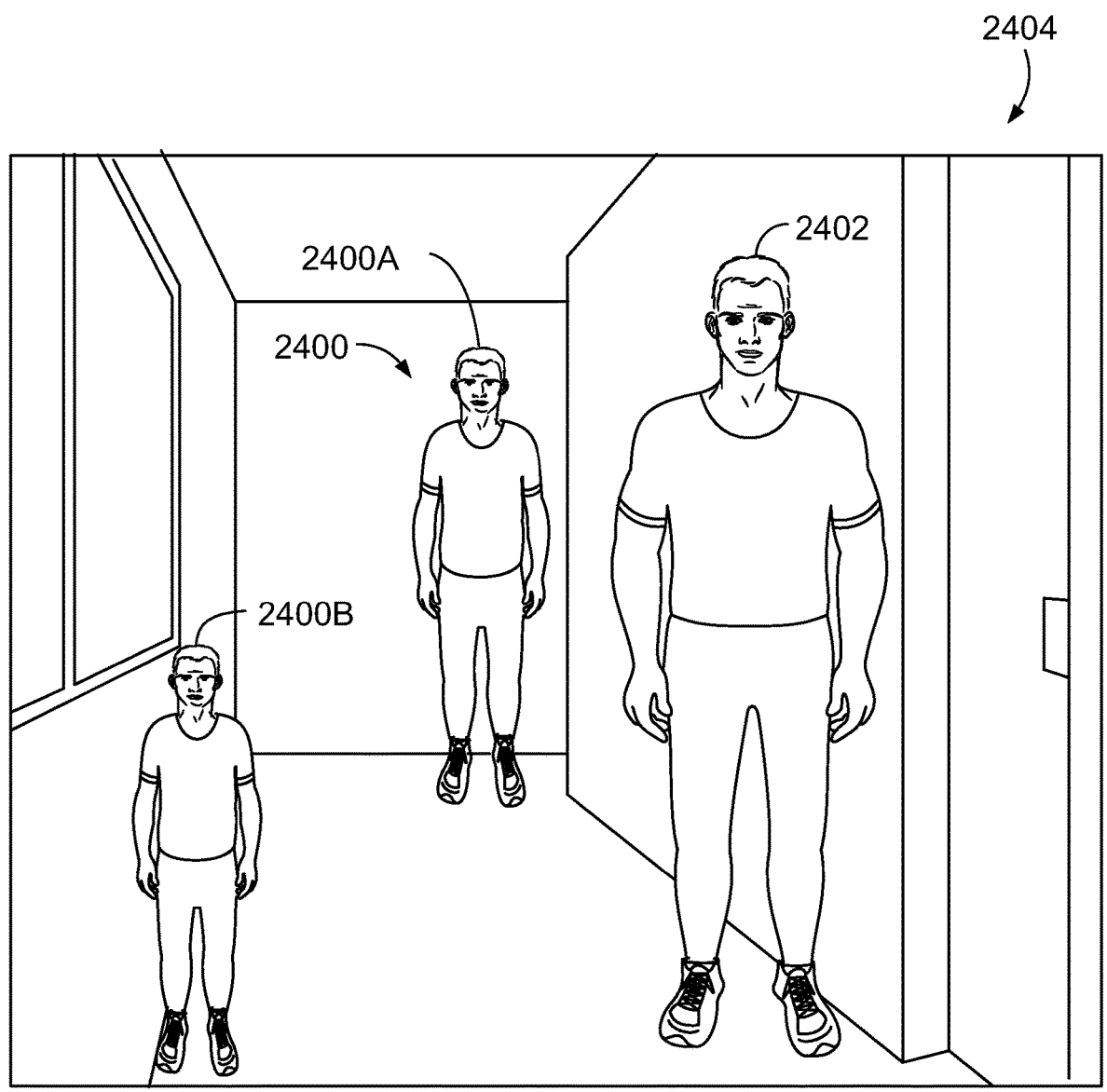
FIG. 34 is a two-dimensional image of human subjects in accordance with one example of an application of the system shown in FIG. 11.

FIG. 34 is a two-dimensional image 2404 of human subjects 2400, 2402 in accordance with one example of an application of the system 100 shown in FIG. 11. The image 2404 may be acquired by a two-dimensional image forming apparatus, such as a camera. The image forming apparatus may acquire the image for use by another system, such as a security system, an automatically controlled (e.g., moveable) robotic system, and the like. The human subjects 2400, 2402 may be approximately the same size (e.g., height). In reality, the human subject 2400 is farther from the image forming apparatus that acquired the image 2404 than the human subject 2402. However, due to the inability of the image forming apparatus to determine the relative separation distances between the image forming apparatus and each of the subjects 2400, 2402, the system that relies on the image forming apparatus to recognize the subjects 2400, 2402 may be unable to determine if the subject 2400 is located farther away (e.g., is at the location of 2400A) or is a much smaller human than the subject 2402 (e.g., is the size represented by 2400B).

The sensing assembly 102 (shown in FIG. 11) can determine separation distances 110 (shown in FIG. 11) between the image forming apparatus (e.g., with the sensing assembly 102 disposed at or near the image forming apparatus) and each of the subjects 2400, 2402 to provide a depth context to the image 2404. For example, the image forming apparatus or the system that uses the image 2404 for one or more operations may use the separation distance 110 to each of the subjects 2400, 2402 to determine that the subjects 2400, 2402 are approximately the same size, with the subject 2400 located farther away than the subject 2402.

With this separation distance 110 (shown in FIG. 11) information and information about the optics that were used to capture the two dimensional image 2400, it may be possible to assign actual physical sizes to the subjects 2400, 2402. For example, knowing the physical size that is encompassed by different portions (e.g., pixels or groups of pixels) of the image 2400 and knowing the separation distance 110 to each subject 2400, 2402, the image forming apparatus and/or the system using the image 2404 for one or more operations can calculate sizes (e.g., heights and/or widths) of the subjects 2400, 2402.

Figure 35:
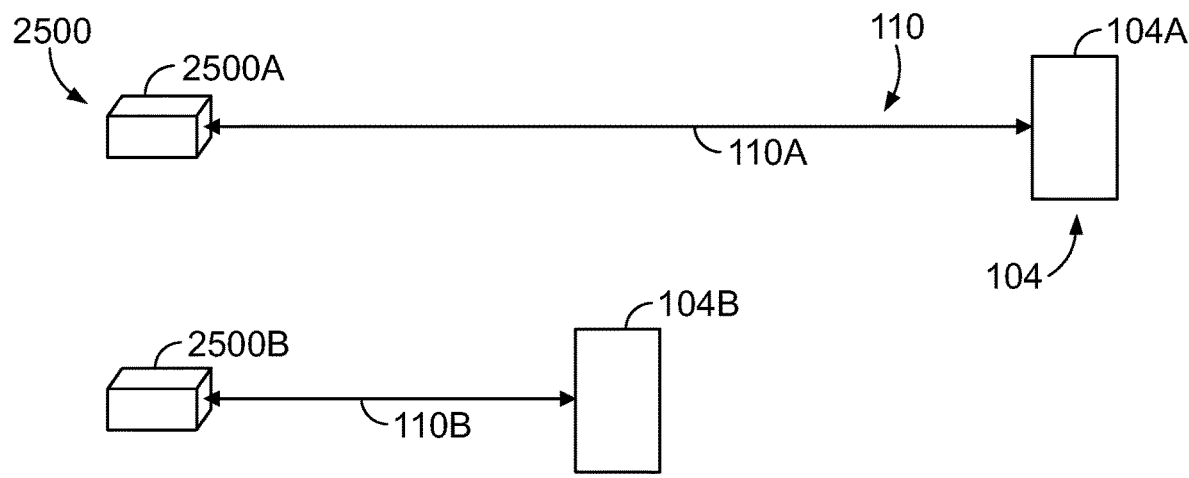
FIG. 35 is a schematic diagram of another embodiment of a sensing system.

FIG. 35 is a schematic diagram of a sensing system 2500 that may include the sensing assembly 102 (shown in FIG. 11) in accordance with one embodiment. Many types of sensors such as light level sensors, radiation sensors, moisture content sensors, and the like, obtain measurements of target objects 104 that may change as the separation distance 110 between the sensors and the target objects 104 varies. The sensing systems 2500 shown in FIG. 35 may include or represent one or more sensors that acquire information that changes as the separation distance 110 changes and may include or represent the sensing assembly 102. Distance information (e.g., separation distances 110) from the sensing systems 2500 and the target objects 104 can provide for calibration or correction of other sensor information that is dependent on the distance between the sensor and the targets being read or monitored by the sensor.

For example, the sensing systems 2500 can acquire or measure information (e.g., light levels, radiation, moisture, heat, and the like) from the target objects 104A, 104B and the separation distances 110A, 110B to the target objects 104A, 104B. The separation distances 110A, 110B can be used to correct or calibrate the measured information. For example, if the target objects 104A, 104B both provide the same light level, radiation, moisture, heat, and the like, the different separation distances 110A, 110B may result in the sensing systems 2500A, 2500B measuring different light levels, radiation, moisture, heat, and the like. With the sensing assembly 102 (shown in FIG. 1) measuring the separation distances 110A, 110B, the measured information for the target object 104A and/or 104B can be corrected (e.g., increased based on the size of the separation distance 110A for the target object 104A and/or decreased based on the size of the separation distance 110B for the target object 104B) so that the measured information is more accurate relative to not correcting the measured information for the different separation distances 110.

As another example, the sensing system 2500 may include a reflective pulse oximetry sensor and the sensing assembly 102. Two or more different wavelengths of light are directed at the surface of the target object 104 by the system 2500 and a photo detector of the system 2500 examines the scattered light. The ratio of the reflected power can be used to determine the oxygenation level of the blood in the target object 104. Instead of being directly mounted (e.g., engaged to) the body of the patient that is the target object 104, the sensing system 2500 may be spaced apart from the body of the patient.

The surface of the patient body can be illuminated with light sources and the sensing assembly 102 (shown in FIG. 11) can measure the separation distance 110 to the target object 104 (e.g., to the surface of the skin). The oxygenation level of the blood in the patient can then be calibrated or corrected for the decrease in the reflected power of the light that is caused by the sensing system 2500 being separated from the patient.

In another embodiment, the sensing assembly 102 and/or system 100 shown in FIG. 11 can be provided as a stand-alone unit that can communicate with other sensors, controllers, computers, and the like, to add the above-described functionality to a variety of sensor systems. A software-implemented system can collect and aggregate the information streams from the sensors and deliver the sensed information to the controlling system, where the separation distance 110 measured by the assembly 102 and/or system 100 is used in conjunction with the sensed information. Alternatively or additionally, the separation distances 110 measured by the assembly 102 can be collected along with a time stamp or other marker such as geographic location without communicating directly with the other sensors, controller, computer, and the like. The software-implemented system can then reconcile the separation distance 110 and other sensor data to align the measurements with each other.

The examples of sensor fusion described herein are not limited to just the combination of the sensing assembly 102 and one other sensor. Additional sensors may be used to aggregate the separation distances 110 and/or motion detected by the sensing assembly 102 with the data streams acquired by two or more additional sensors. For example, audio data (from a microphone), video data (from a camera), and the separation distances 110 and/or motion from the sensing assembly 102 can be aggregated to give a more complete understanding of a physical environment.

Figure 38:
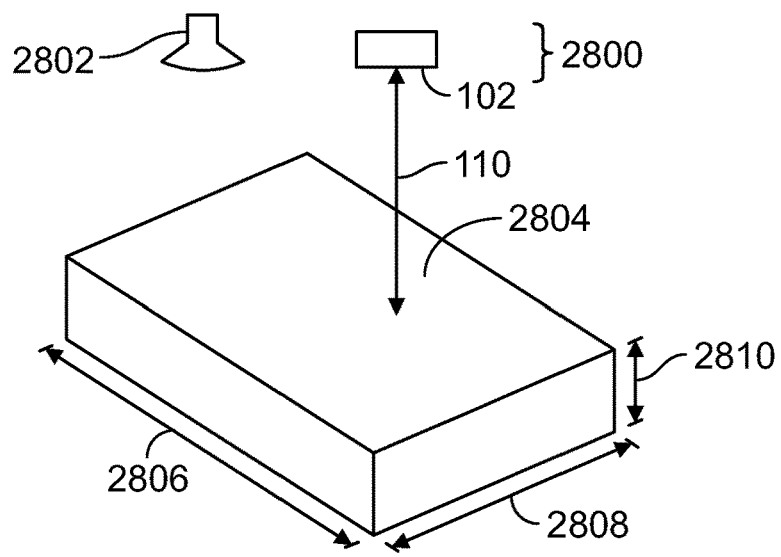
FIG. 38 is a schematic diagram of a sensing system in accordance with another embodiment.

FIG. 38 is a schematic diagram of a sensing system 2800 that may include the sensing assembly 102 in accordance with one embodiment. The sensing system 2800 includes a sensor 2802 that obtains lateral size data of a target object 2804. For example, the sensor 2802 may be a camera that obtains a two dimensional image of a box or package.

Figure 39:
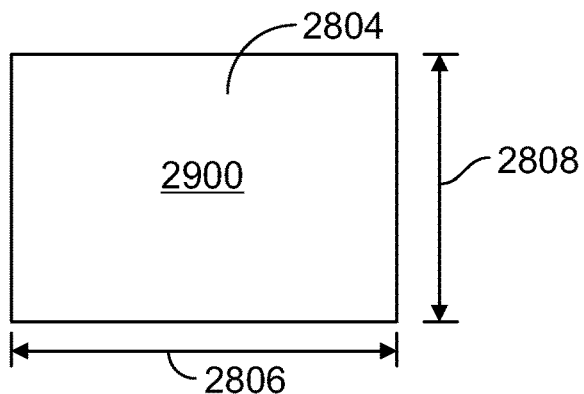
FIG. 39 is a schematic diagram representative of lateral size data of a target object that is obtained by the sensing system shown in FIG. 38.

FIG. 39 is a schematic diagram representative of the lateral size data of the target object 2804 that is obtained by the sensor 2802. The sensor 2802 (or a control unit communicatively coupled with the sensor 2802) may measure two dimensional sizes of the target object 2804, such as a length dimension 2806 and a width dimension 2808. For example, a two-dimensional surface area 2900 of the target object 2804 may be calculated from the image acquired by the sensor 2802. In one embodiment, the number of pixels or other units of the image formed by the sensor 2802 can be counted or measured to determine the surface area 2900 of the target object 2804.

Figure 40:
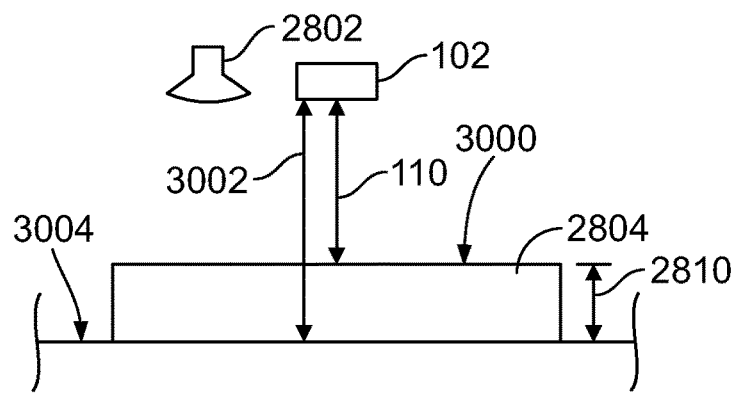
FIG. 40 is another view of a sensing assembly and the target object shown in FIGS. 38 and 39.

FIG. 40 is another view of the sensing assembly 102 and the target object 2804 shown in FIGS. 28 and 29. In order to calculate the volume or three dimensional outer surface area of the target object 2804, the sensing assembly 102 may be used to measure a depth dimension 2810 of the target object 2804. For example, the sensing assembly 102 may measure the separation distance 110 between the sensing assembly 102 and a surface 3000 (e.g., an upper surface) of the target object 2804 that is imaged by the sensor 2802. If a separation distance 3002 between the sensing assembly 102 and a supporting surface 3004 on which the target object 2804 is known or previously measured, then the separation distance 110 may be used to calculate the depth dimension 2810 of the target object 2804. For example, the measured separation distance 110 may be subtracted from the known or previously measured separation distance 3002 to calculate the depth dimension 2810. The depth dimension 2810 may be combined (e.g., by multiplying) with the lateral size data (e.g., the width dimension 2808 and the length dimension 2806) of the target object 2804 to calculate a volume of the target object 2804. In another example, the depth dimension 2810 can be combined with the lateral size data to calculate surface areas of each or one or more surfaces of the target object 2804, which may then be combined to calculate an outer surface area of the target object 2804. Combining the depth data obtained from the sensing assembly 102 with the two dimensional, or lateral, data obtained by the sensor 2802 may be useful in applications where the size, volume, or surface area of the target object 2804 is to be measured, such as in package shipping, identification or distinguishing between different sized target objects, and the like.

Figure 36:
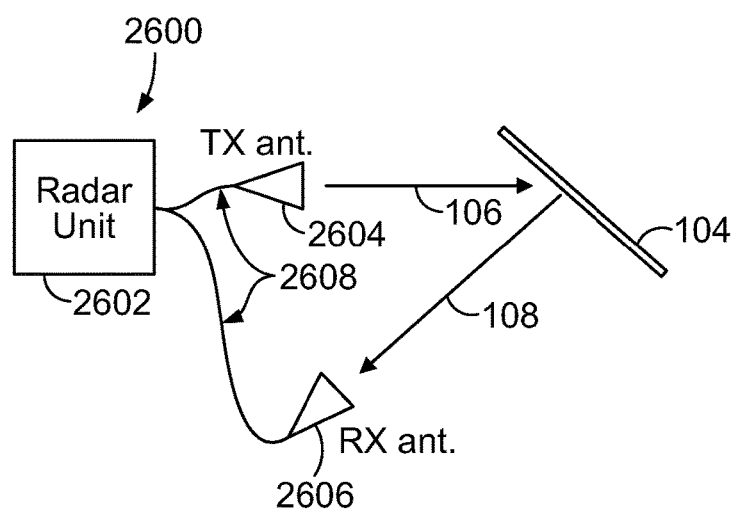
FIG. 36 is a schematic diagram of another embodiment of a sensing system.
Figure 37A:
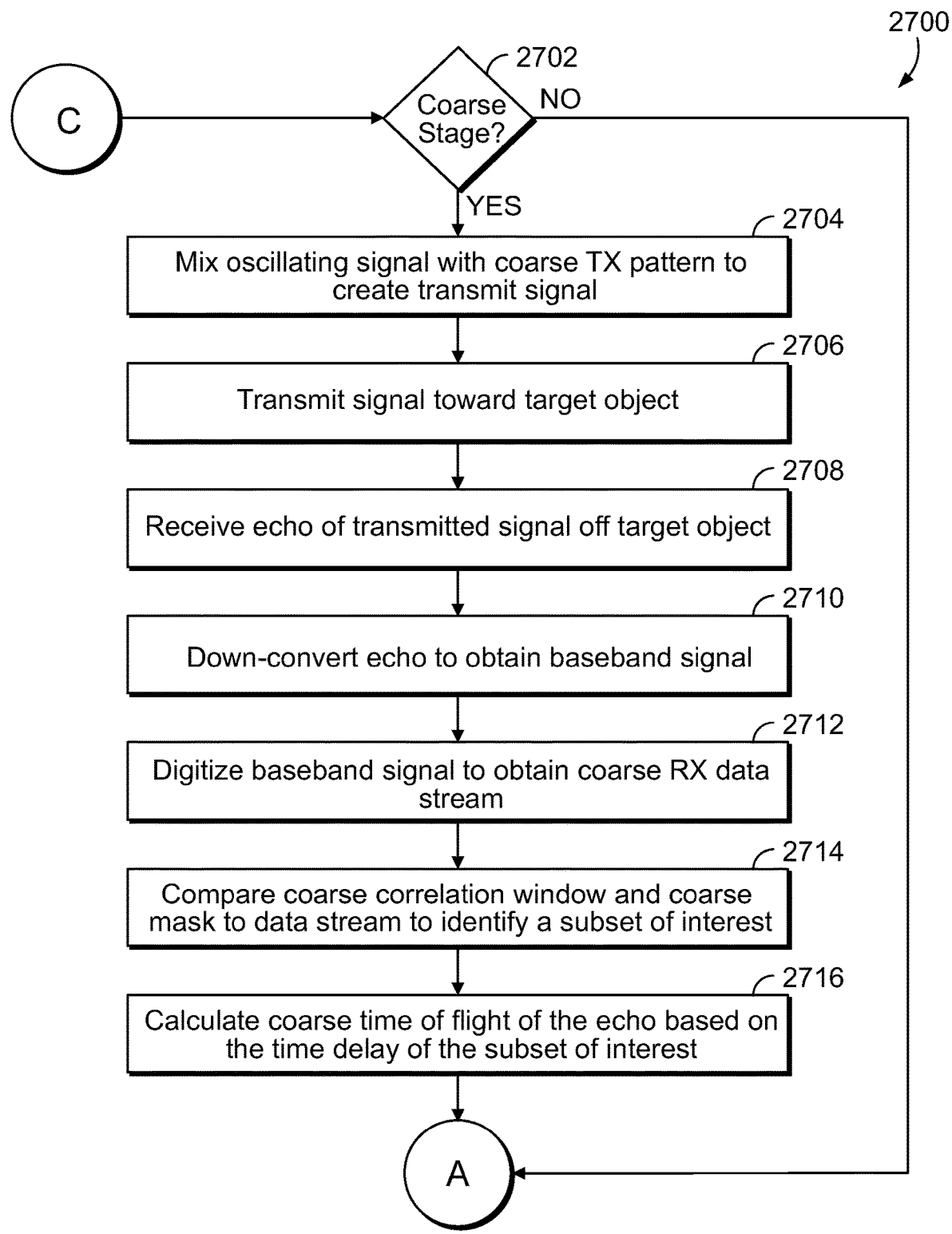
FIGS. 37A-37B illustrate one embodiment of a method for sensing separation distances from a target object and/or motion of the target object.
Figure 37B:
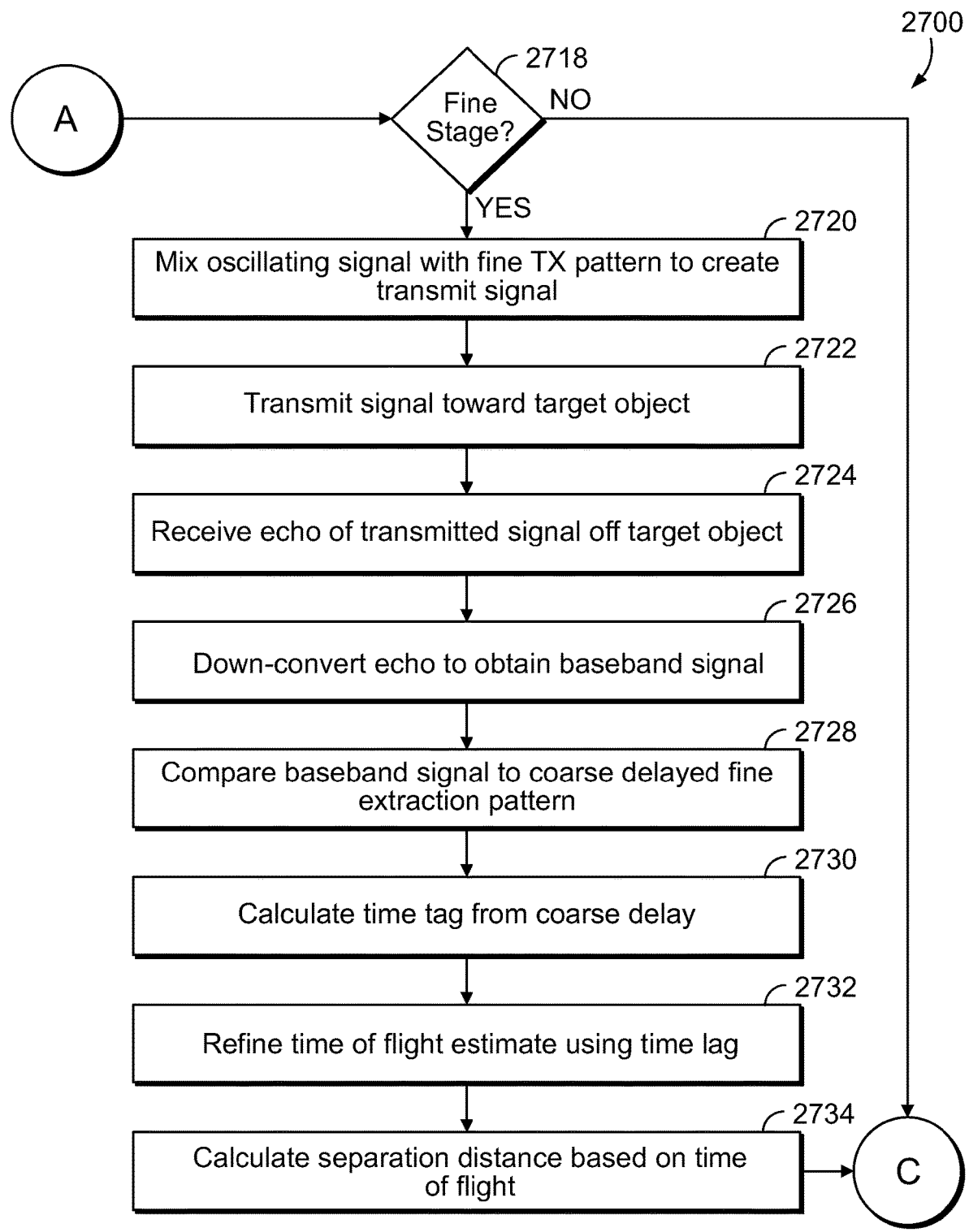

FIG. 36 is a schematic diagram of another embodiment of a sensing system 2600. The sensing system 2600 may be similar to the system 100 shown in FIG. 11. For example, the system 2600 may include a sensing assembly 2602 ("Radar Unit") that is similar to the sensing assembly 102 (shown in FIG. 11). Although the sensing assembly 2602 is labeled "Radar Unit" in FIG. 36, alternatively, the sensing assembly 2602 may use another technique or medium for determining separation distances 110 and/or detecting motion of a target object 104 (e.g., light), as described above in connection with the system 100.

The assembly 2602 includes a transmitting antenna 2604 that may be similar to the transmitting antenna 204 (shown in FIG. 12) and a receiving antenna 2606 that may be similar to the receiving antenna 206 (shown in FIG. 12). In the illustrated embodiment, the antennas 2604, 2606 are connected to the assembly 2602 using cables 2608. The cables 2608 may be flexible to allow the antennas 2604, 2606 to be re-positioned relative to the target object 104 on-the-fly. For example, the antennas 2604, 2606 may be moved relative to the target object 104 and/or each other as the transmitted signals 106 are transmitted toward the target object 104 and/or the echoes 108 are received off the target object 104, or between the transmission of the transmitted signals 106 and the receipt of the echoes 108.

The antennas 2604, 2606 may be moved to provide for pseudo-bistatic operation of the system 2600. For example, the antennas 2604, 2606 can be moved around to various or arbitrary locations to capture echoes 108 that may otherwise be lost if the antennas 2604, 2606 were fixed in position. In one embodiment, the antennas 2604, 2606 could be positioned on opposite sides of the target object 104 in order to test for the transmission of the transmitted signals 106 through the target object 104. Changes in the transmission of the transmitted signals 106 through the target object 104 can indicate physical changes in the target object 104 being sensed.

This scheme can be used with greater numbers of antennas 2604 and/or 2606. For example, multiple receiving antennas 2606 can be used to detect target objects 104 that may otherwise be difficult to detect. Multiple transmitting antennas 2604 may be used to illuminate target objects 104 with transmitted signals 106 that may otherwise not be detected. Multiple transmitting antennas 2604 and multiple receiving antennas 2606 can be used at the same time. The transmitting antennas 2604 and/or receiving antennas 2606 can be used at the same time, transmitting copies of the transmitted signal 106 or receiving multiple echoes 108, or the sensing assembly 2602 can be switched among the transmitting antennas 2604 and/or among the receiving antennas 2606, with the observations (e.g., separation distances 110 and/or detected motion) built up over time.

FIGS. 27A-B illustrate one embodiment of a method 2700 for sensing separation distances from a target object and/or motion of the target object. The method 2700 may be used in conjunction with one or more of the systems or sensing assemblies described herein.

At 2702, a determination is made as to whether to use to the coarse stage determination of the time of flight and/or separation distance. For example, an operator of the system 100 (shown in FIG. 11) may manually provide input to the system 100 and/or the system 100 may automatically determine whether to use the coarse stage determination described above. If the coarse stage determination is to be used, flow of the method 2700 proceeds to 2704. Alternatively, flow of the method 2700 may proceed to 2718. In one embodiment, the coarse stage uses a single channel (e.g., either the I channel or the Q channel) of the transmitted signal and received echo signal to determine the time of flight and/or separation distance, also as described above.

At 2704, an oscillating signal is mixed with a coarse transmit pattern to create a transmitted signal. For example, the oscillating signal 216 (shown in FIG. 12) is mixed with a digital pulse sequence of the transmit pattern signal 230 (shown in FIG. 12) to form the transmitted signal 106 (shown in FIG. 11), as described above.

At 2706, the transmitted signal is transmitted toward a target object. For example, the transmitting antenna 204 (shown in FIG. 12) may transmit the transmitted signal 106 (shown in FIG. 11) toward the target object 104 (shown in FIG. 11), as described above.

At 2708, echoes of the transmitted signal that are reflected off the target object are received. For example, the echoes 108 (shown in FIG. 11) that are reflected off the target object 104 (shown in FIG. 11) are received by the receiving antenna 206 (shown in FIG. 12), as described above.

At 2710, the received echoes are down converted to obtain a baseband signal. For example, the echoes 108 (shown in FIG. 11) are converted into the baseband echo signal 226 (shown in FIG. 12). For example, the received echo signal 224 may be mixed with the same oscillating signal 216 (shown in FIG. 12) that was mixed with the coarse transmit pattern signal 230 (shown in FIG. 12) to generate the transmitted signal 106 (shown in FIG. 11). The echo signal 224 can be mixed with the oscillating signal 216 to generate the baseband echo signal 226 (shown in FIG. 12) as the coarse receive data stream, as described above.

At 2712, the baseband signal is digitized to obtain the coarse receive data stream. For example, it may pass through the baseband processor 232 including the digitizer 730 to produce the digitized echo signal 740.

At 2714, a correlation window (e.g., a coarse correlation window) and a coarse mask are compared to the data stream to identify a subset of interest. Alternatively, the mask (e.g., a mask to eliminate or change one or more portions of the data stream) may not be used. In one embodiment, the coarse correlation window 320 (shown in FIG. 13) that includes all or a portion of the coarse transmit pattern included in the transmitted signal 106 (shown in FIG. 11) is compared to various subsets or portions of the digitized echo signal 740 (shown in FIG. 12), as described above. Correlation values can be calculated for the various subsets of the data stream 226, and the subset of interest may be identified by comparing the correlation values, such as by identifying the subset having a correlation value that is the greatest or is greater than one or more other subsets of interest.

At 2716, a time of flight of the transmitted signal and echo is calculated based on a time delay of the subset of interest. This time of flight can be referred to as a coarse time of flight. As described above, the subset of interest can be associated with a time lag ($t_d$) between transmission of the transmitted signal 106 (shown in FIG. 11) and the first bit of the subset of interest (or another bit in the subset of interest). The time of flight can be equal to the time lag, or the time of flight can be based on the time lag, with a correction or correlation factor (e.g., for the propagation of signals) being used to modify the time lag to the time of flight, as described above.

At 2718, a determination is made as to whether the fine stage determination of the separation distance is to be used. For example, a determination may be made automatically or manually to use the fine stage determination to further refine the measurement of the separation distance 110 (shown in FIG. 11) and/or to monitor or track motion of the target object 104 (shown in FIG. 11), as described above. If the fine stage is to be used, then flow of the method 2700 may proceed to 2720. On the other hand, if the fine stage is not to be used, then flow of the method 2700 may return to 2702.

At 2720, an oscillating signal is mixed with a digital pulse sequence to create a transmitted signal. As described above, the transmit pattern that is used in the fine stage may be different from the transmit pattern used in the coarse stage. Alternatively, the transmit pattern may be the same for the coarse stage and the fine stage.

At 2722, the transmitted signal is communicated toward the target object, similar to as described above in connection with 2706.

At 2724, echoes of the transmitted signal that are reflected off the target object are received, similar to as described above in connection with 2708.

At 2726, the received echoes are down converted to obtain a baseband signal. For example, the echoes 108 (shown in FIG. 11) are converted into the baseband echo signal 226 (shown in FIG. 12).

At 2728, the baseband signal 226 is compared to a fine receive pattern. The fine receive pattern may be delayed by the coarse time of flight, as described above. For example, instead of comparing the baseband signal with the receive pattern with both the baseband signal and the receive pattern having the same starting or initial time reference, the receive pattern may be delayed by the same time as the time delay measured by the coarse stage determination. This delayed receive pattern also may be referred to as a "coarse delayed fine extraction pattern" 728.

At 2730, a time lag between the fine data stream and the time delayed receive pattern is calculated. This time lag may represent the temporal overlap or mismatch between the waveforms in the fine data stream and the time delayed receive pattern, as described above in connection with FIGS. 8 through 11. The time lag may be measured as the energies of the waveforms that represent the overlap between the fine data stream and the time delayed receive pattern. As described above, time periods 808, 810, 904, 906 (shown in FIGS. 8 and 9) representative of the time lag may be calculated.

At 2732, the time of flight measured by the coarse stage (e.g., the "time of flight estimate") is refined by the time lag. For example, the time lag calculated at 2730 can be added to the time of flight calculated at 2716. Alternatively, the time lag may be added to a designated time of flight, such as a time of flight associated with or calculated from a designated or known separation distance 110 (shown in FIG. 11).

At 2734, the time of flight (that includes the time lag calculated at 2732) is used to calculate the separation distance from the target object, as described above. Flow of the method 2700 may then return to 2702 in a loop-wise manner. The above methods can be repeated for the I and Q channels separately or in parallel using parallel paths as in FIG. 22 or a switch or multiplexed path as described above to extract differences in the I and Q channels. These differences can be examined to resolve the phase of the echoes.

In one embodiment, performance of the fine stage determination (e.g., as described in connection with 2720 through 2732) is performed on one of the I or Q components of channels of the transmit signal and the echo signal, as described above. For example, the I channel of the echo signal 226 (shown in FIG. 12) may be examined in order to measure the amount of temporal overlap between the time-delayed receive pattern and the echo signal 226, as described above. In order to perform the ultrafine stage determination, a similar examination may be performed on another component or channel of the echo signal, such as the Q channel. For example, the I channel analysis of the echo signal 226 (e.g., the fine stage) may be performed concurrently or simultaneously with the Q channel analysis of the same echo signal 226 (e.g., the ultrafine stage). Alternatively, the fine stage and ultrafine stage may be performed sequentially, with one of the I or Q channels being examined to determine a temporal overlap of the echo signal and the time-delayed receive pattern before the other of the Q or I channels being examined to determine a temporal overlap. The temporal overlaps of the I and Q channels are used to calculate time lags (e.g., I and Q channel time lags), which can be added to the coarse stage determination or estimate of the time of flight. This time of flight can be used to determine the separation distance 110 (shown in FIG. 11), as described above. Alternatively or additionally, the time lags of the waveforms in the I channel and Q channel can be examined to resolve phases of the echoes in order to calculate separation distance or motion of the target.

As described above, the ultrafine stage determination may alternatively or additionally involve a similar process as the coarse stage determination. For example, the coarse stage determination may examine the I channel of the receive pattern and the data stream to determine correlation values of different subsets of the data stream and, from those correlation values, determine a subset of interest and a corresponding time-of-flight, as described herein. The ultrafine stage determination can use the Q channel of the receive pattern and the data stream to determine correlation values of different subsets of the data stream and, from those correlation values, determine a subset of interest and a time-of-flight, as described above. The times-of-flight from the I channel and Q channel can be combined (e.g., averaged) to calculate a time of flight and/or separation distance to the target. The correlation values calculated by the ultrafine stage determination can be used to calculate an additional time delay that can be added to the time delays from the coarse stage and/or the fine stage to determine a time of flight and/or separation distance to the target. Alternatively or additionally, the correlation values of the waveforms in the I channel and Q channel can be examined to resolve phases of the echoes in order to calculate separation distance or motion of the target.

In another embodiment, another method (e.g., a method for measuring a separation distance to a target object) is provided. The method includes transmitting an electromagnetic first transmitted signal from a transmitting antenna toward a target object that is separated from the transmitting antenna by a separation distance. The first transmitted signal includes a first transmit pattern representative of a first sequence of digital bits. The method also includes receiving a first echo of the first transmitted signal that is reflected off the target object, converting the first echo into a first digitized echo signal, and comparing a first receive pattern representative of a second sequence of digital bits to the first digitized echo signal to determine a time of flight of the first transmitted signal and the echo.

In another aspect, the method also includes calculating the separation distance to the target object based on the time of flight.

In another aspect, the method also includes generating an oscillating signal and mixing at least a first portion of the oscillating signal with the first transmit pattern to form the first transmitted signal.

In another aspect, converting the first echo into the first digitized echo signal includes mixing at least a second portion of the oscillating signal with an echo signal that is based on the first echo received off the target object.

In another aspect, comparing the first receive pattern includes matching the sequence of digital bits of the first receive pattern to subsets of the first digitized echo signal to calculate correlation values for the subsets. The correlation values are representative of degrees of match between the sequence of digital bits in the first receive pattern and the subsets of the first digitized echo signal.

In another aspect, at least one of the subsets of the digitized echo signal is identified as a subset of interest based on the correlation values. The time of flight can be determined based on a time delay between transmission of the transmitted signals and occurrence of the subset of interest.

In another aspect, the method also includes transmitting an electromagnetic second transmitted signal toward the target object. The second transmitted signal includes a second transmit pattern representative of a second sequence of digital bits. The method also includes receiving a second echo of the second transmitted signal that is reflected off the target object, converting the second echo into a second baseband echo signal, and comparing a second receive pattern representative of a third sequence of digital bits to the second baseband echo signal to determine temporal misalignment between one or more waveforms of the second baseband echo signal and one or more waveforms of the second receive pattern. The temporal misalignment representative of a time lag between the second receive pattern and the second baseband echo signal is extracted and then the time lag is then calculated.

In another aspect, the method also includes adding the time lag to the time of flight.

In another aspect, converting the second echo into the second digitized echo signal includes forming an in-phase (I) channel of the second baseband echo signal and a quadrature (Q) channel of the second baseband echo signal.

Comparing the second receive pattern includes comparing an I channel of the second receive pattern to the I channel of the second digitized echo signal to determine an I component of the temporal misalignment and comparing a Q channel of the second receive pattern to the Q channel of the second digitized echo signal to determine a Q component of the temporal misalignment.

In another aspect, the time lag that is added to the time of flight includes the I component of the temporal misalignment and the Q component of the temporal misalignment.

In another aspect, the method also includes resolving phases of the first echo and the second echo by examining the I component of the temporal misalignment and the Q component of the temporal misalignment, where the time of flight calculated based on the phases that are resolved.

In another aspect, at least two of the first transmit pattern, the first receive pattern, the second transmit pattern, or the second receive pattern differ from each other.

In another aspect, at least two of the first transmit pattern, the first receive pattern, the second transmit pattern, or the second receive pattern include a common sequence of digital bits.

In another embodiment, a system (e.g., a sensing system) is provided that includes a transmitter, a receiver, and a baseband processor. The transmitter is configured to generate an electromagnetic first transmitted signal that is communicated from a transmitting antenna toward a target object that is a separated from the transmitting antenna by a separation distance. The first transmitted signal includes a first transmit pattern representative of a sequence of digital bits. The receiver is configured to generate a first digitized echo signal that is based on an echo of the first transmitted signal that is reflected off the target object. The correlator device is configured to compare a first receive pattern representative of a second sequence of digital bits to the first digitized echo signal to determine a time of flight of the first transmitted signal and the echo.

In another aspect, the baseband processor is configured to calculate the separation distance to the target object based on the time of flight.

In another aspect, the system also includes an oscillating device configured to generate an oscillating signal. The transmitter is configured to mix at least a first portion of the oscillating signal with the first transmit pattern to form the first transmitted signal.

In another aspect, the receiver is configured to receive at least a second portion of the oscillating signal and to mix the at least the second portion of the oscillating signal with an echo signal that is representative of the echo to create the first baseband echo signal.

In another aspect, the baseband echo signal may be digitized into a first digitized echo signal and the correlator device is configured to compare the sequence of digital bits of the first receive pattern to subsets of the first digitized echo signal to calculate correlation values for the subsets. The correlation values are representative of degrees of match between the first receive pattern and the digital bits of the digitized echo signal.

In another aspect, at least one of the subsets of the digitized echo signal is identified by the correlator device as a subset of interest based on the correlation values. The time of flight is determined based on a time delay between transmission of the first transmitted signal and occurrence of the subset of interest in the first digitized echo signal.

In another aspect, the transmitter is configured to transmit an electromagnetic second transmitted signal toward the target object. The second transmitted signal includes a second transmit pattern representative of a second sequence of digital bits. The receiver is configured to create a second digitized echo signal based on a second echo of the second transmitted signal that is reflected off the target object. The baseband processor is configured to compare a second receive pattern representative of a third sequence of digital bits to the second digitized echo signal to determine temporal misalignment between one or more waveforms of the second digitized echo signal and one or more waveforms of the second receive pattern. The temporal misalignment is representative of a time lag between the second receive pattern and the second baseband echo signal that is added to the time of flight.

In another aspect, the receiver is configured to form an in-phase (I) channel of the second digitized echo signal and a quadrature (Q) channel of the second digitized echo signal. The system can also include a baseband processing system configured to compare an I channel of the second receive pattern to the I channel of the second digitized echo signal to determine an I component of the temporal misalignment. The baseband processing system also is configured to compare a Q channel of the second receive pattern to the Q channel of the second digitized echo signal to determine a Q component of the temporal misalignment.

In another aspect, the time lag that is added to the time of flight includes the I component of the temporal misalignment and the Q component of the temporal misalignment.

In another aspect, the baseband processing system is configured to resolve phases of the first echo and the second echo based on the I component of the temporal misalignment and the Q component of the temporal misalignment. The time of flight is calculated based on the phases that are resolved. For example, the time of flight may be increased or decreased by a predetermined or designated amount based on an identified or measured difference in the phases that are resolved.

In another embodiment, another method (e.g., for measuring a separation distance to a target object) is provided. The method includes transmitting a first transmitted signal having waveforms representative of a first transmit pattern of digital bits and generating a first digitized echo signal based on a first received echo of the first transmitted signal. The first digitized echo signal includes waveforms representative of a data stream of digital bits. The method also includes comparing a first receive pattern of digital bits to plural different subsets of the data stream of digital bits in the first digitized echo signal to identify a subset of interest that indicates the presence and/or temporal location of the first receive pattern than one or more other subsets. The method further includes identifying a time of flight of the first transmitted signal and the first received echo based on a time delay between a start of the data stream in the first digitized echo signal and the subset of interest.

In another aspect, the method also includes transmitting a second transmitted signal having waveforms representative of a second transmit pattern of digital bits and generating an in-phase (I) component of a second baseband echo signal and a quadrature (Q) component of the second baseband echo signal that is based on a second received echo of the second transmitted signal. The second baseband echo signal includes waveforms representative of a data stream of digital bits. The method also includes comparing a time-delayed second receive pattern of waveforms that are representative of a sequence of digital bits to the second baseband echo signal. The second receive pattern is delayed from a time of transmission of the second transmitted signal by the time delay of the subset of interest. An in-phase (I) component of the second receive pattern is compared to an I component of the second baseband echo signal to identify a first temporal misalignment between the second receive pattern and the second baseband echo signal. A quadrature (Q) component of the second receive pattern is compared to a Q component of the second baseband echo signal to identify a second temporal misalignment between the second receive pattern and the second baseband echo signal. The method also includes increasing the time of flight by the first and second temporal misalignments.

In another aspect, the method also includes identifying motion of the target object based on changes in one or more of the first or second temporal misalignments.

In another aspect, the first transmit pattern differs from the first receive pattern.

It is to be understood that the above description is intended to be illustrative, and not restrictive. For example, the above described embodiments (and/or aspects thereof) may be used in combination with each other. In addition, many modifications may be made to adapt a particular situation or material to the teachings of the subject matter without departing from its scope. While the dimensions and types of materials described herein are intended to define the parameters of the subject matter, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the subject matter, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the concepts herein and shall not be construed as limiting the disclosed subject matter.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A device comprising:
    a housing hosting a processor, a memory, a display, a network interface, and a first distance sensor, wherein the processor is in communication with the memory, the display, the network interface, and the first distance sensor, wherein the memory stores a set of instructions configured to be executable by the processor, wherein the set of instructions is configured to instruct the processor to:

request the first distance sensor to obtain a first distance reading off a physical object hosting a second distance sensor programmed to obtain a second distance reading relative to the housing, wherein the housing is separate and distinct from the physical object;

request the network interface to send the first distance reading to a server that accesses the second distance reading such that the server fuses the first distance reading and the second distance reading and identifies a first position of the housing relative to the physical object and a second position of the physical object relative to the housing, wherein the server is separate and distinct from the housing and the physical object;

request the network interface to receive the first position of the housing relative to the physical object and the second position of the physical object relative to the housing from the server;

generate a content based on the first position of the housing relative to the physical object and the second position of the physical object relative to the housing; and take an action based on the content.

2. The device of claim 1, wherein the action includes requesting a visual presentation of the content.

3. The device of claim 2, wherein the content is an augmented reality content.

4. The device of claim 2, wherein the content is a virtual reality content.

5. The device of claim 2, wherein the content includes a map showing the first position and the second position.

6. The device of claim 2, wherein the content includes a path on a map, wherein the path is formed based on the first position and the second position.

7. The device of claim 6, wherein the path is already traveled by the housing based on the first position and the second position.

8. The device of claim 6, wherein the path is to be traveled by the housing based on the first position and the second position.

9. The device of claim 1, wherein the action includes modifying the content based on the first position and the second position changing in real-time relative to each other.

10. The device of claim 1, wherein the housing hosts the first distance sensor internally.

11. The device of claim 1, wherein the housing hosts the first distance sensor externally.

12. The device of claim 1, wherein the physical object is stationary relative to the housing.

13. The device of claim 1, wherein the physical object is mobile relative to the housing.

14. The device of claim 1, further comprising:

an inertial measurement unit (IMU), wherein the housing hosts the IMU, wherein the processor is in communication with the IMU, wherein the set of instructions is configured to instruct the processor to:
request the IMU to obtain an inertia measurement associated with the first distance reading; and
request the network interface to send the inertia measurement to the server such that the server fuses the inertia measurement, the first distance reading, and the second distance reading and identifies the first position of the housing relative to the physical object and the second position of the physical object relative to the housing.

15. The device of claim 1, wherein the housing includes, is a component of, or is a vehicle.

16. The device of claim 1, wherein the housing includes, is a component of, or is a wearable.

17. The device of claim 1, wherein the housing includes, is a component of, or is a mobile phone.

18. The device of claim 1, wherein the housing includes, is a component of, or is a garment.

19. The device of claim 1, wherein the first distance sensor is a line-of-sight based.

20. The device of claim 1, wherein the first distance sensor is non-line-of-sight based.

* * * * *